(12) United States Patent
Seo et al.

(10) Patent No.: US 9,862,644 B2
(45) Date of Patent: *Jan. 9, 2018

(54) GEOPOLYMER RESIN MATERIALS, GEOPOLYMER MATERIALS, AND MATERIALS PRODUCED THEREBY

(71) Applicant: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

(72) Inventors: Dong-Kyun Seo, Chandler, AZ (US); Dinesh Medpelli, Tempe, AZ (US); Danielle Ladd, Scottsdale, AZ (US); Milad Mesgar, Houston, TX (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,045

(22) Filed: Feb. 19, 2016

(65) Prior Publication Data

US 2016/0168032 A1 Jun. 16, 2016

Related U.S. Application Data

(63) Continuation of application No. 14/344,261, filed as application No. PCT/US2012/056552 on Sep. 21, 2012, now Pat. No. 9,296,654.

(60) Provisional application No. 61/537,378, filed on Sep. 21, 2011, provisional application No. 61/650,338, filed on May 22, 2012.

(51) Int. Cl.

| | |
|---|---|
| *C04B 28/26* | (2006.01) |
| *C04B 28/00* | (2006.01) |
| *C04B 14/04* | (2006.01) |
| *C04B 24/04* | (2006.01) |
| *C04B 24/08* | (2006.01) |
| *C04B 28/24* | (2006.01) |
| *C04B 38/00* | (2006.01) |

(52) U.S. Cl.
CPC ............ *C04B 28/26* (2013.01); *C04B 14/047* (2013.01); *C04B 24/04* (2013.01); *C04B 24/08* (2013.01); *C04B 28/006* (2013.01); *C04B 28/24* (2013.01); *C04B 38/00* (2013.01); *Y02P 40/165* (2015.11); *Y10T 428/2982* (2015.01)

(58) Field of Classification Search
CPC ......... C04B 24/04; C04B 24/08; C04B 28/24; C04B 28/006; C04B 38/00; C04B 14/047; Y10T 428/2982; Y02P 40/165

USPC ..................................... 428/402; 216/58, 83
See application file for complete search history.

(56) References Cited

U.S. PATENT DOCUMENTS

| | | |
|---|---|---|
| 3,558,273 A | 1/1971 | Beck |
| 4,923,830 A | 5/1990 | Everhart et al. |
| 5,045,511 A | 9/1991 | Bosomworth et al. |
| 5,244,726 A | 9/1993 | Laney et al. |
| 5,342,595 A * | 8/1994 | Davidovits ............. C01B 33/26 106/286.5 |
| 5,680,713 A | 10/1997 | Forbert et al. |
| 5,725,836 A | 3/1998 | Rouanet et al. |
| 6,131,305 A | 10/2000 | Forbert et al. |
| 6,187,248 B1 | 2/2001 | O'Neill et al. |
| 6,254,845 B1 | 7/2001 | Ohashi et al. |
| 6,642,285 B1 | 11/2003 | Bohner |
| 6,699,808 B1 | 3/2004 | Schwertfeger et al. |
| 6,893,564 B2 | 5/2005 | Mueller et al. |
| 7,297,321 B2 | 11/2007 | Shpeizer et al. |
| 7,456,123 B2 | 11/2008 | Wachter |
| 7,771,686 B2 | 8/2010 | Sagoe-crentsil et al. |
| 7,851,320 B2 | 12/2010 | Chaumonnot et al. |
| 8,557,214 B2 | 10/2013 | Seo |
| 8,574,358 B2 | 11/2013 | Biscan et al. |
| 9,242,900 B2 | 1/2016 | Seo et al. |
| 9,296,654 B2 * | 3/2016 | Seo ....................... C04B 28/006 |
| 9,308,511 B2 | 4/2016 | Seo et al. |
| 9,365,691 B2 | 6/2016 | Seo et al. |
| 2001/0023296 A1 | 9/2001 | Kato et al. |
| 2003/0108785 A1 | 6/2003 | Wu et al. |
| 2004/0047798 A1 | 3/2004 | Oh et al. |
| 2005/0152829 A1 | 7/2005 | Shpeizer et al. |
| 2005/0272593 A1 | 12/2005 | Wachter |
| 2006/0057355 A1 | 3/2006 | Suzuki et al. |

(Continued)

FOREIGN PATENT DOCUMENTS

| | | |
|---|---|---|
| EP | 0013497 | 7/1980 |
| EP | 454239 | 10/1991 |

(Continued)

OTHER PUBLICATIONS

Duxson et al. "Geopolymer technology: the current state of the art" J Mater Sci (2007) 42:2917-2933.

(Continued)

*Primary Examiner* — Leszek Kiliman
(74) *Attorney, Agent, or Firm* — Fish & Richardson P.C.

(57) ABSTRACT

A product formed from a first material including a geopolymer resin material, a geopolymer material, or a combination thereof by contacting the first material with a fluid and removing at least some of the fluid to yield a product. The first material may be formed by heating and/or aging an initial geopolymer resin material to yield the first material before contacting the first material with the fluid. In some cases, contacting the first material with the fluid breaks up or disintegrates the first material (e.g., in response to contact with the fluid and in the absence of external mechanical stress), thereby forming particles having an external dimension in a range between 1 nm and 2 cm.

21 Claims, 23 Drawing Sheets

(56) References Cited

U.S. PATENT DOCUMENTS

| | | | |
|---|---|---|---|
| 2006/0292054 | A1 | 12/2006 | Chaumonnot et al. |
| 2007/0003749 | A1 | 1/2007 | Asgari |
| 2007/0009689 | A1 | 1/2007 | Murer |
| 2007/0048605 | A1 | 3/2007 | Pez et al. |
| 2007/0125271 | A1 | 6/2007 | Barlet-Gouedard et al. |
| 2007/0125272 | A1 | 6/2007 | Johnson |
| 2007/0128491 | A1 | 6/2007 | Chisholm et al. |
| 2007/0259979 | A1 | 11/2007 | Lee |
| 2008/0028994 | A1 | 2/2008 | Barlet-Gouedard et al. |
| 2008/0028995 | A1* | 2/2008 | Barlet-Gouedard .. C04B 28/006 106/811 |
| 2008/0067149 | A1 | 3/2008 | Piesslinger-Schweiger et al. |
| 2008/0090716 | A1 | 4/2008 | Cherepy |
| 2008/0226893 | A1 | 9/2008 | Yang et al. |
| 2009/0026413 | A1 | 1/2009 | Patoux et al. |
| 2009/0041653 | A1 | 2/2009 | Hwang et al. |
| 2009/0256262 | A1 | 10/2009 | Farnworth et al. |
| 2009/0288557 | A1 | 11/2009 | Carati et al. |
| 2010/0104500 | A1 | 4/2010 | Holland |
| 2010/0222204 | A1 | 9/2010 | Frizon et al. |
| 2010/0254890 | A1 | 10/2010 | Yang et al. |
| 2011/0073311 | A1 | 3/2011 | Porcherie et al. |
| 2011/0092363 | A1 | 4/2011 | Seo et al. |
| 2012/0007020 | A1 | 1/2012 | Tarascon et al. |
| 2012/0235073 | A1 | 9/2012 | Seo et al. |
| 2013/0019780 | A1 | 1/2013 | Karimi et al. |
| 2013/0055924 | A1 | 3/2013 | Seo et al. |
| 2013/0071737 | A1 | 3/2013 | Belharouak et al. |
| 2013/0137010 | A1 | 5/2013 | Aitken et al. |
| 2013/0153830 | A1 | 6/2013 | Seo et al. |
| 2014/0342156 | A1 | 11/2014 | Seo et al. |
| 2016/0141616 | A1 | 5/2016 | Seo et al. |
| 2017/0137322 | A1 | 5/2017 | Seo |
| 2017/0173555 | A1 | 6/2017 | Seo et al. |

FOREIGN PATENT DOCUMENTS

| | | |
|---|---|---|
| EP | 0497966 | 8/1992 |
| EP | 497466 | 8/1995 |
| EP | 1230008 | 8/2002 |
| EP | 2758355 | 7/2014 |
| JP | 2003206112 | 7/2003 |
| KR | 10/2001/0082910 | 8/2001 |
| KR | 10/2001/0107049 | 12/2001 |
| WO | WO9932218 | 7/1999 |
| WO | WO0128675 | 4/2001 |
| WO | WO2004-018090 * | 3/2004 |
| WO | WO2004018090 | 4/2004 |
| WO | WO2005-019130 * | 3/2005 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009050196 | 4/2009 |
| WO | WO2009140030 | 11/2009 |
| WO | WO2011046910 | 4/2011 |
| WO | WO2011-068830 * | 6/2011 |
| WO | WO2011068830 | 6/2011 |
| WO | WO2012018890 | 2/2012 |
| WO | WO2013044016 | 3/2013 |
| WO | WO2013163010 A1 | 10/2013 |
| WO | WO2015006010 | 1/2015 |

OTHER PUBLICATIONS

Komnitsas et al. "Geopolymerisation: A review and prospects for the minerals industry" Minerals Engineering 20 (2007), pp. 1261-1277.

Provis et al. "Do Geopolymers Actually Contain Nanocrystalline Zeolites? A Reexamination of Existing Results" Chem. Mater. 17, 2005, pp. 3075-3085.

Thomas et al. "Amorphous Zeolites" Angew. Chem. Inr. Ed. Engl. 19 (1980) No. 9, pp. 745-746.

Bell et al. "Nano- and Microporosity in Geopolymer Gels" Microsc Microanal 12 (Supp 2), 2006, pp. 552-553.

International Search Report and Written Opinion of International Application No. PCT/US2010/058497 mailed Aug. 30, 2011, 11 pages.

PCT Officer, Becamel, Philippe, International Preliminary Report on Patentability of International Application No. PCT/US2010/058497 mailed Jun. 5, 2012, 7 pages.

W. M. Kriven, "Inorganic Polysialates or 'Geopolymers'" American Ceramic Society Bulletin, May 2010, vol. 89, No. 4, pp. 31-34.

Kriven et al., "Microstructure and nanoporosity of as-set geopolymers" Ceramic Engineering and Science Proceedings 2007, vol. 27, Issue 2, pp. 491-503.

Joseph Davidovits, "Geopolymer Chemistry and Applications" Jun. 2008, Chapter 1, 16 pages.

Joseph Davidovits, Geopolymer Chemistry and Applications, 3rd Edition, Jul. 2011, pp. 1-33.

A. S. Wagh, "Chemically Bonded Phosphate Ceramics—A Novel Class of Geopolymers," Ceramic Transactions 2005, vol. 165, 12 pages.

Nedelec, J.M., "Sol-Gel Processing of Nanostructured Inorganic Scintillating Materials", Journal of Nanomaterials, vol. 2007, Article ID 36392, 8 pages, 2007.

Sivashanmugam, A. et al., "Glycine-Assisted Sol-Gel Combustion Synthesis and Characterization of Aluminum-Doped $LiNiVO_4$ for Use in Lithium-Ion Batteries", Journal of the Electrochemical Society, vol. 153, No. 3, A497-A503, 2006.

Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.

Rolison, D. R. et al., "Electrically conductive oxide aerogels: new materials in electrochemistry", Journal of Materials Chemistry, vol. 11, pp. 963-980, 2001.

Zhang et al., "Mesostructured Forms of $\gamma$-$Al_2O_3$", J. Am. Chem. Soc. 124, pp. 1592-1593 (2002).

Baumann, Theodore F. et al., "Synthesis of High-Surface-Area Alumina Aerogels without the Use of Alkoxide Precursors", Chem. Mater., vol. 17, No. 2, pp. 395-401, 2005.

Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.

Kwak, Ja Hun et al., "Penta-coordinated $Al^{3+}$ ions as preferential nucleation sites for BaO on $\gamma$-$Al_2O_3$: An ultra-highmagnetic field 27Al MAS NMR study", Journal of Catalysis, vol. 251, pp. 189-194, 2007.

Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.

Zürner, Andreas et al., "Visualizing single-molecule diffusion in mesoporous materials", Nature, vol. 450, pp. 705-709, Nov. 29, 2007.

Iancu, Nora et al.,"Low-temperature synthetic method for size-controlled CdSe nanocrystals: utilization of boron selenide", Chem. Commun. 20, pp. 2298-2299, 2004.

Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.

Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.

Villemin, Didier et al., "A one step process for grafting organic pendants on alumina via the reaction of alumina and phosphonate under microwave irradiation", Chem. Commun. 2001, pp. 2060-2061, 2001.

Laine et al. "Making Nanosized Oxide Powders From Precursors by Flame Spray Pyrolysis". Key Engr Matl. 159-160 pp. 17-24. 1999.

(56) References Cited

OTHER PUBLICATIONS

Schuyten et al. "A Novel Combustion Synthesis Preparation of CuO/ZnO/ZrO2/Pd for Oxidative Hydrogen Production from Methanol" Catal Lett (2008) 121:189-198.
T. Mahata, G. Das, R.K. Mishra, B.P. Sharma, Combustion synthesis of gadolinia doped ceria powder, Journal of Alloys and Compounds, vol. 391, Issues 1-2,Apr. 5, 2005, pp. 129-135.
Lee et al., "Recent Progress in the Synthesis of Porous Carbon Materials" Advanced Materials (Weinheim, Germany) (2006), 18(16), pp. 2073-2094.
Pek et al., "A thixotropic nancomposite gel for three-dimensional cell culture" Nature Nanotechnology (2008), 3(11), pp. 671-675.
Morris et al., "Silica Sol as a Nanoglue: Flexible Synthesis of Composite Aerogels" Science (Washington, D.C.) 1999, 284, (5414), pp. 622-624.
Aguado-Serrano et al., "Silica/C composites prepared by the sol-gel method. Influence of the synthesis parameters on textural characteristics", Microporous and Mesoporous Materials. 74, pp. 111-119 (2004).
Aguado-Serrano et al., "Surface and catalytic properties of acid metal-carbons prepared by the sol-gel method", Applied Surface Science. 252, pp. 6075-6079 (2006).
Boffa et al., "Preparation of templated mesoporous silica membranes on macroporous a-alumina supports via direct coating of thixotropic polymeric sols", Microporous and Mesoporous Materials. 100, pp. 173-182 (2007).
Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).
Capadona et al., "A versatile approach for the processing of polymer nanocomposites with selfassembled nanofibre templates", Nature Nanotechnology. 2, pp. 765-769 (2007).
Han et al., "The effect of silica template structure on the pore structure of mesoporous carbons", School of Chemical Engineering, Seoul National University, Carbon. 41, pp. 1049-1056 (2003).
Leventis et al., "One-Pot Synthesis of Interpenetrating Inorganic/Organic Networks of CuO/Resorcinol- Formaldehyde Aerogels: Nanostructured Energetic Materials", J. Am. Chem. Soc. 131, pp. 4576-4577 (2009).
Moreno-Castilla et al., "Synthesis and surface characteristics of silica- and alumina-carbon composite xerogels", Phys. Chem. Chem. Phys. 2, pp. 4818-4822 (2000).
Capadona et al., "X-Aerogel Processing Time Reduced by One-Pot Synthesis" http://www.grc.nasa.gov/WWW/RT/2006/RX/RX20P-capadonal.html, retrieved on Jul. 26, 2013 (last updated Dec. 14, 2007), 4 pages.
PCT Officer Bong Ho Chang, International Search Report and Written Opinion of International Application No. PCT/US2012/056552, mailed Mar. 28, 2013, 13 pages.
PCT Officer Yukari Nakamura, International Preliminary Report on Patentability of International Application No. PCT/US2012/056552, mailed Apr. 3, 2014, 8 pages.
J. Aleman et al., "Definitions of Terms Relating to the Structure and Processing of Sols, Gels, Networks, and Inorganic-Organic Hybrid Materials," Pure and Applied Chemistry, vol. 79, No. 1, 2007, pp. 1801-1829.
Robert L. Burwell, Jr. "Manual of Symbols and Terminology for Physicochemical Quantities and Units—Appendix II. Definitions, Terminology and Symbols in Colloid and Surface Chemistry. Part II: Heterogeneous Catalysis," Pure and Applied Chemistry, vol. 46, 1976, pp. 71-90.
C. H. Christensen et al., "Mesoporous zeolite single crystal catalysts: Diffusion and catalysis in hierarchical zeolites" Catalysis Today 128, 2007, pp. 117-122.
N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.
L. Gueudré et al, "Diffusion in zeolites: is surface resistance a critical parameter?" Adsorption 16, 2010, pp. 17-27.
A. L. Mayers et al., "Thermodynamics of Mixed-Gas Adsorption" A.I.Ch.E. Journal, vol. 11, No. 1, Jan. 1965, pp. 121-127.
O. Cheung et al., "Silicoaluminophosphates as $CO_2$ sorbents" Microporous Mesoporous Materials 156, 2012, pp. 90-96.
Gresham, Dr. Robert M., contributing editor, "Viscosity: A fluid's resistance to flow," Tribology & Lubrication Technology, Nov. 2008, pp. 55-57.
First Office Action (English translation only) for Chinese Patent Application No. 201280056993.3 issued on Jun. 25, 2015, 9 pages.
European Search Report for Application No. 12834535.2 mailed Jul. 10, 2015, 9 pages.
Le-Ping L et al, "Preparation phosphoric acid-based porous geopolymers," Applied Clay Science, vol. 50, No. 4, Dec. 1, 2010, pp. 600-603.
Akhtar, F. et al., "Colloidal processing and CO2 capture performance of sacrificially templated zeolite monoliths", Applied Energy, Jan. 13, 2012 (Online), vol. 97, pp. 289-296.
The Patent Office of the People's Republic of China, Second Office Action (English translation only) for Chinese Patent Application No. 201280056993.3 issued on Feb. 5, 2016, 7 pages.
The Patent Office of the People's Republic of China, Decision of Final Rejection (English translation only) for Chinese Patent Application No. 201280056993.3 issued on Jan. 23, 2017, 8 pages.
European Examination Report for Application No. 12834535.2 mailed Dec. 20, 2016, 6 pages.
The Patent Office of the People's Republic of China, Third Office Action (English translation only) for Chinese Patent Application No. 201280056993.3 issued on Jul. 29, 2016, 8 pages.
Phr Borges et al., "Andreasen Particle Packing Method on the Development of Geopolymer Concrete for Civil Engineering", J. Mater. Civ. Eng. 26 (2014) 692-697.
K De Weerdte, "Geopolymers—State of the art", COIN Project report No. 37, 2011, 39 pages.
D Medpelli, "New Nanostructured Aluminosilicates from Geopolymer Chemistry", PhD Thesis, Arizona State University, Tempe, Arizona, May 2015, 192 pages.
C Montes et al., "Statistical software to improve the accuracy of geopolymer concrete mix design and proportioning", 2013 World of Coal Ash (WOCA) Conference—Apr. 22-25, 2013 in Lexington, KY, 9 pages.
A Poulesquen et al., "Rheological behavior of alkali-activated metakaolin during geopolymerization", Journal of Non-Crystalline Solids 357 (2011) 3565-3571.
M Romagnoli et al., "Rheology of geopolymer by DOE approach", Construction and Building Materials 36 (2012) 251-258.
K Shotri, Dynamic Mechanical Properties of Geopolymer-Polymer Composites, MSc thesis, Center for Materials Science and Engineering, Rochester Institute of Technology, New York, 2006, 86 pages.

\* cited by examiner

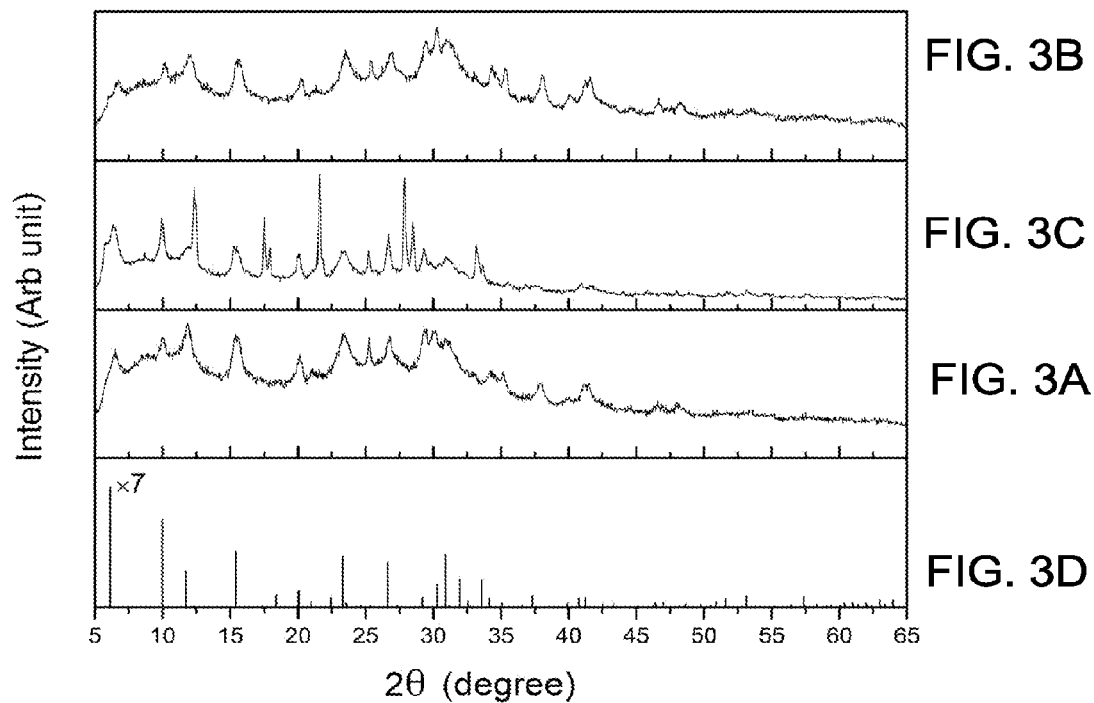
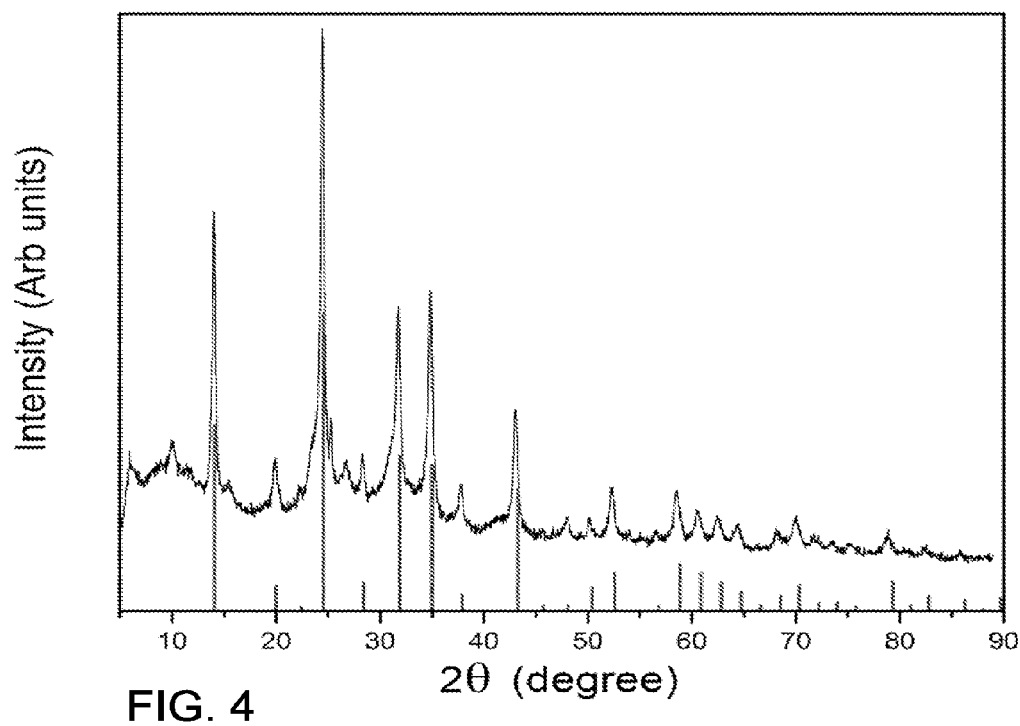

GEOPOLYMER RESIN MATERIALS, GEOPOLYMER MATERIALS, AND MATERIALS PRODUCED THEREBY

CROSS-REFERENCE TO RELATED APPLICATIONS

This application is a continuation of U.S. application Ser. No. 14/344,261, filed on Mar. 11, 2014, which is a U.S. National Phase Application of International Patent Application No. PCT/US2012/056552, filed on Sep. 21, 2012, which claims priority to U.S. Application Ser. No. 61/537,378, filed on Sep. 21, 2011, and U.S. Application Ser. No. 61/650,338, filed on May 22, 2012, all of which are incorporated by reference herein in their entirety.

STATEMENT OF GOVERNMENT INTEREST

This work was supported by the Center for Bio-Inspired Solar Fuel Production, an Energy Frontier Research Center funded by the U.S. Department of Energy, Office of Science, Office of Basic Energy Sciences under award number DE-SC0001016. The government has certain rights in the invention.

TECHNICAL FIELD

This invention relates to geopolymer resin materials, geopolymer materials, and materials formed therefrom.

BACKGROUND

As used herein, a geopolymer resin is an aqueous mixture formed by dissolving selected metal precursors in an alkali solution. Some geopolymer resins are formed by coupled alkali-mediated dissolution and polycondensation reactions of aluminosilicates in an aqueous media. Other geopolymer resins are formed through acid-base reactions, for example, between an acidic phosphate precursor solution and basic metal oxide precursors. A geopolymer is formed by curing a geopolymer resin. Geopolymers are commonly referred to by a variety of terms, including low-temperature aluminosilicate glass, alkali-activated cement, geocement, alkali-bonded ceramic, inorganic polymer concrete, and hydroceramic.

SUMMARY

In one aspect, a first material is contacted with a fluid, and at least some of the fluid is removed to yield a product. The first material includes a geopolymer resin material, a geopolymer material, or a combination thereof.

Implementations may include one or more of the following features. For example, an initial geopolymer resin material may be heated and/or aged to yield the first material, after which the first material is contacted with the fluid. Contacting the first material with the fluid can break up or disintegrate the first material, thereby forming particles. That is, the first material can break up or disintegrate in response to contact with the fluid and in the absence of external mechanical stress.

In some cases, the first material includes one or more organic compounds, each having a molecular weight less than 1000 g/mol (e.g., the first material does not include organic compounds having a molecular weight of 1000 g/mol or more, such as organic polymers). The first material may include vegetable oil, plant oil, animal oil, waste vegetable oil, waste animal oil, fat, biodiesel, fatty acid, lipid, ester, carboxylic acid, or a combination thereof. The first material may be a monolith. In one example, the first material includes a geopolymer resin material, the fluid is miscible with the first material, and the product is a homogeneous mixture. In another example, the first material includes a geopolymer resin material, and the product includes a different geopolymer resin material. In yet another example, the first material includes a geopolymer resin material, the fluid is immiscible with the first material, and the product includes a different geopolymer resin material. In certain cases, the first material includes a geopolymer resin material, and the product includes a geopolymer material.

In one example, the first material includes a geopolymer resin material, and the geopolymer resin material includes an organic compound that reacts with an alkali solution to produce one or more carboxylate ions having a molecular weight less than 400 g/mol. In another example, the first material includes a geopolymer resin material, and the geopolymer resin material includes carboxylate ions having a molecular weight less than 400 g/mol. Contacting the first material with the fluid may include transferring carboxylate ions from the first material to the fluid, thereby increasing a concentration of carboxylate ions in the fluid.

The product can be a nanostructured zeolite in the form of particles, agglomerates of particles, and/or aggregates of particles. In some cases, at least 50% of the particles have an external dimension between 1 nm and 100 nm. The nanostructured zeolite may have internal or surface structures in one or more dimensions between 1 nm and 100 nm or an external specific surface area by volume greater than 60 $m^2/cm^3$. The product may be porous, with a majority of the pores being micropores, mesopores, or macropores. In some cases, the product is hierarchically porous.

The fluid can be water or an aqueous solution. In certain cases, the fluid includes an organic solvent, a dissolved, dispersed, or suspended species, or both. In some cases, the fluid includes steam.

Thus, particular embodiments have been described. Variations, modifications, and enhancements of the described embodiments and other embodiments can be made based on what is described and illustrated. In addition, one or more features of one or more embodiments may be combined. The details of one or more implementations and various features and aspects are set forth in the accompanying drawings, the description, and the claims below.

BRIEF DESCRIPTION OF THE DRAWINGS

FIGS. 3A, 3B, and 3C show the powder X-ray diffraction patterns of the samples in Example 6. FIG. 3D is a simulated pattern of a NaX zeolite with a faujasite-type (FAU) structure.

FIG. 4 shows the powder X-ray diffraction pattern of the sample in Example 7 along with the simulated pattern of a sodalite (SOD).

DETAILED DESCRIPTION

Figure 1A:
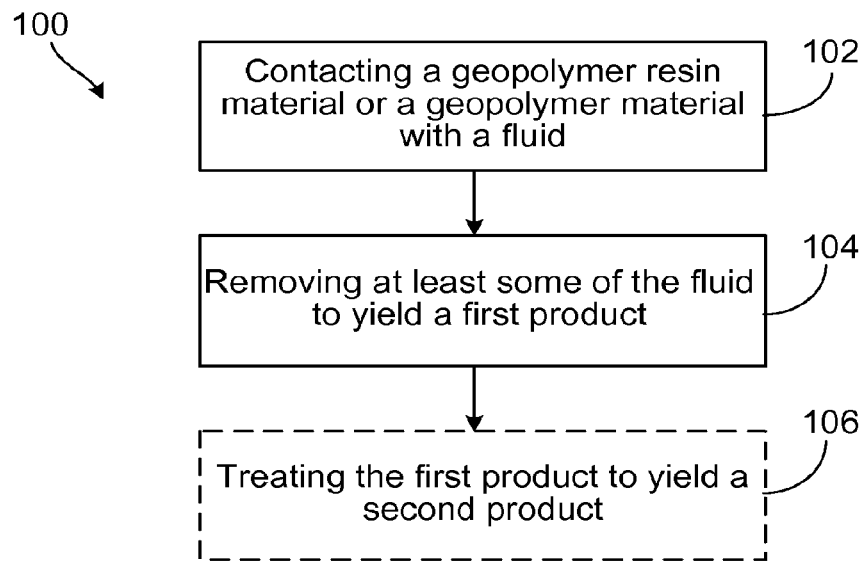
FIGS. 1A-1E are flowcharts showing processes for forming materials from geopolymer resin materials and geopolymer materials.

Geopolymer resins can be prepared in various ways. In one example, a geopolymer resin is prepared by dissolution of metal oxide precursors via acid-base reactions and subsequent precipitation of phosphates or silico phosphates. In another example, geopolymer resins are prepared by coupled alkali-mediated dissolution and precipitation reactions of silicate or aluminosilicate precursors in an aqueous media. Geopolymer resins including silico aluminophosphates can be prepared by reacting metakaolin or metakaolinite with phosphoric acid. Still other geopolymer resins can be formed by reacting a clay material with an alkaline or acidic solution. In other examples, metakaolin and metakaolinite are reacted with an alkaline solution to form a geopolymer resin. A geopolymer resin typically includes water and dissolved, dispersed, or suspended inorganic species, and may appear to be homogeneous upon visual inspection. Geopolymer resins are described in U.S. patent application Ser. No. 13/513,220, filed Jun. 1, 2012, which is incorporated herein by reference in its entirety.

Curing a geopolymer resin may yield a geopolymer gel or a geopolymer. The curing process may take place at temperatures including, for example, an ambient temperature (e.g., 15-35° C.) and an elevated temperature (e.g., 40-90° C.). Following the IUPAC Recommendations 2007 (J. Alemán et. al. "Definitions of Terms Relating to the Structure and Processing of Sols, Gels, Networks, and Inorganic—Organic Hybrid Materials," Pure and Applied Chemistry, 2007, 79, 1801), "curing" is a chemical process of converting a prepolymer or a polymer into a polymer of higher molar mass and then into a network. Curing is achieved by the induction of chemical reactions which might or might not require mixing with a chemical curing agent. Following the IUPAC Recommendations 2007, a "gel" is a non-fluid colloidal network or polymer network that is expanded throughout its whole volume by a fluid. A geopolymer gel contains an inorganic colloidal or polymer network, e.g., a network formed by polycondensation of inorganic precursors. In some cases, a geopolymer is a geopolymer gel that has lost at least some liquid from the gel (e.g., water). In some case, curing may be accompanied by at least some loss of the liquid (e.g., through evaporation). As used herein, "geopolymer material" generally refers to a geopolymer gel, a geopolymer, a geopolymer gel composite, a geopolymer composite or a combination thereof.

Under certain conditions, with certain compositions, or both, a geopolymer resin may cure incompletely (e.g., partially cured) or not at all (e.g., uncured). An uncured or partially cured geopolymer resin does not contain an inorganic colloidal or polymeric network that is expanded throughout its whole volume by a fluid. An inorganic network structure in an uncured or partially cured geopolymer resin may be discrete or may be partially expanded in a fluid. A geopolymer resin material may contain discrete particles, agglomerates, aggregates, or a combination thereof. As used herein, "geopolymer resin material" generally refers to a geopolymer resin, a partially cured geopolymer resin, a geopolymer resin composite, a partially cured geopolymer resin composite, or a combination thereof. A geopolymer resin material can be a liquid, semi-liquid, semi-solid or solid, and may appear heterogeneous upon visual inspection. A solid geopolymer resin material may be obtained when fluid (e.g., water) in a geopolymer resin material is removed (e.g., by evaporation) without undergoing a gel formation. Partial removal of water from a geopolymer resin material may yield a paste. A geopolymer resin material may become fluidic when it is stirred or shaken.

Partial curing of a geopolymer resin or a geopolymer resin composite can occur with short curing times (several hours or a day, for example) and/or low curing temperatures (at room temperature, for example). In some cases, partial curing occurs when a large amount of water and/or alkali is present in a geopolymer resin or a geopolymer resin composite, or when an organic component is present in the geopolymer resin or the geopolymer resin composite. In some cases, partial curing may be accompanied by at least some loss of the liquid (e.g., through evaporation) from the geopolymer resin or the geopolymer resin composite. Elevated temperatures typically accelerate curing. In some cases, the temperature is varied during curing or partially curing. In certain cases, a geopolymer resin or a geopolymer resin composite is kept at a certain temperature (room temperature, for example) for a period of time (i.e., "aged") before curing or partially curing. In some cases, a geopolymer resin or a geopolymer resin composite is aged after curing or partially curing.

A geopolymer resin composite can be prepared by the addition of multiple components to a geopolymer resin. Curing of a geopolymer resin composite may yield a geopolymer composite (multicomponent geopolymer). Multicomponent geopolymers are described in U.S. Pat. No. 5,244,726 and U.S. Pat. No. 7,771,686, both of which are incorporated by reference herein. Examples of components of multicomponent geopolymers or geopolymer composites include nanoparticles, nanomaterials, inorganic particulates, organic particulates, biological materials, molecules, cations, anions, and the like. Other components include, for example, a structure-directing agent or pore-templating agent such as quaternary ammonium ions, cyclodextrins, surfactants, glucose, starch, cellulose fibers, and the like. Other components include, for example, water-miscible organic monomers, oligomers, macromers, polymers; compounds that can be hydrolyzed and condensed with a geopolymer resin, such as organosilanes, organosiloxanes, organoalumoxanes, and organo metal oxides; inorganic compounds such as water-soluble organometallic complexes and inorganic metal compounds; water-miscible fluids such as glycerol, ethylene glycol, polyols, alcohols, acetone, tetrahydrofuran, dimethyl sulfoxide, and N-methylpyrrolidone; and materials that generate gas when in contact with a geopolymer resin (e.g., hydrogen peroxide, aluminum metal or silica fume). In some cases, additional components include vegetable oil, plant oil, animal oil, waste vegetable oil, waste animal oil, fat, biodiesel, fatty acid, lipid, ester, carboxylic acid, petroleum-based oil, or a combination of thereof. The vegetable oil, plant oil, animal oil, waste vegetable oil, waste animal oil, fat, biodiesel, fatty acid, lipid, ester, or carboxylic acid may react with the geopolymer resin to produce carboxylate anions.

Sources of silicon in geopolymer materials and geopolymer resin materials can include, for example, fumed silica, rice husk, rice husk ash, silica fume, silicates, aluminosilicates, organosilanes, clays, minerals, metakaolin, calcined clays, activated clays, fly ash, slag, pozzolan, incinerated utility waste, industrial by-products, glass powder, red mud, and the like. Sources of aluminum in geopolymers and geopolymer resins can include, for example, alumina, aluminates, aluminum salts, organoalumoxanes, clays, minerals, metakaolin, calcined clays, activated clays, fly ash, slag, pozzolan, incinerated utility waste, industrial by-products, glass powder, red mud, and the like. Sources of phosphorous in geopolymers and geoopolymer resins can include phosphoric acid, phosphates, hydrophosphates, organophosphine oxide, and the like. Some geopolymers or geopolymer resins include one or more metals in their ionic or elemental form, such as Li, Na, K, Rb, Cs, Be, Mg, Ca, Sr, Ba, Ra, B, Al, Ga, In, Tl, Si, Ge, Sn, Pb, P, As, Sb, Bi, S, Se, Te, Po, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Sc, Y, Lu, La, Ce, Pr, Nd, Sm, Eu, Gd, Tb, Dy, Ho, Er, Tm, Yb, Th, U, Pu, or any combination thereof. The preparation of geopolymers and geopolymer composites is described, for example, in W. M. Kriven, "Inorganic Polysialates or 'Geopolymers'," American Ceramic Society Bulletin, 2010, 89, 31; A. S. Wagh, "Chemically Bonded Phosphate Ceramics—A Novel Class of Geopolymers," Ceramic Transactions 2005, 165, 101; and Chapter 1 of *Geopolymer: Chemistry and Applications* by J. Davidovits; D. S. Perera et al., "Relative Strengths of Phosphoric Acid-Reacted and Alkali-Reacted Metakaolin Materials" Journal of Material Science 2008, 43, 6562, all of which are incorporated by reference herein.

Referring to FIG. 1A, a process 100 for preparing a material includes contacting a geopolymer resin material or a geopolymer material with a fluid (e.g., a liquid, a mixture of liquids, a gas, a mixture of gases, or a combination thereof) in 102. The fluid may be compressed or under pressure. In some cases, the fluid includes steam. The geopolymer resin material may include particles of a geopolymer or geopolymer composite. The geopolymer resin material may be a liquid, semi-liquid, paste, semi-solid, or solid, including a soft or semi-rigid solid.

In some cases, a geopolymer material has cracks and/or microcracks in its body. The cracks and/or microcracks may develop during the formation of the geopolymer material. The extent and shape of the cracks and/or microcracks may change under different formation conditions including humidity level, curing time and temperatures. The cracks and/or microcracks may develop by leaching or corrosion of the geopolymer material, a chemical attack by an acid or base, thermal shock, treatment with a fluid, or the like. Capillary pressure exerted on pore walls in the body of a geopolymer material may promote formation of the cracks and/or microcracks.

The fluid in 102 can include water or an aqueous solution (e.g., an acidic, basic, or buffer solution) or an organic solvent (e.g., an alcohol such as methanol and ethanol) or an organic solution (e.g., a ferric chloride ($FeCl_3.6H_2O$) solution in methanol). When the fluid includes an organic solvent, the organic solvent may be volatile and undergo evaporate while the fluid is in contact with a geopolymer resin material or a geopolymer material. The organic solvent may be more viscous than water. In some cases, the fluid is immiscible with the geopolymer resin material, miscible with water, or both. In certain cases, the fluid is an aqueous or organic solution or mixture including dissolved, dispersed or suspended species including molecules, metal precursors, metals, semiconductors, insulators, monomers, oligomers, polymers, macromers, ions, salts, biomaterials, surfactants, clusters, nanoparticles, nanomaterials, particles, fibers, fillers, inorganic particles, organic particles, inorganic compounds, organic compounds, solvated molecules, cations, anions, organic solvents, emulsions, fibers, foams, porous materials, quantum dots, magnetic materials, and others, including structure-directing agents or pore-templating agent such as quaternary ammonium ions, cyclodextrins, glucose, starch, cellulose fibers, surfactants, and the like, or a combination of thereof. Suitable surfactants include, for example, polymeric or polymerizable surfactants; cationic, anionic, or nonionic surfactants, and the like. One or more components in the fluid may react with (e.g., bond ionically or covalently to) one or more of the inorganic or organic components of a geopolymer resin material or a geopolymer material. In some implementations, these species may be added to the fluid after the fluid is contacted with a geopolymer resin material or a geopolymer material.

Contacting a geopolymer resin material or a geopolymer material with a fluid can include mixing, blending, shaking, shearing, homogenizing, agitating, stirring, sonicating and/or vibrating the geopolymer resin material or the geopolymer material with the fluid or crushing, pounding, grinding, pulverizing, milling, crumbling, smashing, mashing, pressing, or triturating the geopolymer resin material or the geopolymer material in the fluid. In certain cases, contacting a geopolymer resin material or a geopolymer material with the fluid includes soaking the geopolymer resin material or the geopolymer material in the fluid or rinsing the geopolymer resin material or the geopolymer material with the fluid.

Contacting a geopolymer resin material or a geopolymer material with a fluid may increase or decrease the temperature of the geopolymer resin material or the geopolymer material. The geopolymer resin material or the geopolymer material and the fluid may be at different temperatures before contacting. In some cases, contacting a geopolymer resin material or the geopolymer material with a fluid can be carried out at, above, or below room temperature, or when the fluid, the geopolymer resin material or the geopolymer material, or both are heated or cooled. In certain cases, contacting a geopolymer resin material or the geopolymer material with a fluid is carried out by condensation of the fluid onto and/or into the geopolymer resin material or the geopolymer material or under pressure.

In some cases, contacting a geopolymer resin material or a geopolymer material with a fluid causes one or more of the components of the fluid to transfer to the geopolymer resin material or the geopolymer material and/or one or more of the components of the geopolymer resin material or the geopolymer material (e.g., water) to transfer to the fluid. One or more of the components of the fluid may react with one or more of the components of the geopolymer resin material or the geopolymer material. The reaction may include, for example, acid-base neutralization or covalent bonding (e.g., crosslinking). In some cases, one or more of the components of the fluid bond covalently with one or more of the components of the geopolymer resin material or the geopolymer material. Contacting a geopolymer resin material or a geopolymer material with the fluid may cause a change in the pH, viscosity, or ionic strength of the geopolymer resin material or the geopolymer material. In some cases, contacting a geopolymer resin material with the fluid accelerates or decelerates curing of the geopolymer resin material.

Contacting a geopolymer resin material with a fluid may yield a homogeneous mixture. The homogeneous mixture may have a composition different from that of the geopolymer resin material (e.g., due at least in part to the dissolved, dispersed or suspended species). In some cases, the dissolved, dispersed or suspended species may alter the pH of the homogeneous mixture with respect to that of the geopolymer resin material, such that the homogeneous mixture has a pH different from that of the geopolymer resin material.

Contacting a geopolymer resin material or a geopolymer material with the fluid may yield a heterogeneous mixture of the geopolymer resin material or the geopolymer material and the fluid. In one example, contacting a geopolymer resin material with a fluid yields droplets of the geopolymer resin material dispersed in the fluid. In some cases, contacting a geopolymer resin material or a geopolymer material with a fluid causes breaking up or disintegration of the geopolymer resin material or the geopolymer material into particles. For example, a geopolymer resin material or a geopolymer material may disintegrate to form particles, agglomerates of particles and/or aggregates of particles, when it is contacted with a fluid such as water. In some cases, a dimension of the particles is in a range between 1 nm and 2 cm. The disintegration can yield a dispersion or suspension. In some cases, the particles are phase-separated by gravity or by flocculation. The particles may be formed with or without external mechanical stress (e.g., without a mechanical aid such as pressing, mixing, blending, shaking, shearing, homogenizing, agitating, stirring, sonicating, vibrating, and the like).

In 104, at least some of the fluid is removed to form a first product. Removing at least some of the fluid can include removal of dissolved species and/or exchange of the fluid with another fluid. The first product may differ (e.g., in composition, pH, etc.) from the geopolymer resin material or the geopolymer material. Removing the fluid may include decantation, filtration, centrifugation, drying, supercritical drying, freeze-drying, evaporation, dehydrating, heating, pyrolyzing, calcining, or the like. In some cases, removing the fluid includes flocculation, agglomeration, aggregation, coagulation or coalescence via addition of a clarifying agent, flocculant or coagulant. The fluid content may be controlled to improve mechanical properties (e.g., compressive strength) of the first product. In one example, when the first product is monolithic, fluid content is selectively controlled to reduce or avoid the cracks in the resulting material.

In process 100, contacting a geopolymer resin material or a geopolymer material with a fluid in 102 and/or subsequently removing at least some of the fluid in 104 can be carried out more than once with the same or different fluids.

In some cases, the first product is in the form of a dispersion or suspension. In other cases, a majority of the fluid is removed, yielding a particulate or powdered first product. A majority of the first product particulates may be smaller than 2 cm, 5 mm, 10 microns, 1 micron, or 100 nm. The particulate material may consist essentially of or may include a nanomaterial or nanostructured material (i.e., a material that consists of particulates, agglomerates of particles, and/or aggregates of particles for which the particles have one or more external dimensions in the size range 1-100 nm for more than about 50% of their number; and/or has internal or surface structures in one or more dimensions in the size range 1-100 nm; and/or has an external specific surface area by volume greater than 60 $m^2/cm^3$). The external specific surface area of a material may be estimated from gas sorption experiments, for example, as the difference between the Brunauer-Emmett-Teller (BET) surface area and the specific surface area from micropores in the material. The specific surface area from micropores can be estimated, for example, from the t-plot method. Examples of nanostructured materials include nanoparticles, nanorods, nanoribbons, nanosheets, nanoplates, nanowires, nanofibers and nanoporous materials.

The first product may exhibit macropores, mesopores, micropores, or a combination thereof (i.e., a hierarchically porous structure, for example). The first product may have a certain degree of crystallinity recognized, for example, when Bragg reflection peaks are present in the X-ray, electron and/or neutron diffraction pattern of the material. In some cases, the first product is (or includes) a zeolite, such as a nanostructured zeolite, a mesostructured zeolite or a hierarchically porous zeolite. In some cases, the geopolymer resin material or the geopolymer material includes a zeolite component.

Zeolites are typically described as crystalline aluminosilicates having ordered channel and/or cage structures and containing micropores which are preferably smaller than about 0.9 nm. The network structure of such zeolites consists of $SiO_4$ and $AlO_4$ tetrahedra that share oxygen bridges. Examples are zeolites having a pentasil structure, in particular the types assigned by X-ray analysis to the ABW, AGO, AEI, AEL, AEN, AET, AFG, AFI, AFN, AFO, AFR, AFS, AFT, AFX, AFY, AHT, ANA, APC, APD, AST, ATN, ATO, ATS, ATT, ATY, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESY, EUO, FAU, FER, GIS, GME, GOO, HEU, IFR, ISY, ITE, JBW, KFI, LAU, LEV, LIO, LOS, LOY, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSY, WIE, WEN, YUG and ZON structure and to mixed structures of two or more of thereof. Zeolites in which no aluminum is present are known and some zeolites a part of whose Si(IV) in their silicate lattice is replaced by titanium as Ti(IV) are also known, such as titanium zeolites. Some zeolite materials can further comprise additional elements such as aluminum, zirconium, tin, iron, cobalt, nickel, gallium, germanium, boron or small amounts of fluorine. A part or all of the titanium of the zeolite can be replaced by vanadium, zirconium, chromium or niobium or a mixture of two or more thereof. Some examples of zeolites are aluminophosphates whose network structures consist of $AlO_4$ and $PO_4$ tetrahedra that share oxygen bridges.

In 106, the first product from 104 is optionally treated to yield a second product. Treating the first product may include extracting, soaking, etching, melting, subliming, dissolving, decomposing, evaporating, heating, hydrothermally treating, solvothermally treating, ionothermally treating, combusting, calcining, etching, and the like. Heating the first product can cause dehydration, decomposition, pyrolysis, carbothermal reaction, combustion, or crystallization of the material. In some cases, heating the material can cause at least a portion of the pores, when present, to be closed and inaccessible. In some cases, heating the material can cause at least a portion of the pores, when present, to collapse. Treating the first product may result in removing, replacing, of adding a component (e.g., precipitating or depositing a component in some of the pores of the first product, impregnating the first product with an additive, forming a geopolymer composite, etc.) or altering the crystallinity or porosity to form a second product. Other examples of treating the first product include ion exchange processes, metatheses, and the like.

Optional treatment 106 can be carried out more than once with the same or different treatment process to alter the second product. In one example, the second product may be processed to yield a composite material (e.g., by contacting the first product with an additive including a gas, a liquid, a solid, or a combination thereof; impregnating the second product with inorganic particulates, organic particulates, inorganic compounds, organic compounds, biological materials, polymers, carbon, metals, and the like, or a combination thereof). Treating the second product can include altering the chemical composition, chemical structure, microstructural morphology or pore morphology of the second product.

Figure 1B:
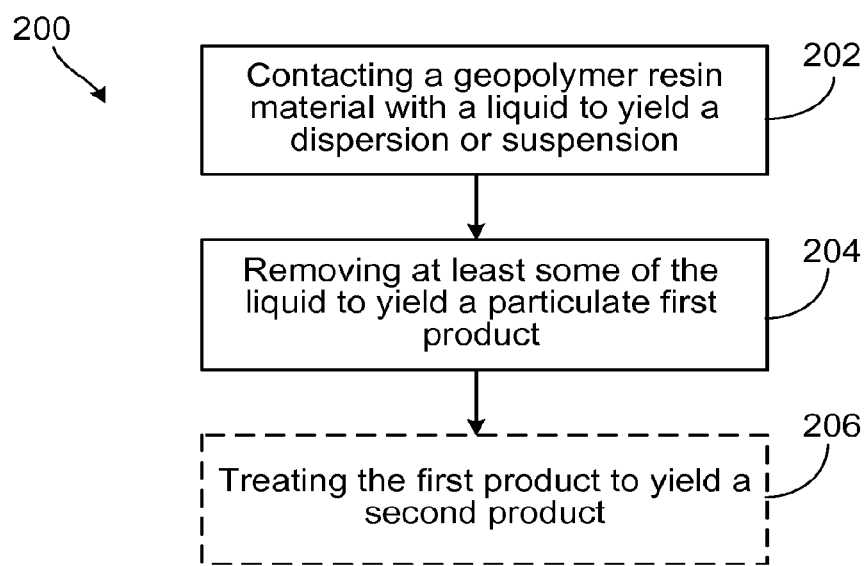

Process 200, shown in FIG. 1B, is an example of process 100. In 202, contacting a geopolymer resin material with a liquid produces a dispersion or suspension. In some cases, the liquid includes dissolved, dispersed, or suspended species. The liquid can be water or an organic solvent such as methanol. The liquid can be an aqueous solution (e.g, an aqueous cetyltrimethylammonium bromide (CTAB) solution) or an organic solution (e.g, a CTAB solution in ethanol). In 204, removing at least some (e.g., at least half or a majority) of the liquid yields a particulate first product. In some cases, the first product is in the form of a powder. The particles or powder may be in the form of a dispersion or suspension. A majority of the particles may be smaller than 1000 microns, smaller than 1 micron, or smaller than 100 nm. In optional 206, the first product is treated to yield a second product.

Figure 1C:
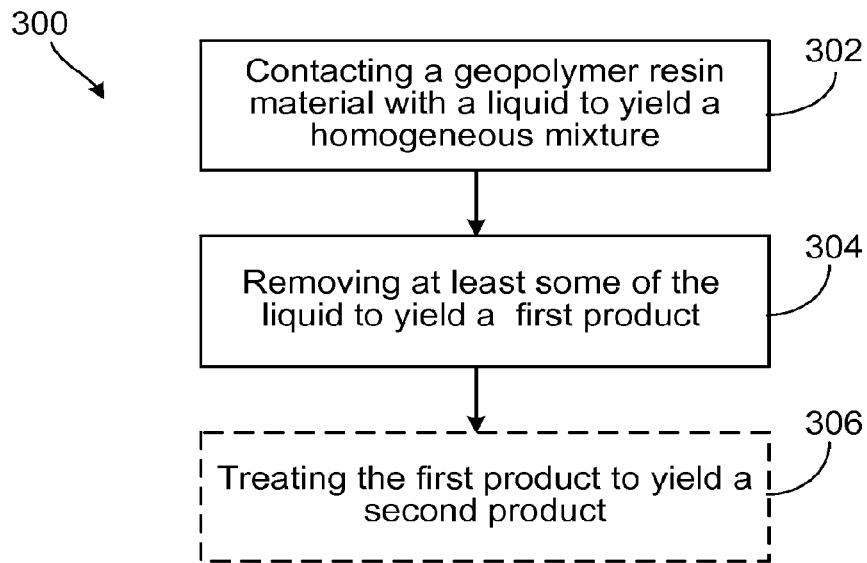

Process 300, shown in FIG. 1C, is an example of process 100. In step 302, contacting a geopolymer resin material with a liquid yields a homogeneous mixture having a composition and/or pH different from that of the geopolymer resin material. The liquid may include a dissolved, dispersed, or suspended species. The liquid can be water, an acidic solution (e.g., phosphoric acid), or a basic (or alkali) solution (sodium hydroxide). In some cases, the liquid is a pH buffer that contains biological materials. In certain cases, the liquid is a viscous liquid such as glycerol or ethylene glycol, and may include an additive, such as carbon black. In 304, removing at least some (e.g., at least half or a majority) of the liquid from the homogeneous mixture yields a first product. Removing at least some of the liquid may include pyrolysis or calcination. In an example, upon heating in an oxygen-limited environment, glycerol in a homogeneous mixture with a geopolymer resin material loses a majority of hydrogen, carbon, and oxygen to become a graphitic material. In another example, a mixture of glycerol containing carbon particles is mixed into a geopolymer resin material and the mixture heated to pyrolyze the glycerol. Process 300 may include 306, in which the first product is treated to yield a second product.

Figure 1D:
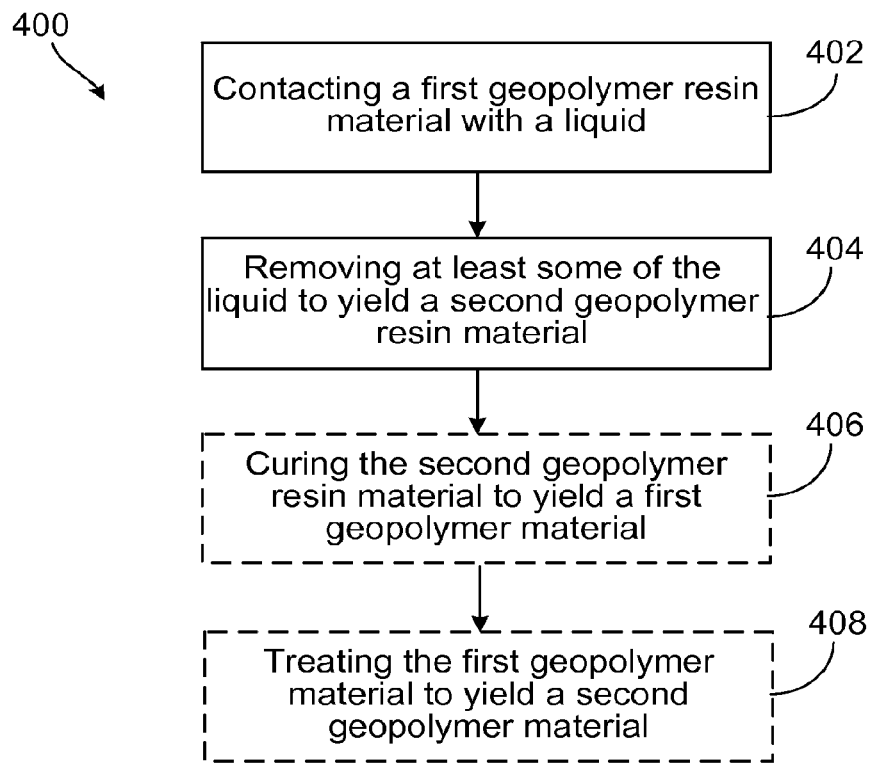

Process 400, shown in FIG. 1D, is an example of process 100. In 402, contacting a first geopolymer resin material with a liquid changes the composition and/or pH of the first geopolymer resin material. The liquid or solvent can be an organic liquid such as ethanol or tetrahydrofuran. In some cases, the liquid is immiscible with the first geopolymer resin material, or immiscible with the first geopolymer resin material but miscible with water. Contacting the first geopolymer resin material with the liquid may change the viscosity of the first geopolymer resin material. In an example, contacting the first geopolymer resin material with a liquid (e.g., ethanol) extracts water from the first geopolymer resin material and yields a heterogeneous mixture. The geopolymer resin material can be contacted with a liquid including dissolved, dispersed, or suspended species, thereby changing the composition and/or pH of the first geopolymer resin material. In some cases, contacting the first geopolymer resin material with the liquid causes a change in the ionic strength of the liquid and/or the geopolymer resin material or an acceleration or deceleration of the curing of the geopolymer resin material.

In 404, some (e.g., a portion, half, a majority) of the liquid is removed to form a second geopolymer resin material. The second geopolymer resin material has a composition and/or pH different from that of the first geopolymer resin material. The liquid may be removed by decantation, filtration, drying, freeze-drying, evaporation, dehydrating, heating, pyrolyzing, or calcining. The second geopolymer resin material may be cured in 406 to form a first geopolymer material. The first geopolymer material may be treated in 408 to form a second geopolymer material.

Figure 1E:
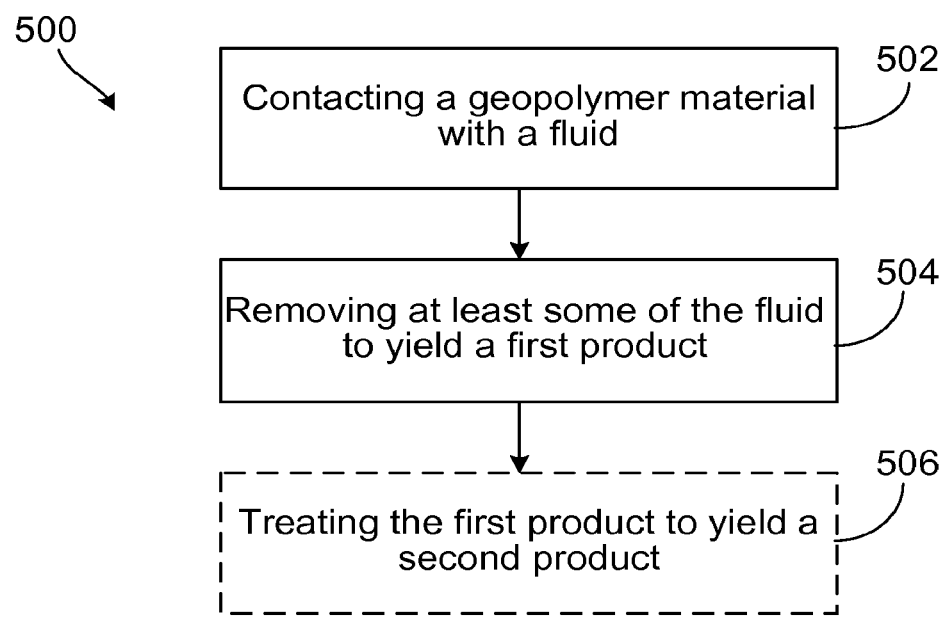

Process 500, shown in FIG. 1E, is an example of process 100. In 502, a first material including a geopolymer material is contacted with a fluid. Contacting a first material with a fluid may break up or disintegrate the first material. When the first material is in contact with the fluid, the first material may absorb the fluid to some extent through pores, cracks or microcracks in the body of the first material. In some cases, the absorbed fluid or its meniscus may exert a capillary pressure on pore walls, crack walls and/or microcrack walls in the body of the first material and thus may lead to the breakup or disintegration of the first material. In some cases, the absorbed fluid may weaken pore walls, crack walls and/or microcrack walls by hydration, etching, dissolution or the like and thus may lead to the breakup or disintegration of the first material. The extent of the breakup or disintegration may be affected by the temperature, the pressure, the amount and/or the composition of the fluid and/or by the shape, the size, the morphology, the composition and/or the production condition of the first material. The number, morphology, and size of the particulates generated by the breakup or disintegration may be affected by the temperature, pressure, amount and/or composition of the fluid and/or by the shape, size, morphology, composition and/or production condition of the first material. In 504, at least some of the fluid is removed to yield a first product. In optional 506, the first product is treated to yield a second product.

Although described in a particular order, the operations described above may be performed in a different order. Additionally, one or more of the operations may be omitted, or additional operations may be added. Details regarding the processes described in FIGS. 1B-1E are understood to be described with respect to FIG. 1A.

The particulates, composites, and materials described herein may be responsive to a chemical, a biological material, an electric field, a magnetic field, temperature, pressure, an electromagnetic wave, a mechanical force, or a combination of thereof. The particulates, composites, and materials can be used in a variety of ways including, but not limited to, as adsorbents, absorbents, nanoreactors, nanoglues, nanocontainers, nanocomposites, catalysts, catalyst supports, oxidizing agents, reducing agents, filters, chromatography media, ion exchange materials, separation materials, magnetic separation materials, membranes, gas/liquid/fuel storage materials, electrodes, sensors, electrical materials, electronic materials, magnetic materials, microwave absorbers, microwave-assisted heating materials, bio-implants, structure reinforcing materials, construction materials, solar energy collectors, supercapacitors, solar cell components, dielectrics, thermal insulation materials, sound insulation materials, fire retardants, paint thickeners, matting agent, packaging materials, refractories, additives, ink-jet coatings, porous binders, porous fillers, ionic conductors, bioreactors, culture media, culture supports, bone replacement materials, active battery components, battery separators, thermal composites (e.g., porous geopolymers impregnated with a thermal energy storage material, a phase change compound, a thermochemical energy storage material, or a magnetocaloric material), toxin removal materials, chemical removal materials, waste removal materials, hazard removal materials, chemical decontaminants, bioactive decontaminants, odor elimination materials, oil spill cleanup materials, arsenic removal materials, heavy metal removal materials, nuclear waste removal materials, energetic materials, evaporative chillers/heaters, aroma delivery materials, flavor delivery materials, drug delivery materials, sanitizer delivery materials, herbicide delivery materials, fungicide delivery materials, pesticide delivery materials, insecticide delivery materials, plant nutrient delivery materials, fertilizer materials, plant growing media, green roof materials, hydroponics support media, potting materials, animal nutrient delivery materials, human nutrient delivery materials, water purification materials, soil stabilization materials, wetting agents, water absorption materials, water adsorption materials, water collection materials, water retention materials, humidity control material, pet litter absorption materials, vapor sorption materials, gas sorption materials, oil sorption materials, oil extraction materials, algae oil nanofarming materials, selective solid-phase extraction materials, desiccants, proppant materials, hemostats, and the like. The particulates, composites, and materials described herein can be also used as a template or a mask to produce porous materials, including porous polymers and porous ceramics.

The following examples are provided for illustration. It should be appreciated by those of skill in the art that the techniques disclosed in the following examples are considered to be exemplary. However, those of skill in the art should, in light of the present disclosure, appreciate that many changes can be made in the specific embodiments that are disclosed without departing from the spirit and scope of this disclosure.

EXAMPLES

Example 1 illustrates an implementation of process 200, in which particles were produced by mixing a geopolymer resin with water and subsequently by removing the water. Example 2 illustrates another implementation of process 200, in which particles were produced by using an aqueous solution including cetyltrimethylammonium bromide (CTAB), a cationic surfactant. Example 3 is similar to Example 2, but metakaolin (PowerPozz®) was used instead of metakaolinite, and the mixture solution was stirred at a different speed with a different type of stirrer. Example 4 illustrates another implementation of process 200, in which a viscous dispersion of particles was produced by using an aqueous solution including cetyltrimethylammonium bromide (CTAB), a cationic surfactant and subsequently by purifying and concentrating the particle dispersion in water. Example 5 illustrates another implementation of process 200, in which particles were produced by using a $H_3PO_4$ aqueous solution. In 206, the particles or powder material are treated to form a new material.

Example 6 illustrates another implementation of process 200, in which a geopolymer resin material which was soft or semi-rigid, was immersed in water with a gentle shaking, it disintegrated into particles dispersed in water. The particles have a faujasite-type (FAU) structure (a zeolite). Example 7 is similar to Example 6, but the geopolymer resin material was a solid which was later partially disintegrated when immersed in water. The particles have a sodalite-type (SOD) structure (a zeolite).

Example 8 is similar to Example 6, but the particles were produced by immersing a paste-like geopolymer resin material in water at room temperature and subsequently by washing the paste multiple times so that the pH of the particle dispersion became close to 7. The resulting particles showed a faujasite-type (FAU) structure with additional nanopores in the particle bodies.

Example 9 illustrates another implementation of process 200, in which a geopolymer resin material in a soft solid form was prepared by mixing a geopolymer resin with canola oil and subsequently by incompletely or partially curing the resin. The solid was easy to break by hand. The geopolymer resin material was immersed in hot water in which it disintegrated into particles over time. The particles showed a faujasite-type (FAU) structure with additional nanopores in the particle bodies. Examples 10 and 11 are similar to Example 9, but the geopolymer resins had different chemical compositions. Example 12 is similar to Examples 9-11, but waste vegetable oil was used instead of canola oil. Example 24 illustrates one implementation of process 200 in which particulates were produced by treating a geopolymer resin with nominal Na:Al:Si atomic ratios of 3:1:2 in water and subsequently by removing the water. Example 25 is similar to Example 24, but the geopolymer resin includes canola oil as an additional precursor. In Examples 42 and 43, fly ash is used as a source of aluminosilicates.

Example 14 illustrates an implementation of process 300, in which an aluminosilicate geopolymer resin was mixed with a concentrated phosphoric acid to produce a homogenous mixture with a pH of about 7. The mixture was dried in an oven to remove a majority of water to give a monolithic material. Example 15 is similar to Example 14, but a sulfuric acid was used instead of phosphoric acid. Example 16 is similar to Example 14, but acetic acid was used instead of phosphoric acid. Example 17 is similar to Example 14, but included concentrated phosphoric acid solution premixed with $TiO_2$ nanoparticles. Example 18 illustrates another implementation of process 300, in which a viscous liquid was employed. A viscous carbon-glycerol mixture was first prepared by mixing carbon black particles with glycerol. The mixture was then mixed with a geopolymer resin and applied on a glass slide as a thin coating. The coating was pre-treated in an oven and finally heated at 500° C. under a flow of argon gas to give an electrically conductive coating. Example 19 illustrates that contacting the geopolymer resin material with a liquid can be carried out multiple times with different liquids. An aluminosilicate geopolymer resin was mixed with a concentrated phosphoric acid to yield a homogenous mixture with a pH of about 7. A buffer solution (pH 7) was added to the mixture to yield another homogeneous mixture. Example 20 also illustrates the utilization of multiple liquids. An aluminosilicate geopolymer resin was mixed first with concentrated phosphoric acid to produce a homogenous mixture with a pH of about 7. The homogenous mixture was then mixed with an aqueous solution containing CTAB, to eventually yield particles. Example 21 illustrates another implementation of process 300, in which a viscous dispersion of particles was produced by using a phosphoric acid and then an aqueous solution including cetyltrimethylammonium bromide (CTAB), a cationic surfactant, and subsequently purifying and concentrating the particle dispersion.

Example 13 illustrates one implementation of process 300, but the process was carried out multiple times to form a new material. A solution of ferric chloride ($FeCl_3.6H_2O$) in methanol was mixed into a geopolymer resin while stirring. Most of the methanol evaporated during stirring to give a geopolymer resin material which was a red-brown powder paste. Canola oil was mixed into the geopolymer resin material to provide a new geopolymer resin material which was like a paste. The new geopolymer resin material was heated in an oven to remove most of the methanol and some of the water present to yield another new geopolymer resin material which was dry. The geopolymer resin material was further heated at 600° C. under a flow of argon gas to yield a black powder.

Example 22 illustrates an implementation of process 400. A geopolymer resin was shaken with ethanol in a closed container and left still. After the resin and ethanol were separated by gravity, the ethanol supernatant was decanted. After repeating the procedure four more times, the resin become more viscous than the original resin. The new resin material was then heated at 110° C. to produce a geopolymer material. Example 23 is similar to Example 22, except that a geopolymer resin containing glycerol was used in place of the geopolymer resin that contained only inorganic components.

Examples 26 to 34 illustrate implementations of process 500 in which the geopolymer resin material can have various compositions and can be cured in various molds under various conditions, which affect the size and shape of the resulting geopolymer material particles. Examples 35 to 41 illustrate implementations of process 500 in which the geopolymer resin materials contain potassium ions instead of sodium ions. Among these examples, Examples 40 and 41 illustrate implementations of process 500 in which the temperature of the treating fluid affects the morphology of the product.

Example 1

0.73 g of NaOH was dissolved in 0.95 g of deionized water into which 12.22 g of sodium silicate (~10.6% $Na_2O$, ~26.5% $SiO_2$) was added subsequently. The solution was stirred until it became homogeneous by visual inspection. In the solution, 6.10 g of metakaolinite was added and stirred until the solution became visually homogeneous, to produce a geopolymer resin. 140 ml of deionized water was poured into the geopolymer resin and stirred for about a minute. The mixture was then homogenized with a homogenizer (IKA T 25 digital ULTRA-TURRAX®) at 10000 rpm for about 10 min. Once the stirring was stopped, the resulting particles were precipitated by the addition of methanol, filtered and dried to give a powder product. The product showed a better dispersibility in water than in chloroform. The product showed a nitrogen sorption Brunauer-Emmett-Teller (BET) surface area of about 18.1 $m^2/g$.

Example 2

Figure 2A:
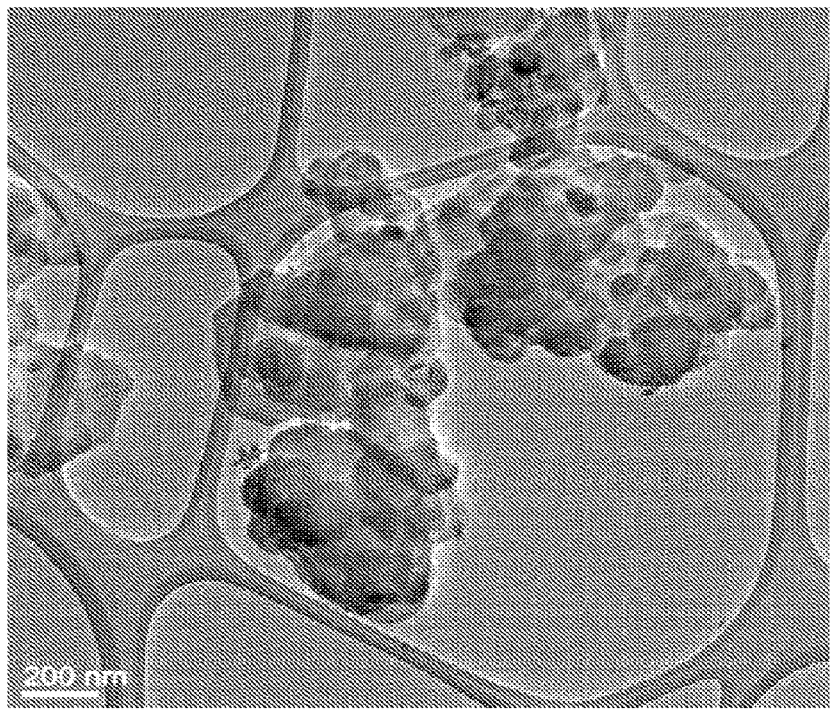
FIGS. 2A and 2B show transmission electron microscopy (TEM) and scanning electron microscopy (SEM) images, respectively, of the product in Example 2.
Figure 2B:
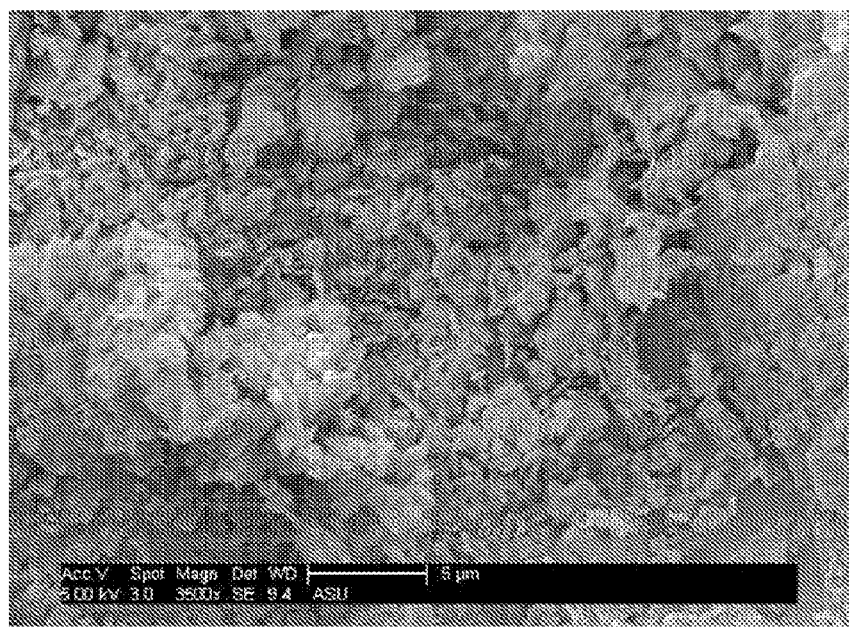

0.73 g of NaOH was dissolved in 0.95 g of water into which 12.22 g of sodium silicate (~10.6% $Na_2O$, ~26.5% $SiO_2$) was added subsequently. The solution was stirred until it became homogeneous by visual inspection. In the solution, 6.10 g of metakaolinite was added and stirred until the solution became visually homogeneous, to produce a geopolymer resin. In a separate container, 0.240 g of cetyltrimethylammonium bromide (($C_{16}H_{33}$)N($CH_3$)$_3$Br, CTAB) was dissolved in 140 ml of deionized water. The aqueous CTAB solution was poured into the was poured into the geopolymer resin and stirred for about a minute. The mixture was then homogenized with a homogenizer (IKA T 25 digital ULTRA-TURRAX®) at 10000 rpm for about 10 min. Once the stirring was stopped, the resulting particles were precipitated, filtered and dried to give a powder product. The product showed a better dispersibility in chloroform than in water, indicating that the particles were hydrophobic to some extent. The CHN analysis showed that the material contained 2.475 wt % carbon and 0.132 wt % nitrogen. The product showed a nitrogen sorption Brunauer-Emmett-Teller (BET) surface area of about 22 m$^2$/g. After calcined at 750° C. for 10 h, the weight loss was 9.3%. The Na:Al:Si ratios of the calcined product were 1:4.8:6.2 from ICP results. FIGS. 2A and 2B show transmission electron microscopy (TEM) and scanning electron microscopy (SEM) images of the product.

Example 3

0.73 g of NaOH was dissolved in 0.95 g of water into which 12.22 g of sodium silicate (~10.6% Na$_2$O, ~26.5% SiO$_2$) was added subsequently. The solution was stirred until it became homogeneous by visual inspection. In the solution, 6.10 g of metakaolin (PowerPozz™) was added and stirred until the solution became visually homogeneous, to produce a geopolymer resin. In a separate container, 0.240 g of cetyltrimethylammonium bromide (($C_{16}H_{33}$)N(CH$_3$)$_3$Br, CTAB) was dissolved in 140 ml of deionized water. The aqueous CTAB solution was poured into the geopolymer resin and stirred with a mechanical stirrer (STIR-PAK Model 4554-10, Cole Parmer) for about 30 min. Once the stirring was stopped, the resulting particles were precipitated, filtered and dried to give a powder product. The product showed a better dispersibility in chloroform than in water, indicating that the particles were hydrophobic to some extent.

Example 4

7.3 g of NaOH was dissolved in 9.5 g of water into which 122.2 g of sodium silicate (~10.6% Na$_2$O, ~26.5% SiO$_2$) was added subsequently. The solution was stirred until it became homogeneous by visual inspection. In the solution, 61.0 g of metakaolinite was added and stirred until the solution became visually homogeneous, to produce a geopolymer resin. In a separate container, 2.4 g of cetyltrimethylammonium bromide (($C_{16}H_{33}$)N(CH$_3$)$_3$Br, CTAB) was dissolved in 1400 ml of deionized water. 100 ml of the aqueous CTAB solution was poured into the geopolymer resin and stirred for about a minute. The mixture was then homogenized with a homogenizer (IKA T 25 digital ULTRA-TURRAX®) at 10000 rpm for about 10 min. Then, the rest of the CTAB solution was poured into the mixture, and the mixture was stirred with a mechanical stirrer (STIR-PAK Model 4554-10, Cole Parmer) for about 30 min. After the stirring was stopped, the resulting suspension was centrifuged and washed with deionized water more than three times. After a final centrifugation at 2000 rpm for less than 10 min, the supernatant was decanted to produce a viscous particle dispersion containing 62 wt % water.

Example 5

25.0 g of NaOH was dissolved in 71.5 g of water. The solution was stirred until it became homogeneous by visual inspection. In the solution, 60.0 g of metakaolinite was added and stirred until the solution became visually homogeneous, yielding a geopolymer resin. While the solution was chilled in an ice bath, 35.5 g of conc. H$_3$PO$_4$ (85%) was gradually added. The solution was stirred for about 15 min to give a homogenous mixture. Once the stirring was stopped, the resulting particles were precipitated, filtered and dried to give a powder product. The product showed a better dispersibility in water than in chloroform, indicating that the particles were hydrophilic to some extent.

Example 6

6.85 g of NaOH was dissolved in 12.32 g of water into which 17.61 g of sodium silicate (~10.6% Na$_2$O, ~26.5% SiO$_2$) was added subsequently. The solution was stirred at 800 rpm with a laboratory mixer (IKA RW 60 digital mixer), until it became homogeneous by visual inspection. Into the solution, 6.17 g of metakaolin (MetaMax®) was added and stirring was continued at 800 rpm for 35 min, which yielded a geopolymer resin having approximate nominal Na:Al:Si atomic ratios of 3:1:2. This resin material was transferred into a tightly-closed polypropylene container and was heated at 60° C. in a laboratory oven (Yamato DKN400) to provide a geopolymer resin material. Small amounts of the material were withdrawn after 24, 48, and 72 h. The resin material samples were soft and could be deformed by hand even after 72 h of heating. They disintegrated into fine particles when placed in water with a gentle shaking. FIGS. 3A and 3B show the powder X-ray diffraction patterns for the samples withdrawn after 24 and 72 h, respectively, in which most of the Bragg peaks can be assigned to a faujasite-type (FAU) structure. The particle dispersion produced from the sample resin material withdrawn after 48 h was then heated in a copious amount of water at 90° C. for 24 h. After the heating, the water was removed from the dispersed particles by centrifugation and subsequent decantation and drying in a lab oven. Its powder X-ray diffraction pattern is shown in FIG. 3C. FIG. 3D, shown for comparison, is a simulated pattern of a NaX zeolite with a faujasite-type (FAU) structure.

Example 7

6.85 g of NaOH was dissolved in 12.32 ml of water into which 17.61 g of sodium silicate (~10.6% Na$_2$O, ~26.5% SiO$_2$) was added subsequently. The solution was stirred at 800 rpm with a laboratory mixer (IKA RW 60 digital mixer), until it became homogeneous by visual inspection. Into the solution, 6.17 g of metakaolin (MetaMax®) was added and stirring was continued at 800 rpm for 35 min, which yielded a geopolymer resin having approximate nominal Na:Al:Si atomic ratios of 3:1:2. This resin material was transferred into an open propylene beaker and was heated at 60° C. for 7 days in a laboratory oven (Yamato DKN400) to give a geopolymer resin material which was a homogeneous and hard solid. About 5 g of the resin material was then placed in 100 ml of deionized water and heated at 90° C. for 24 h. Partial disintegration of the resin material into particles was observed during the heating in water. The water was removed first from the particles by decantation. The particles were gently ground further and dried in a lab oven at 110° C. overnight. The final product exhibited pores with a Barret-Joyner-Halenda (BJH) cumulative volume (pore sizes from 2 to 300 nm) of 0.3 cm$^3$/g and an average pore size of 17 nm. The nitrogen Brunauer-Emmett-Teller (BET) surface area was 115 m$^2$/g. A powder X-ray diffraction pattern of the product is shown in FIG. 4, in which most of the Bragg peaks can be assigned to a sodalite-type (SOD) structure shown by the stick spectrum.

Example 8

6.8 g of NaOH was dissolved in a mixture of 12.3 ml of water and 17.6 g sodium silicate solution (59% H$_2$O, 27%

Figure 5A:
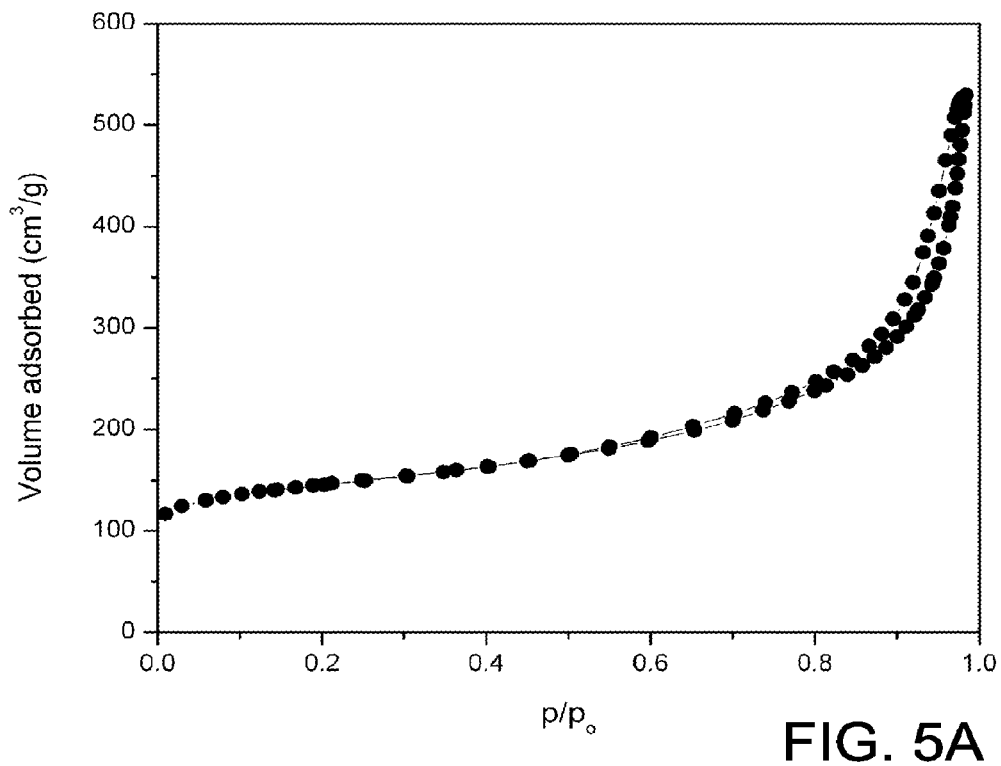
FIGS. 5A, 5B, 5C, and 5D show the nitrogen gas sorption isotherm, Barret-Joyner-Halenda (BJH) pore size distribution, scanning electron micrographs (SEM) and the powder X-ray diffraction pattern (along with the simulated pattern of a NaX zeolite (FAU) and anatase), respectively, of the sample in Example 8.
Figure 5B:
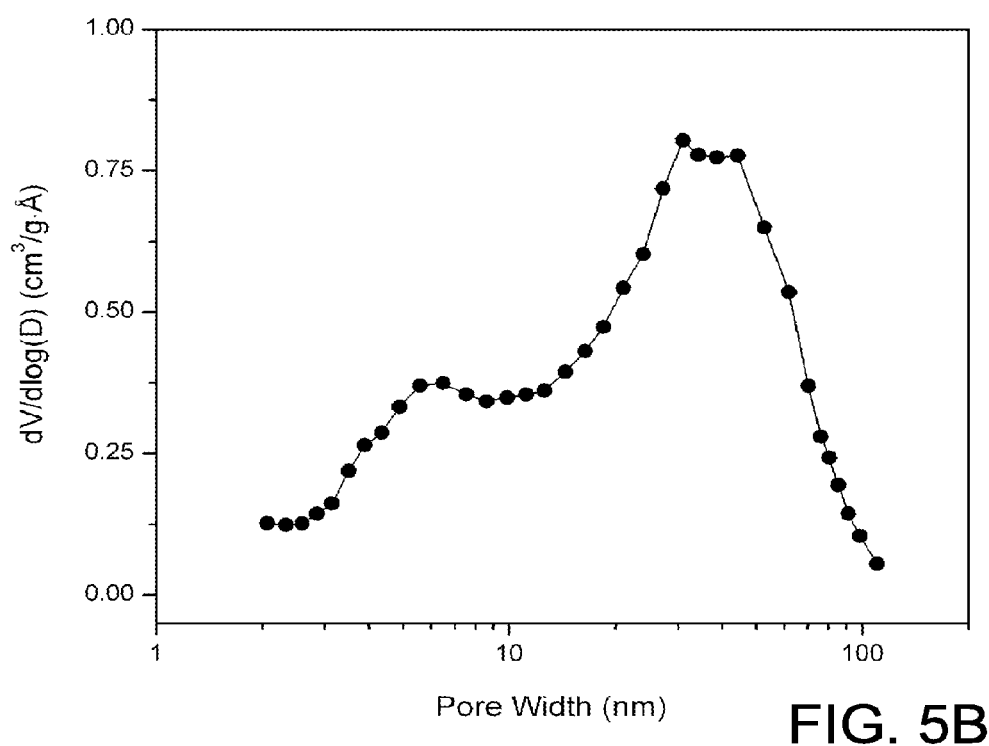
Figure 5C:
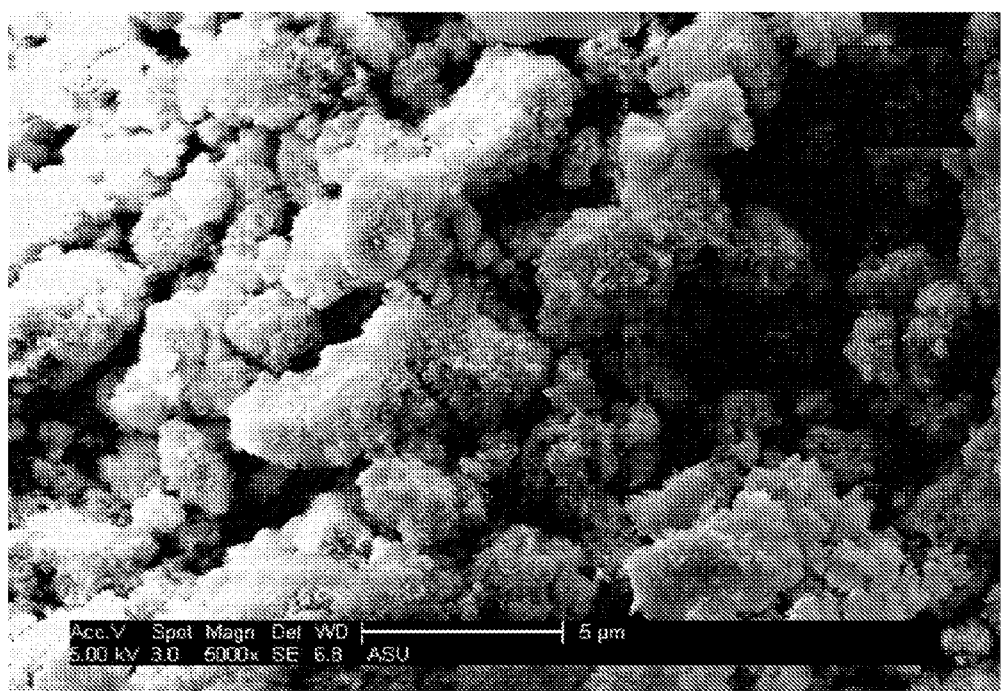
Figure 5D:
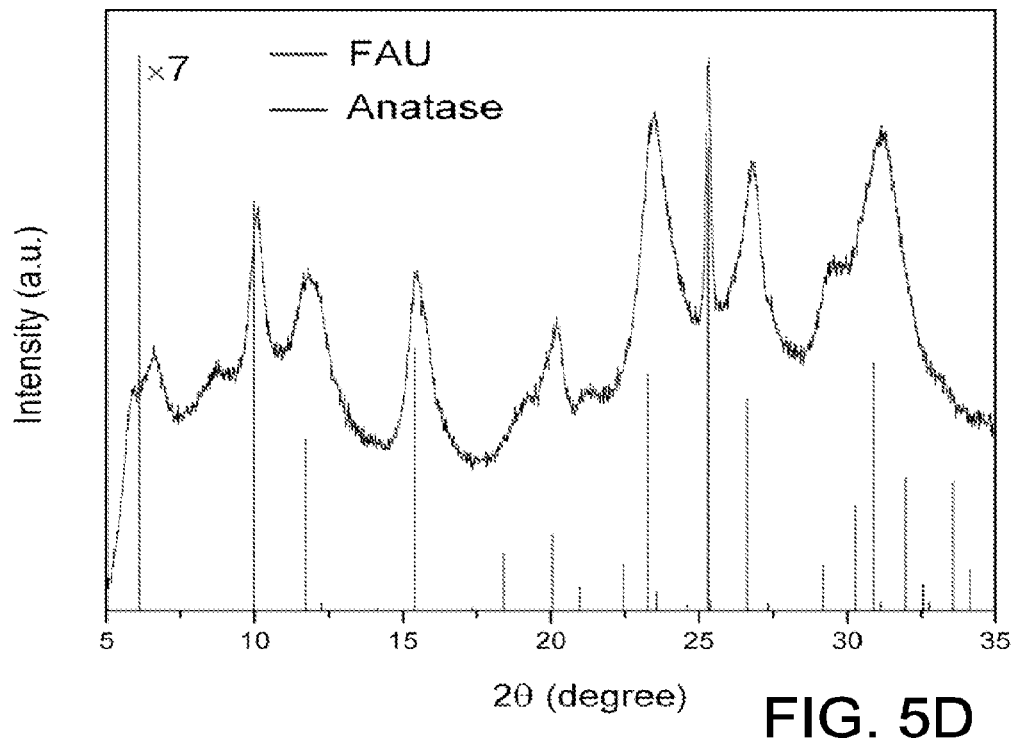

SiO$_2$ and 14% NaOH). In the solution, 8.6 g of metakaolin (MetaMax®) was added and stirred at 800 rpm for 40 min using a laboratory mixer (IKA RW 60 digital mixer), which yielded a geopolymer resin having approximate nominal Na:Al:Si atomic ratios of 3:1:2. This liquid was transferred into a tightly-closed polypropylene container and was heated at 60° C. for 24 h in a laboratory oven (Yamato DKN400) to give a paste-like geopolymer resin material. The resin material was placed in a copious amount of deionized water at room temperature and gently ground, which produced particles in the water. The particles were repeatedly washed to reduce the pH of the particle dispersion down to about 7. The resulting particles were collected by centrifugation at 6000 rpm for 10 min and dried at 85° C. overnight. These particles exhibited a nitrogen Brunauer-Emmett-Teller (BET) surface area of 497 m$^2$/g of which 279 m$^2$/g was from micropores. The Barret-Joyner-Halenda (BJH) desorption cumulative pore volume of these particles was 0.82 cm$^3$/g and the micropore volume was 0.13 cm$^3$/g. Barret-Joyner-Halenda (BJH) desorption pore width of 12 nm was observed. FIGS. 5A, 5B and 5C show a nitrogen sorption isotherm, pore size distribution and scanning electron microscope images of this product, respectively. FIG. 5D is an X-ray diffraction pattern of the product, which shows Bragg peaks in its X-ray diffraction pattern that can be assigned to a faujasite-type (FAU) structure shown by the stick spectrum.

Example 9

Figure 6:
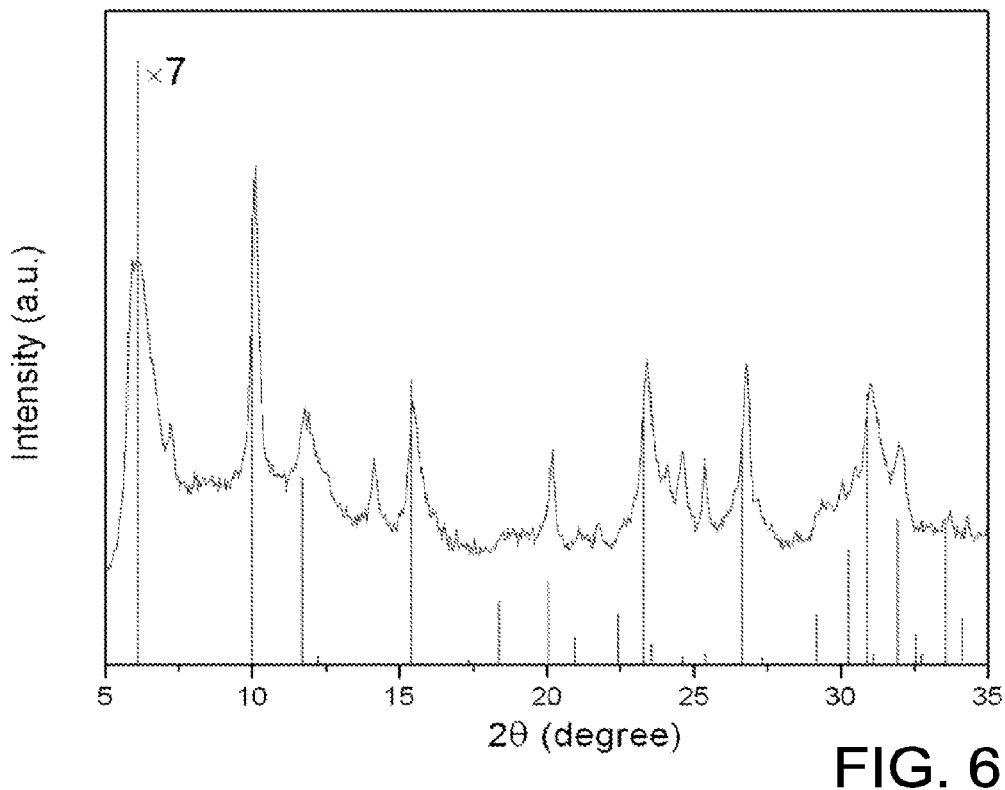
FIG. 6 shows the powder X-ray diffraction pattern of the sample in Example 9 along with the simulated pattern of a NaX zeolite with a faujasite-type (FAU) structure.

4.19 g of NaOH was dissolved in 8.64 ml of water into which 1.85 g of sodium silicate (~10.6% Na$_2$O, ~26.5% SiO$_2$) was added subsequently. The solution was stirred at 800 rpm with a laboratory mixer (IKA RW 60 digital mixer), until it became homogeneous by visual inspection. Into the solution, 6.17 g of metakaolin (MetaMax®) was added and stirring was continued at 800 rpm for 35 min, which yielded a geopolymer resin having approximate nominal Na:Al:Si atomic ratios of 2:1:1.15. Into the mixture 9.7 ml of canola oil was added and the stirring was continued at 800 rpm for 10 min, which yielded a viscous homogeneous geopolymer resin material. This liquid was poured into a tightly-closed polypropylene container and was heated at 60° C. for 2 days in a laboratory oven (Yamato DKN400) to give a solid geopolymer resin material which was soft and easy to break up with hand. About 5 g of the solid was then placed in 100 ml of deionized water and heated at 90° C. for 24 h during which the solid disintegrated into particles in water. The water was removed from the particles by decantation and then replaced with fresh deionized water and heated at 90° C. for 24 h, which was repeated two times. The water was then decanted from the particles and the particles were rinsed with deionized water for 2 min and dried in a lab oven at 110° C. overnight. The final product exhibited pores with a Barret-Joyner-Halenda (BJH) cumulative volume (pore sizes from 2 to 300 nm) of 0.15 cm$^3$/g and an average pore size of 8 nm. The micropore volume was 0.10 cm$^3$/g. The nitrogen Brunauer-Emmett-Teller (BET) surface area was 283 m$^2$/g, of which 207 m$^2$/g was from micropores. A powder X-ray diffraction pattern of the product is shown in FIG. 6, in which most of the Bragg peaks can be assigned to a faujasite-type (FAU) structure shown in the stick spectrum.

Example 10

Figure 7:
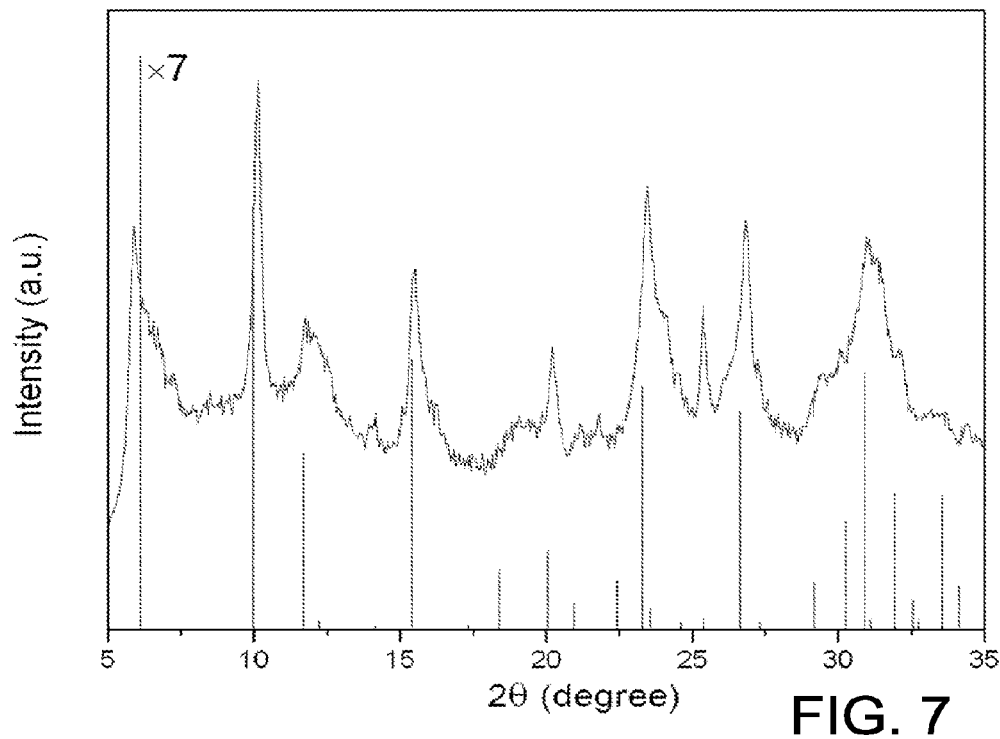
FIG. 7 shows the powder X-ray diffraction pattern of the sample in Example 10 along with the simulated pattern of a NaX zeolite with a faujasite-type (FAU) structure.

3.99 g of NaOH was dissolved in 8.11 ml of water into which 3.09 g of sodium silicate (~10.6% Na$_2$O, ~26.5% SiO$_2$) was added subsequently. The solution was stirred at 800 rpm with a laboratory mixer (IKA RW 60 digital mixer), until it became homogeneous by visual inspection. Into the solution, 6.17 g of metakaolin (MetaMax®) was added and stirring was continued at 800 rpm for 35 min, which yielded a geopolymer resin having approximate nominal Na:Al:Si atomic ratios of 2:1:1.25. Into the mixture, 9.7 ml of canola oil was added and the stirring was continued at 800 rpm for 10 min, which yielded a viscous homogeneous geopolymer resin material. This liquid was poured into a tightly-closed polypropylene container and was heated at 60° C. for 2 days in a laboratory oven (Yamato DKN400) to give a solid geopolymer resin material which was soft and easy to break up with hand. About 5 g of the solid was then placed in 100 ml of deionized water and heated at 90° C. for 24 h during which the solid disintegrated into particles in water. The water was removed from the particles by decantation and then replaced with fresh deionized water and heated at 90° C. for 24 h, which was repeated two times. The water was then decanted from the particles and the particles were finally rinsed with deionized water for 2 min and dried in a lab oven at 110° C. overnight. The final product exhibited pores with a Barret-Joyner-Halenda (BJH) cumulative volume (pore sizes from 2 to 300 nm) of 0.17 cm$^3$/g and an average pore size of 7 nm. The micropore volume was 0.07 cm$^3$/g. The nitrogen Brunauer-Emmett-Teller (BET) surface area was 254 m$^2$/g of which 144 m$^2$/g was from micropores. Powder X-ray diffraction pattern of the product is shown in FIG. 7, in which most of the Bragg peaks can be assigned to a faujasite-type (FAU) structure shown by the stick spectrum.

Example 11

Figure 8A:
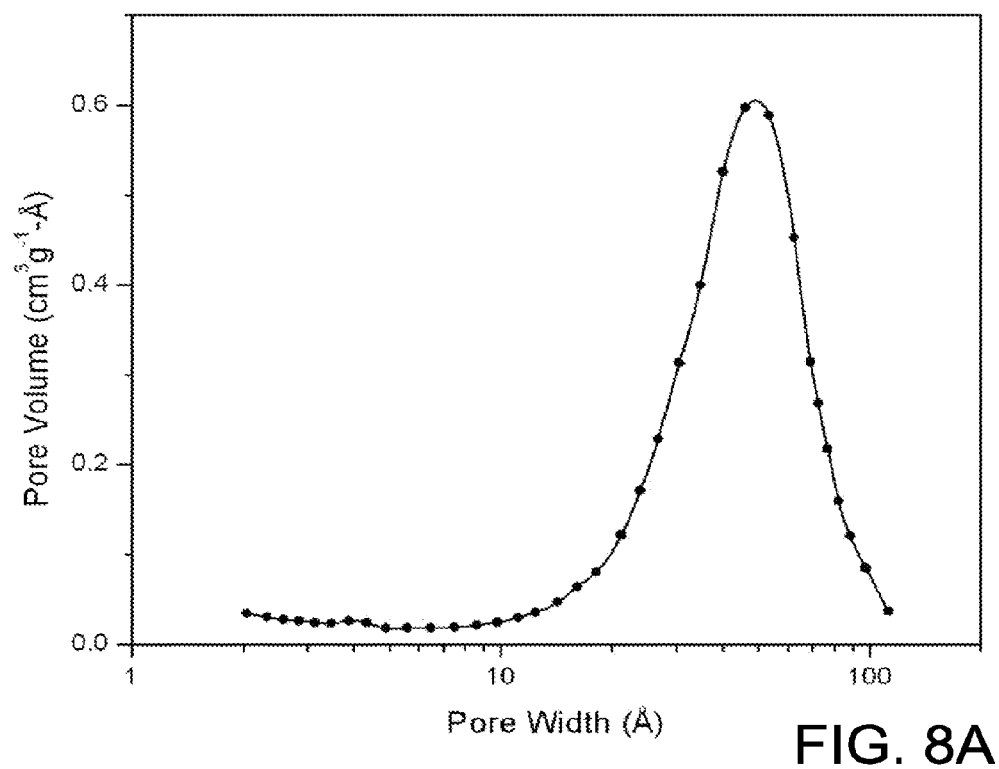
FIGS. 8A, 8B, 8C, 8D, and 8E show the Barret-Joyner-Halenda (BJH) pore size distribution, nitrogen gas sorption isotherm, the powder X-ray diffraction pattern (along with the simulated pattern of a NaX zeolite (FAU)), a scanning electron micrograph (SEM) and a transmission electron micrograph (TEM), respectively, of the sample in Example 11.
Figure 8B:
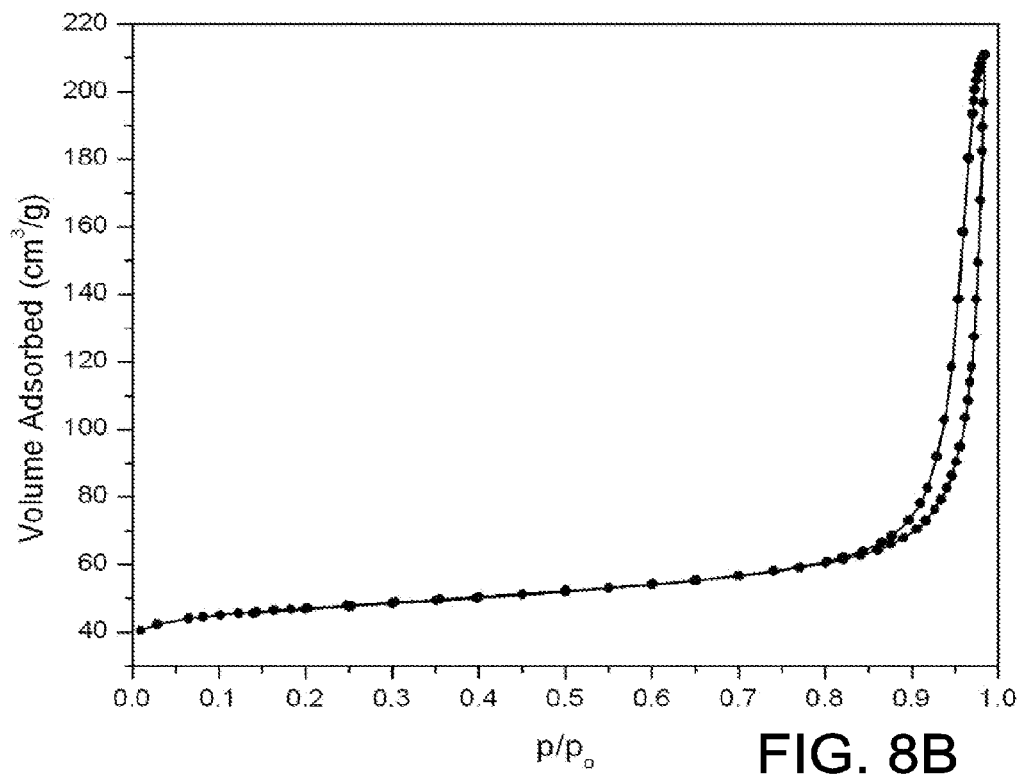
Figure 8C:
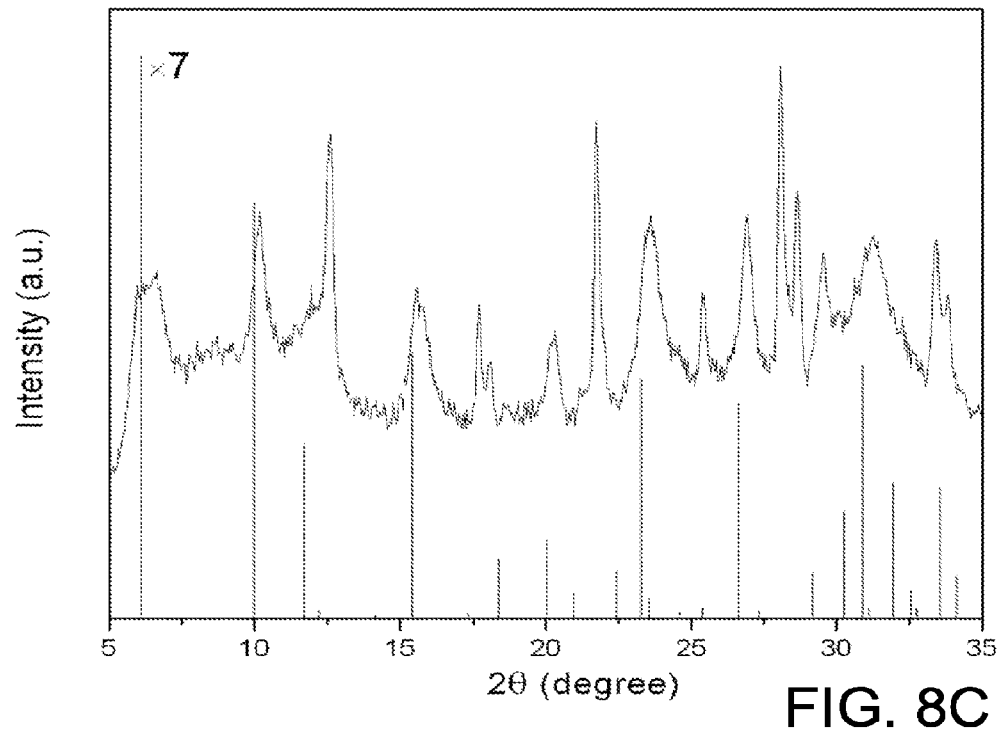
Figure 8D:
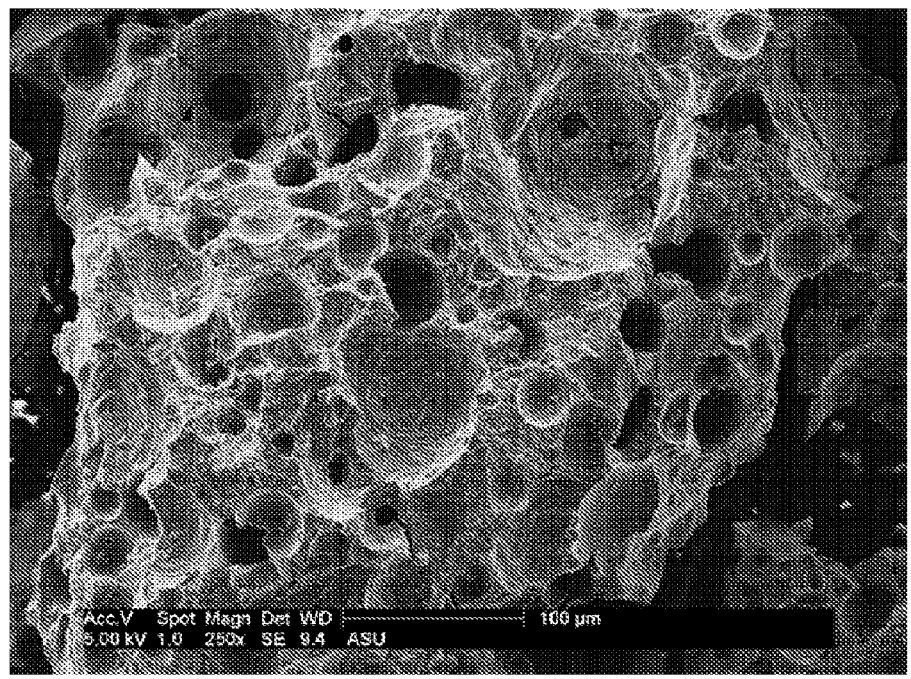
Figure 8E:
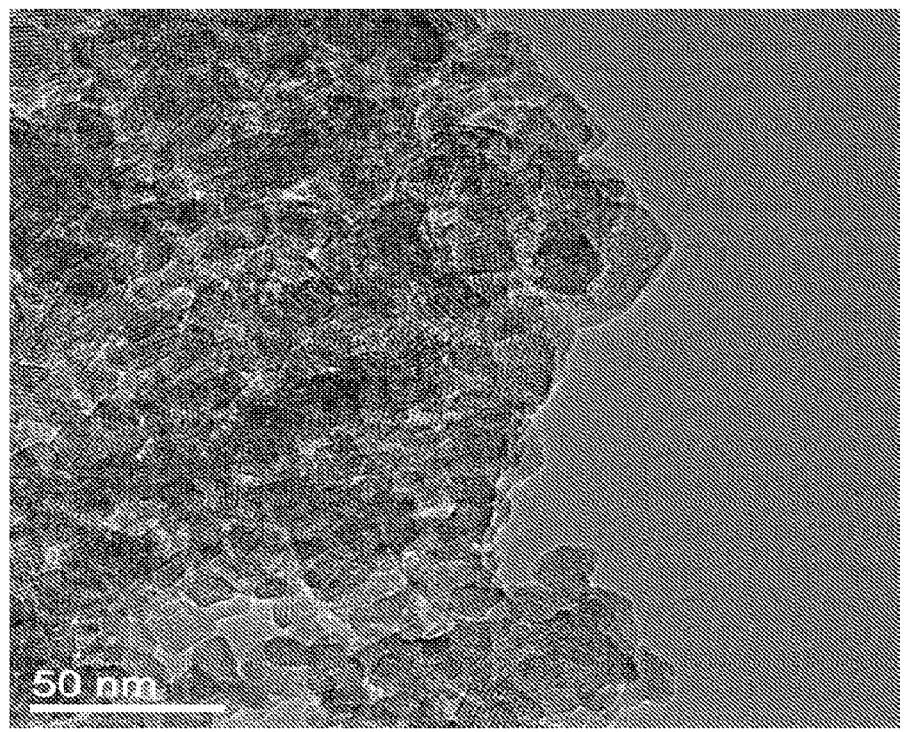

3.04 g of NaOH was dissolved in 3.35 ml of water into which 7.75 g of sodium silicate (~10.6% Na$_2$O, ~26.5% SiO$_2$) was added subsequently. The solution was stirred at 800 rpm with a laboratory mixer (IKA RW 60 digital mixer), until it became homogeneous by visual inspection. Into the solution, 3.80 g of metakaolin (MetaMax®) was added and stirring was continued at 800 rpm for 35 min, which yielded a geopolymer resin having approximate nominal Na:Al:Si atomic ratios of 3:1:2. Into the mixture, 8.0 ml of canola oil was added and the stirring was continued at 800 rpm for 10 min, which yielded a viscous homogeneous geopolymer resin material. This liquid was poured into a tightly-closed polypropylene container and was heated at 60° C. for 2 days in a laboratory oven (Yamato DKN400) to give a solid geopolymer resin material which was soft and easy to break up with hand. About 5 g of the solid was then placed in 100 ml of deionized water and heated at 90° C. for 24 h during which the solid disintegrated into particles in water. The water was removed from the particles by decantation and then replaced with fresh deionized water and heated at 90° C. for 24 h, which was repeated two times. The water was then decanted from the particles and the particles were finally rinsed with deionized water for 2 min and dried in a lab oven at 110° C. overnight. The final product exhibited pores with a Barret-Joyner-Halenda (BJH) cumulative volume (pore sizes from 2 to 300 nm) of 0.54 cm$^3$/g and an average pore size of 11 nm. The micropore volume was 0.13 cm$^3$/g. The Barret-Joyner-Halenda (BJH) pore distribution is shown in FIG. 8A. The nitrogen Brunauer-Emmett-Teller (BET) surface area was 467 m$^2$/g of which 289 m$^2$/g was from micropores. The nitrogen sorption isotherm is shown in FIG. 8B. A powder X-ray diffraction pattern of the product is shown in FIG. 8C, in which most of the Bragg peaks can be assigned to a faujasite-type (FAU) structure shown by the stick spectrum. FIGS. 8D and 8E show a scanning electron micrograph (SEM) and a transmission electron micrograph (TEM), respectively, of the product.

Example 12

Figure 9:
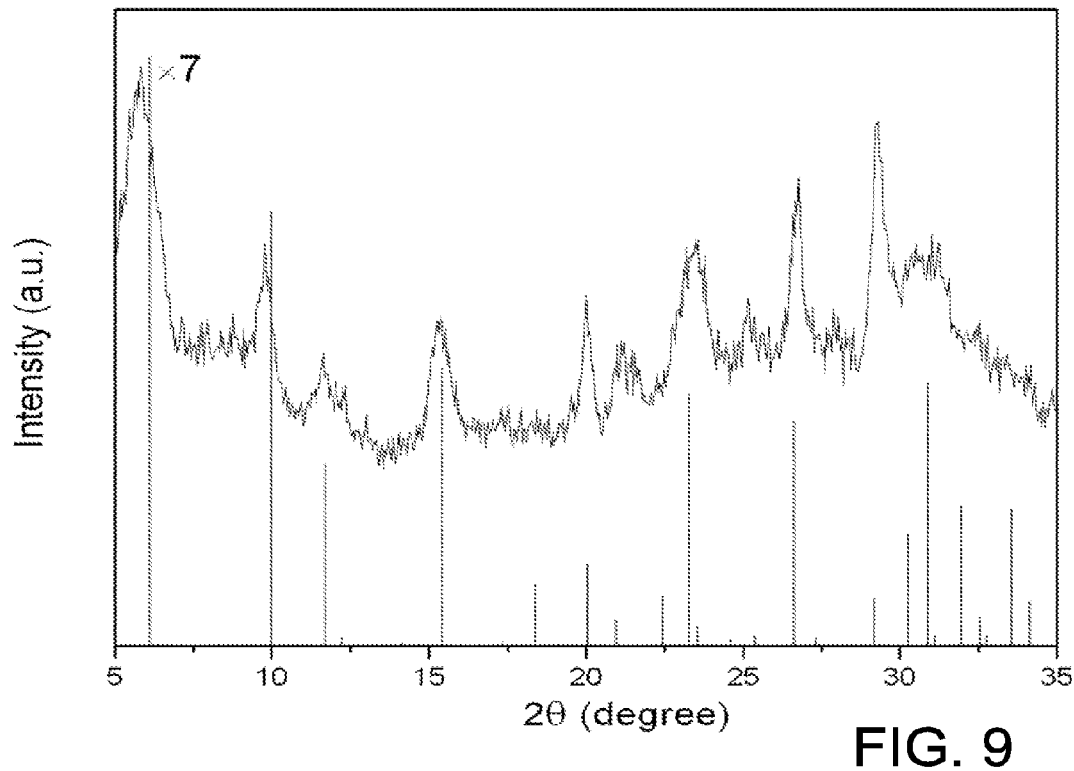
FIG. 9 shows the powder X-ray diffraction pattern of the sample in Example 12 along with the simulated pattern of a NaX zeolite with a faujasite-type (FAU) structure.

4.93 g of NaOH was dissolved in 5.42 ml of water into which 12.56 g of sodium silicate (~10.6% $Na_2O$, ~26.5% $SiO_2$) was added subsequently. The solution was stirred at 800 rpm with a laboratory mixer (IKA RW 60 digital mixer), until it became homogeneous by visual inspection. Into the solution, 6.15 g of metakaolin (MetaMax®) was added and the stirring was continued at 800 rpm for 35 min, which yielded a geopolymer resin having approximate nominal Na:Al:Si atomic ratios of 3:1:2. Into the mixture, 12.96 ml of waste vegetable oil was added and the stirring was continued at 800 rpm for 10 min, which yielded a viscous homogeneous geopolymer resin material. This liquid was poured into a tightly-closed polypropylene container and was heated at 60° C. for 2 days in a laboratory oven (Yamato DKN400) to give a solid geopolymer resin material was soft and easy to break up with hand. About 5 g of the solid was then placed in 100 ml of deionized water and heated at 90° C. for 24 h during which the solid disintegrated into particles in water. The water was removed from the particles by decantation and then replaced with fresh deionized water and heated at 90° C. for 24 h, which was repeated two times. The water was then decanted from the particles and the particles were rinsed with deionized water for 2 min and dried in a lab oven at 110° C. overnight. The final product exhibited pores with a Barret-Joyner-Halenda (BJH) cumulative volume (pore sizes from 2 to 300 nm) of 0.33 $cm^3/g$ and an average pore size of 12 nm. The micropore volume was 0.18 $cm^3/g$. The nitrogen Brunauer-Emmett-Teller (BET) surface area was 549 $m^2/g$ of which 392 $m^2/g$ was from micropores. Powder X-ray diffraction pattern of the product is shown in FIG. 9, in which most of the Bragg peaks can be assigned to a a faujasite-type (FAU) structure shown by the stick spectrum.

Example 13

5.28 g of NaOH was dissolved in 8.1 g of water into which 8.82 g of sodium silicate (~10.6% $Na_2O$, ~26.5% $SiO_2$) was added subsequently. The solution was stirred with a laboratory mixer (Stir-Pak Laboratory mixer, 4554-10 from Cole-Parmer Instrument Company), until it became homogeneous by visual inspection. In the solution, 4.40 g of metakaolinite was added and stirred until the solution became visually homogeneous, to produce a geopolymer resin. In a separate container, 12.49 g of ferric chloride ($FeCl_3 \cdot 6H_2O$) was dissolved in 10 ml of methanol. The $FeCl_3 \cdot 6H_2O$ solution was added dropwise into the geopolymer resin while the resin was stirred. Most of the methanol evaporated during the stirring, as deduced from the insignificant increase of the resin material volume. 14 ml of canola oil was added to the resulting a reddish brown paste-like geopolymer resin material and this material was stirred for about 10 min and was heated at 60° C. for 24 h in a laboratory oven (Yamato DKN400) to give another geopolymer resin material which was reddish brown. For carbothermal reduction of iron, 2.0 g of this above reddish brown solid was ground to a fine powder and was heated at 600° C. for 3 h in a tube furnace (Thermo Scientific TF55030A-1) under a flow of argon gas to give 1.29 g of a black powder. The black product showed a nitrogen sorption Brunauer-Emmett-Teller (BET) surface area of about 28 $m^2/g$. A portion of the black powder was immersed in a diluted hydrochloric acid and the material generated gas bubbles for longer than 4 h.

Example 14

Figure 10:
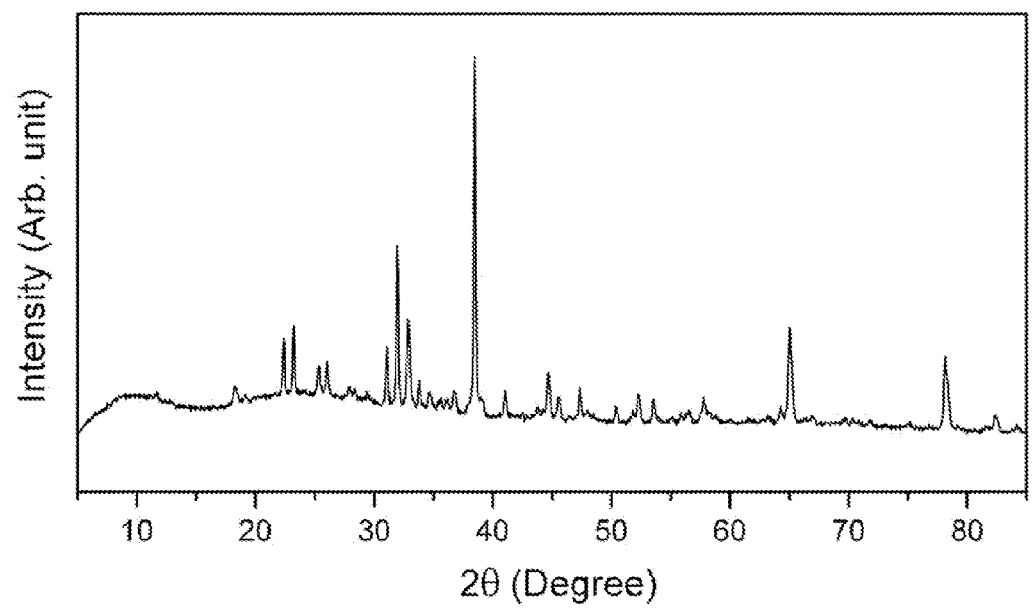
FIG. 10 shows the powder X-ray diffraction pattern of the product dried at 85° C. in Example 14.

2.5 g of NaOH was dissolved in 3.6 g of water. The solution was stirred until it became homogeneous by visual inspection. In the solution, 6.0 g of metakaolinite was added and stirred until the solution became visually homogeneous to yield a geopolymer resin. While the resin was chilled in an ice bath, 3.6 g of a conc. $H_3PO_4$ (85%) was gradually added and was stirred for about 5 min to give a homogeneous mixture. The pH of the mixture was about 7. Three different samples of the homogeneous mixture prepared under the same conditions were dried under different conditions. The sample dried at room temperature in a fume hood did not solidify even after 18 h (a water loss of less than 5%). The samples dried at 60 and 85° C. solidified, with a water loss of 38 and 48%, respectively, after 18 h. FIG. 10 shows the powder X-ray diffraction pattern of the product dried at 85° C.

Example 15

5.0 g of NaOH was dissolved in 7.2 g of water. The solution was stirred until it became homogeneous by visual inspection. In the solution, 12.0 g of metakaolinite was added and stirred until the solution became visually homogeneous, yield a geopolymer resin. While the resin was chilled in an ice bath, a solution of 4 ml of a conc. $H_2SO_4$ (95-98%) and 16 ml of water was gradually added and was stirred for about 5 min to give a homogeneous mixture. The pH of the mixture was about 7. The sample was dried at room temperature, 60 or 85° C. to become solidified.

Example 16

5.0 g of NaOH was dissolved in 7.2 g of water. The solution was stirred until it became homogeneous by visual inspection. In the solution, 12.0 g of metakaolinite was added and stirred until the solution became visually homogeneous, to yield a geopolymer resin. While the resin was chilled in an ice bath, 3.5 g of glacial acetic acid was gradually added and was stirred for about 5 min to give a homogeneous mixture. The pH of the mixture was about 7. The sample was dried at 60° C. and became solidified.

Example 17

Figure 11:
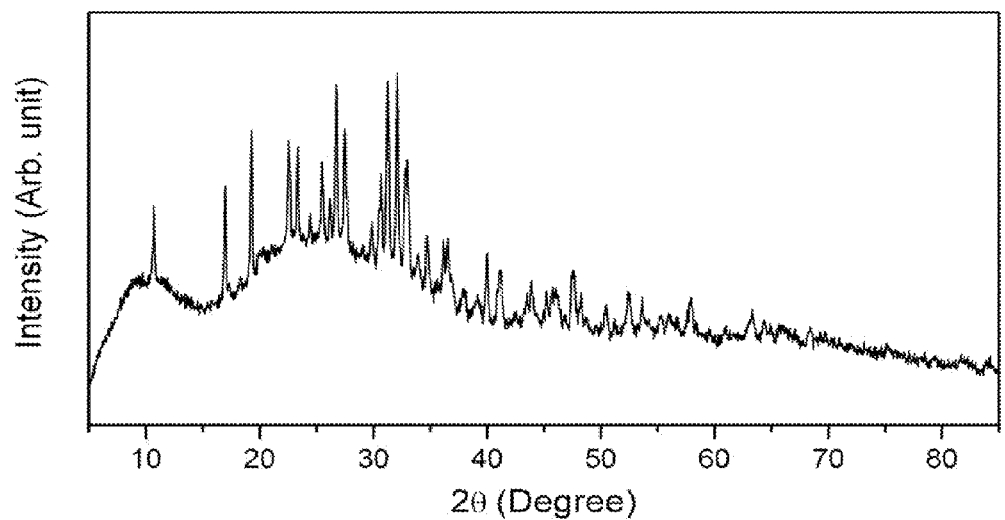
FIG. 11 shows the powder X-ray diffraction pattern of the product dried at 85° C. in Example 17.

0.160 g of $TiO_2$ nanoparticles (anatase) was dispersed in 8.245 g of a conc. $H_3PO_4$ (85%). In a separate container, 5.0 g of NaOH was dissolved in 14.4 g of water. The solution was stirred until it became homogeneous by visual inspection. In the solution, 12.0 g of metakaolinite was added and stirred until the solution became visually homogeneous, to yield a geopolymer resin. To the resin, the $TiO_2$ dispersion was gradually added while stirring, to yield a geopolymer resin material. The resin material was divided to three and each portion was dried and solidified under different conditions (room temperature, 60 and 85° C.). FIG. 11 shows the powder X-ray diffraction pattern of the product dried at 85° C.

Example 18

2.0 g of acetylene carbon black was homogeneously mixed into 12.5 g of glycerol. In a separate vessel, 0.73 g of NaOH was dissolved in 0.95 g of water into which 12.22 g of sodium silicate (~10.6% $Na_2O$, ~26.5% $SiO_2$) was added subsequently. The solution was stirred until it became homogeneous by visual inspection. 6.10 g of metakaolinite was added into the solution and stirred until the solution became visually homogeneous, to yield a geopolymer resin. The resulting geopolymer resin was stirred further for about 20 min. The carbon black and glycerol mixture was added to the geopolymer resin with the weight ratio of 3:1 and the mixture was stirred until they became homogeneous, yielding a carbon black/glycerol-geopolymer resin material. A portion of the resin material was applied on a microscope glass slide by using the doctor blade method. The slide was then heated at 500° C. for 10 h in a tube furnace (Thermo Scientific) under a flow of argon gas, in order to pyrolyze the glycerol. The final black film on the glass slide showed a resistance of about 700Ω on a Volt-Ohm meter.

Example 19

2.5 g of NaOH was dissolved in 3.6 g of water. The solution was stirred until it became homogeneous by visual inspection. In the solution, 6.0 g of metakaolinite was added and stirred until the solution became visually homogeneous, to yield a geopolymer resin. While the resin was chilled in an ice bath, 3.6 g of conc. $H_3PO_4$ (85%) was gradually added and was stirred for about 5 min to give a homogeneous mixture. 2 ml of a phosphate buffer solution (pH=7) was added to the mixture while stirring. The final homogeneous mixture was divided to three and the three samples were dried under different conditions. The solidification of the mixture took about an hour for the sample dried at room temperature in a fume hood. The samples dried at 60 and 85° C. in closed lab ovens became solidified after 3 h.

Example 20

Figure 12A:
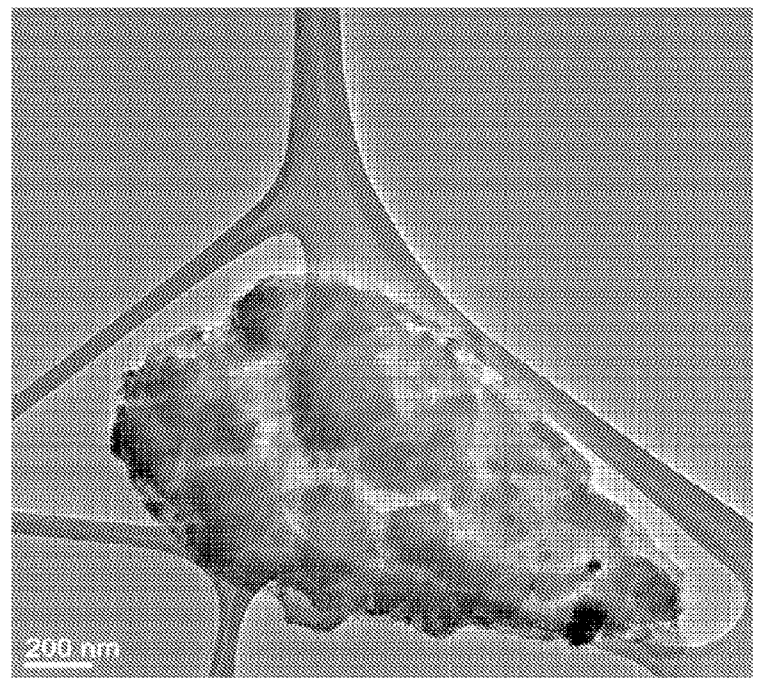
FIGS. 12A and 12B show transmission electron microscopy (TEM) and scanning electron microscopy (SEM) images of the product in Example 20, respectively.
Figure 12B:
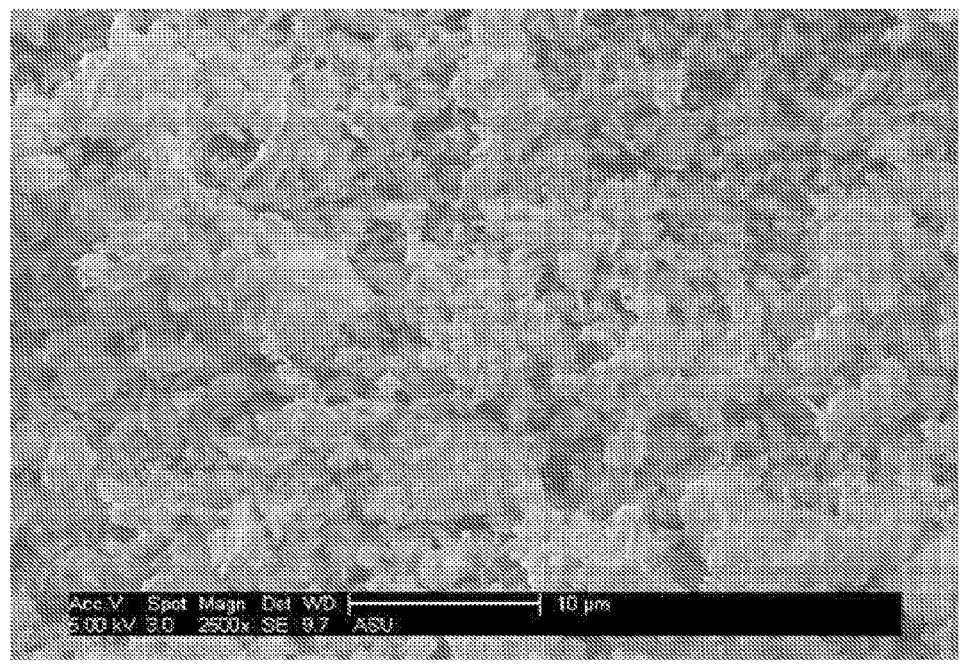

5.0 g of NaOH was dissolved in 14.3 g of water. The solution was stirred until it became homogeneous by visual inspection. In the solution, 12.0 g of metakaolinite was added and stirred until the solution became visually homogeneous, to yield a geopolymer resin. While the resin was chilled in an ice bath, 7.1 g of conc. $H_3PO_4$ (85%) was gradually added and was stirred for about 5 min to give a homogenous mixture. In a separate container, 0.482 g of cetyltrimethylammonium bromide (($C_{16}H_{33}$)N($CH_3$)$_3$Br, CTAB) was dissolved in 200 ml of deionized water. The aqueous CTAB solution was poured into the homogeneous mixture and stirred for about a minute. The mixture solution was then homogenized with a homogenizer (IKA T 25 digital ULTRA-TURRAX®) at 10000 rpm for about 10 min. Once the stirring was stopped, the resulting particles were precipitated, filtered and dried to give a powder product. The product showed a better dispersibility in chloroform than in water, indicating that the particles were hydrophobic to some extent. The CHN analysis showed that the material contained 2.46 wt % carbon and 0.14 wt % nitrogen. The product showed a nitrogen sorption Brunauer-Emmett-Teller (BET) surface area of about 22 m$^2$/g. FIGS. 12A and 12B show transmission electron microscopy (TEM) and scanning electron microscopy (SEM) images of the product, respectively. The Na:Al:P ratios of the product were 1.0:11.7:1.0 from ICP results. The amount of Si was not estimated due to the poor solubility of silicates under the employed sample analysis condition.

Example 21

25.0 g of NaOH was dissolved in 71.5 g of water. The solution was stirred until it became homogeneous by visual inspection. In the solution, 60.0 g of metakaolinite was added and stirred until the solution became visually homogeneous, yielding a geopolymer resin. While the resin was chilled in an ice bath, 35.5 g of conc. $H_3PO_4$ (85%) was gradually added and was stirred for about 15 min to give a homogenous mixture. In a separate container, 2.410 g of cetyltrimethylammonium bromide (($C_{16}H_{33}$)N($CH_3$)$_3$Br, CTAB) was dissolved in 1000 ml of deionized water. 100 ml of the aqueous CTAB solution was poured into the homogeneous mixture and stirred for about a minute. The mixture solution was then homogenized with a homogenizer (IKA T 25 digital ULTRA-TURRAX®) at 10000 rpm for about 10 min. After the homogenization, the rest of the CTAB solution was poured into the mixture solution and was stirred with a mechanical stirrer (STIR-PAK Model 4554-10, Cole Parmer) for about 30 min. After the stirring was stopped, the suspension was centrifuged and washed with deionized water more than three times. After a final centrifugation at 2000 rpm for less than 10 min, the supernatant was decanted to produce a viscous particle dispersion containing 60 wt % water.

Example 22

Figure 13:
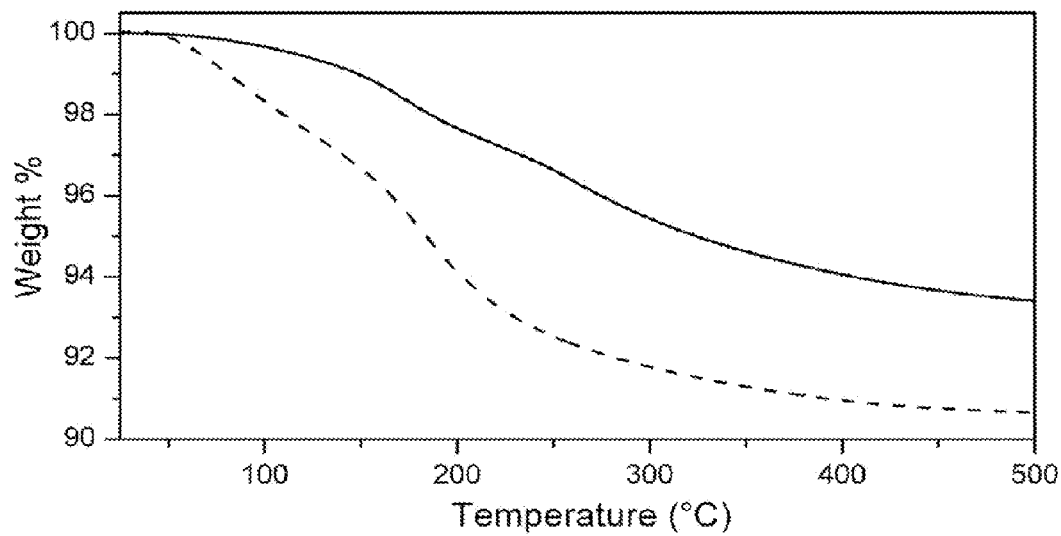
FIG. 13 shows the thermal gravimetric analysis (TGA) curve of the product (solid line) in Example 22 together with that of a geopolymer prepared without the ethanol treatment (dashed line).

0.73 g of NaOH was dissolved in 0.95 g of water into which 12.22 g of sodium silicate (~10.6% $Na_2O$, ~26.5% $SiO_2$) was added subsequently. The solution was stirred until it became homogeneous by visual inspection. In the solution, 6.10 g of metakaolinite was added and stirred until the solution became visually homogeneous, to give a geopolymer resin. The resin was stirred further for about 20 min. 5 ml of the resin was transferred into a centrifuge tube into which 5 ml of ethanol was added. The tube was then closed with a cap and shaken vigorously. After resting for about 1 min, the mixture was separated into two layers, a geopolymer resin material at the bottom and supernatant ethanol at the top. The supernatant was removed from the resin material by decantation. This ethanol treatment of the resin was repeated four more times. The resulting viscous resin material was heated at 110° C. for 18 h. to produce a geopolymer material. The CHN analysis showed that the material contained 0.21 wt % carbon. FIG. 13 compares the thermal gravimetric analysis (TGA) curve of the geopolymer material (solid line) with that of a geopolymer (dashed line) produced at the same nominal composition but without the ethanol treatment. The results indicate that the former material contained less water than the later, with weight loss due to dehydration.

Example 23

0.73 g of NaOH was dissolved in 0.95 g of water into which 12.22 g of sodium silicate (~10.6% $Na_2O$, ~26.5% $SiO_2$) was added subsequently. The solution was stirred until it became homogeneous by visual inspection. 6.10 g of metakaolinite was added into the solution and stirred until the solution became visually homogeneous, to yield a geopolymer resin. The geopolymer resin was stirred further for about 20 min. The total volume of the resin was 11 ml. 5.0 ml of glycerol was added to 5.0 ml of the geopolymer resin and the mixture was stirred for about 10 min to give a homogeneous geopolymer resin material. 5.0 ml of the resin material was transferred into a centrifuge tube into which 5.0 ml of ethanol was added. The tube was then closed with a cap and shaken vigorously. After resting for about 1 min, the mixture was separated into two layers, a geopolymer resin material at the bottom and a supernatant ethanol at the top.

Figure 14A:
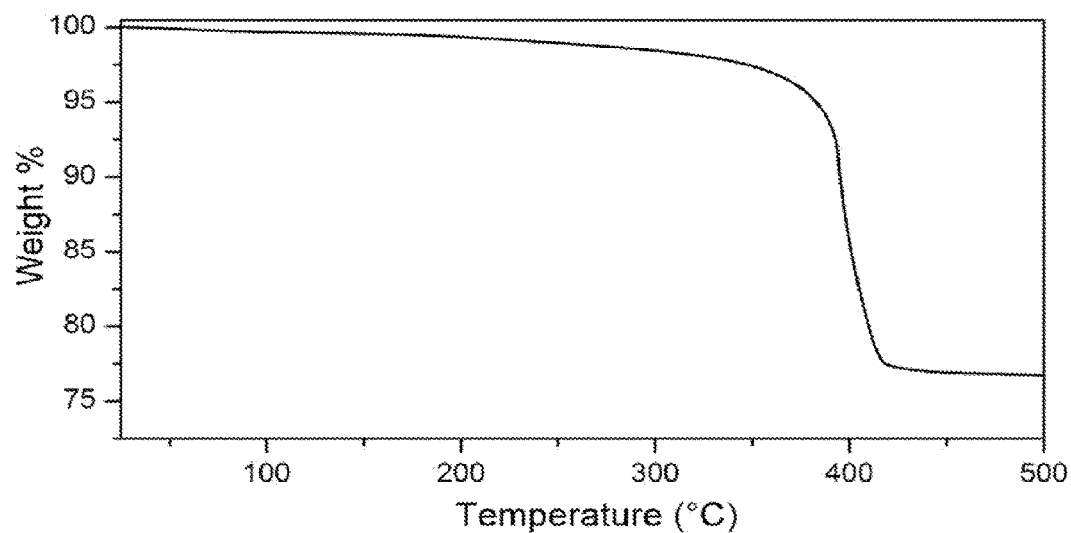
FIG. 14A shows the thermal gravimetric analysis (TGA) curve of the product in Example 23.
Figure 14B:
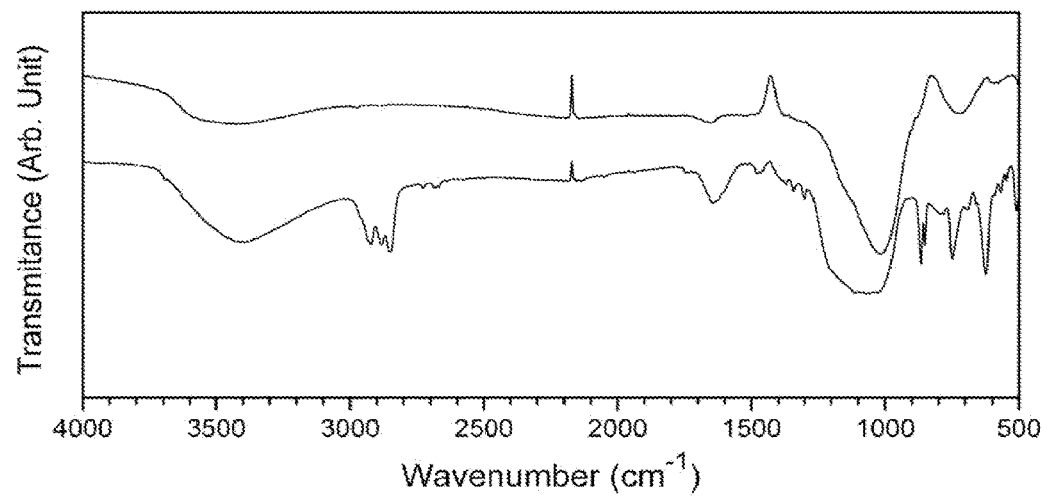
FIG. 14B shows the Fourier-Transform Infrared (FT-IR) spectrum of the product in Example 23 (bottom) together with that of the geopolymer material produced without glycerol (top).

The supernatant ethanol was removed from the resin material by decantation. About 25 wt % of the supernatant was glycerol, indicating that the ethanol treatment of the geopolymer resin material extracted some amount of the glycerol from the resin material. This ethanol treatment of the geopolymer resin material was repeated four more times until the supernatants did not contain any noticeable amount of glycerol. The resulting viscous resin material was heated at 110° C. for 18 h to produce a geopolymer material. The CHN analysis showed that the material contained 11.9 wt % of carbon. FIG. 14A shows the TGA curve of the material which shows no significant weight loss up to about 400° C., where the weight decreases sharply by about 18%. In FIG. 14B, the FT-IR spectrum of the geopolymer material (bottom) is compared with that of the geopolymer produced without glycerol (top). The former exhibits strong absorption peaks around 2900 cm$^{-1}$ (CH stretching) and around 1450 cm$^{-1}$ (CH$_2$ bending), which indicates the presence of glycerol moiety in the product material, while the latter does not.

Example 24

Figure 15:
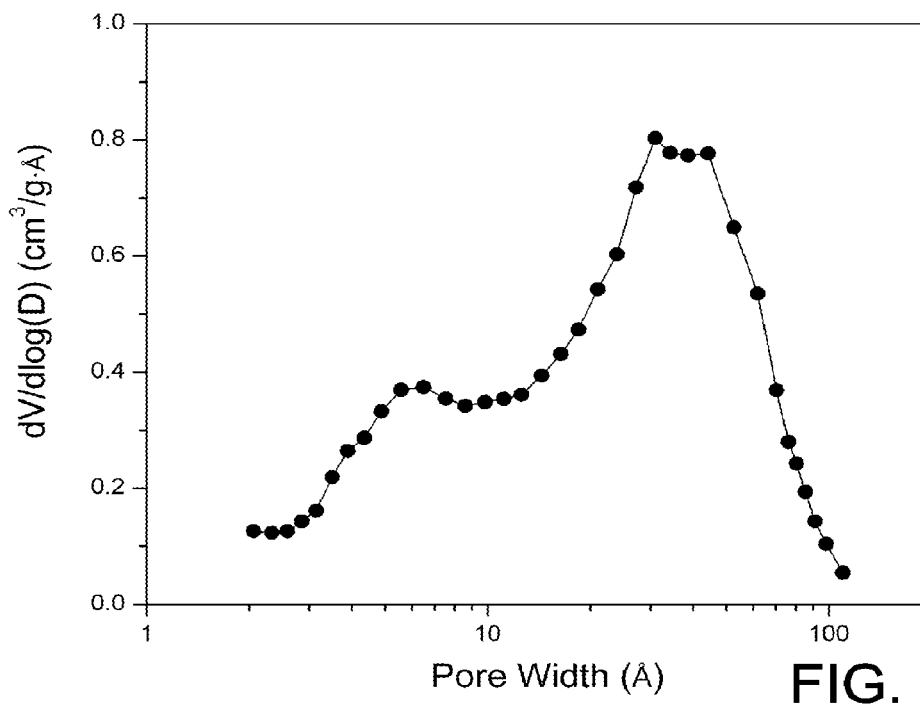
FIG. 15 is the Barret-Joyner-Halenda (BJH) desorption pore size distribution of the first sample in Example 24.
Figure 16:
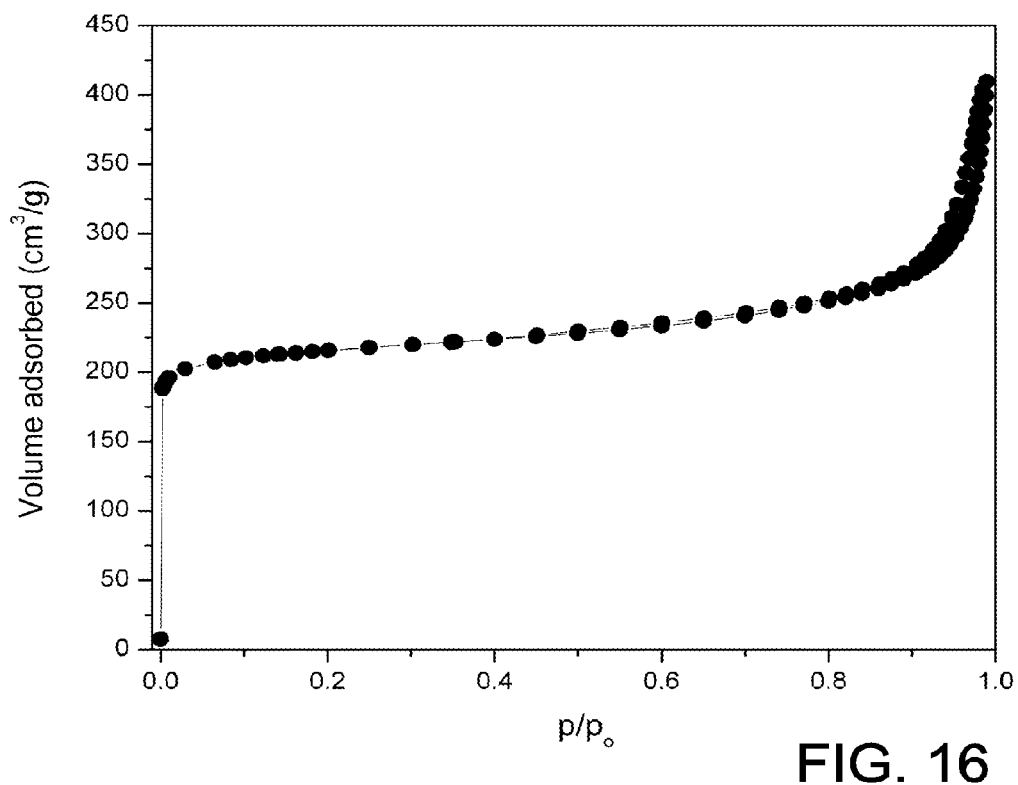
FIG. 16 is the nitrogen sorption isotherm of the first sample in Example 24.

6.04 g of NaOH was dissolved in 10.85 ml of water in a sealed polypropylene tube kept underwater in an ice bath. 15.51 g of sodium silicate (~10.6% Na$_2$O, ~26.5% SiO$_2$) was added subsequently into the above solution and stirred underwater in the water bath with a laboratory mixer at 800 rpm, until the solution became homogeneous by visual inspection. Into the solution, 7.6 g of metakaolin (MetaMax®) was added and stirring was continued at 800 rpm for 40 min, which yielded a geopolymer resin having approximate nominal Na:Al:Si atomic ratios of 3:1:2. This geopolymer resin was poured into a polypropylene tube, and sealed airtight, and heated at 60° C. for a day in a lab oven to give a paste-like geopolymer resin material with a pH value of about 14. About a half of the paste was taken out of the container, rinsed with a copious amount of water, and subjected to centrifugation at 5000 rpm for 10 min. The resulting clear supernatant solution (pH about 14) was decanted to obtain a fine powdery solid. The fine powdery solid was rinsed with more fresh water and was subjected to centrifugation at 5000 rpm for 10 min and the resulting clear supernatant solution was decanted to obtain a fine powdery solid. The rinsing, centrifugation and decanting steps were repeated until the supernatant liquid attained near neutral pH. The neutralized fine powdery solid was dried in a lab oven at 110° C. overnight. The final product exhibited mesopores with a Barret-Joyner-Halenda (BJH) cumulative volume (pore sizes from 2 to 300 nm) of 0.71 cm$^3$/g along with micropores with a t-plot micropore volume of 0.13 cm$^3$/g. BJH desorption average pore width was 12 nm and the BJH desorption pore size distribution is shown in FIG. 15. The nitrogen Brunauer-Emmett-Teller (BET) surface area was 497 m$^2$/g and the nitrogen sorption isotherm is shown in FIG. 16.

Figure 17:
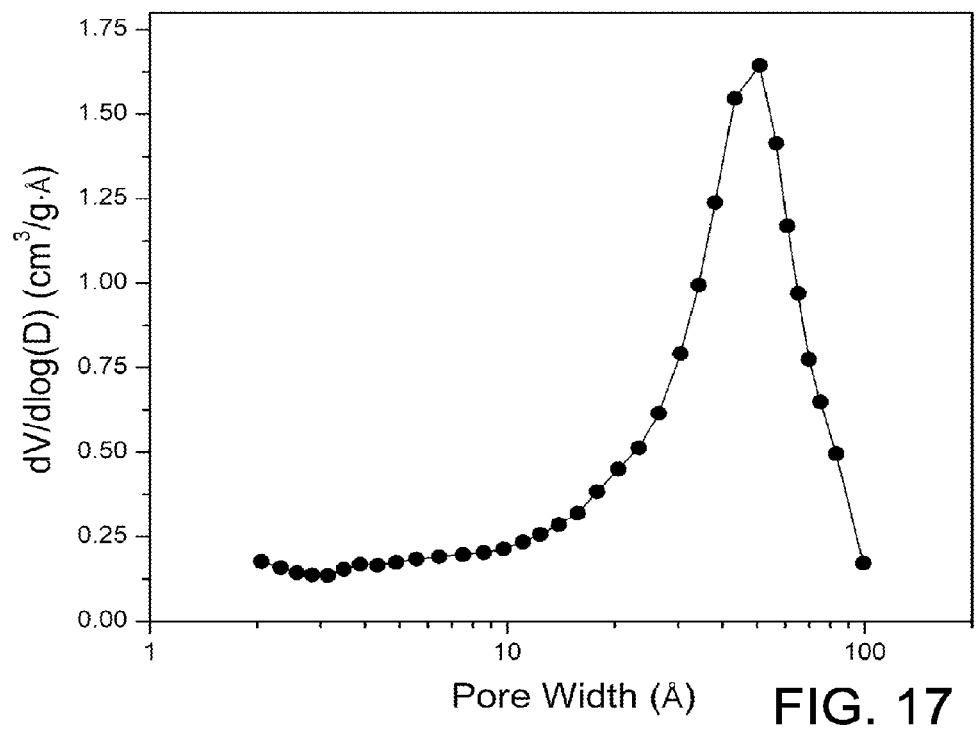
FIG. 17 is the Barret-Joyner-Halenda (BJH) desorption pore size distribution of the second sample in Example 24.
Figure 18:
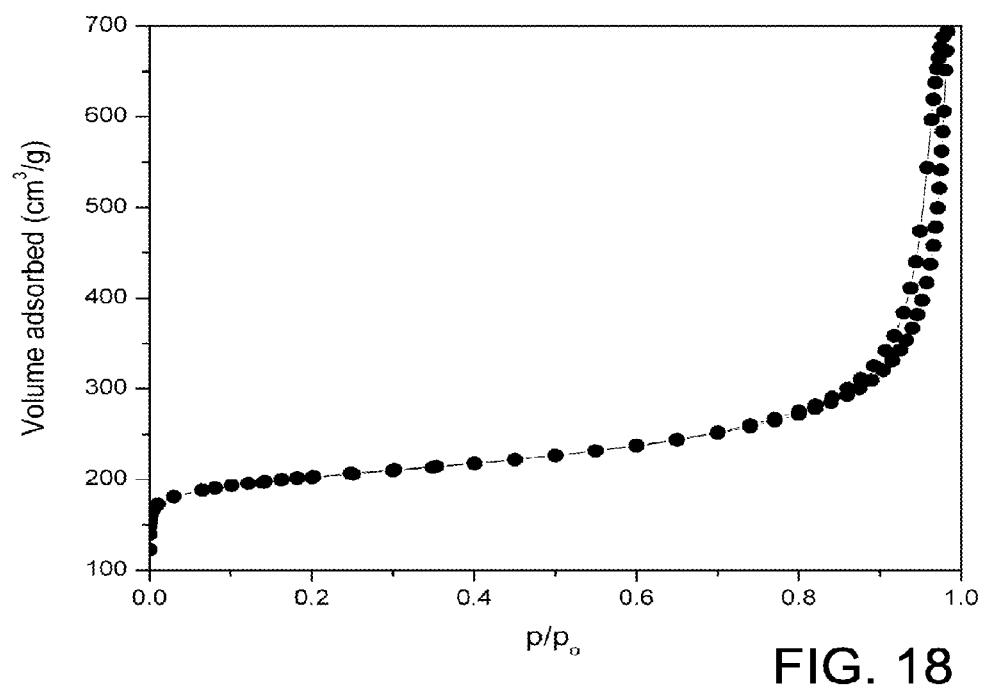
FIG. 18 is the nitrogen sorption isotherm of the second sample in Example 24.

The rest of the paste-like geopolymer resin material was heated further at 60° C. for a total of 18 days. The paste was then rinsed with a copious amount of 0.1 M HCl in water, subjected to centrifugation at 5000 rpm for 10 min, and the resulting clear supernatant solution (pH=13) was decanted to obtain a fine powdery solid. The fine powdery solid was rinsed with more 0.1 M HCl in water and subjected to centrifugation at 5000 rpm for 10 min. The resulting clear supernatant solution was decanted to obtain a fine powdery solid. The rinsing, centrifugation and decanting of supernatant liquid steps were repeated until the supernatant liquid attained neutral pH. The neutralized fine powdery solid was dried in a lab oven at 110° C. overnight. The final product exhibited mesopores with a Barret-Joyner-Halenda (BJH) cumulative volume (pore sizes from 2 to 300 nm) of 0.85 cm$^3$/g along with micropores with a t-plot micropore volume of 0.22 cm$^3$/g. BJH desorption average pore width was 16 nm and the BJH desorption pore size distribution is shown in FIG. 17. The nitrogen Brunauer-Emmett-Teller (BET) surface area was 688 m$^2$/g and the nitrogen sorption isotherm is shown in FIG. 18.

Example 25

Figure 19:
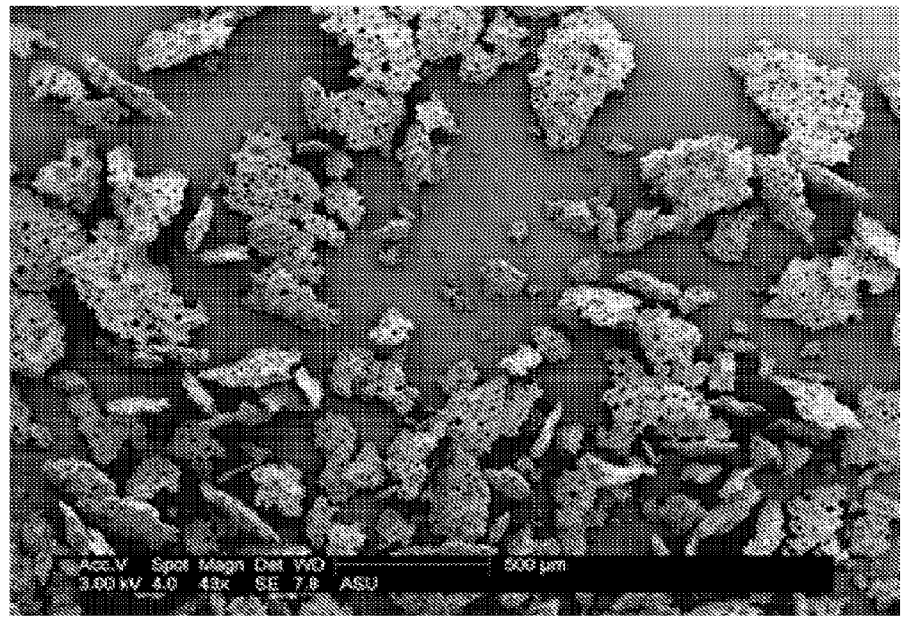
FIG. 19 is a scanning electron micrograph (SEM) of the sample in Example 25.
Figure 20:
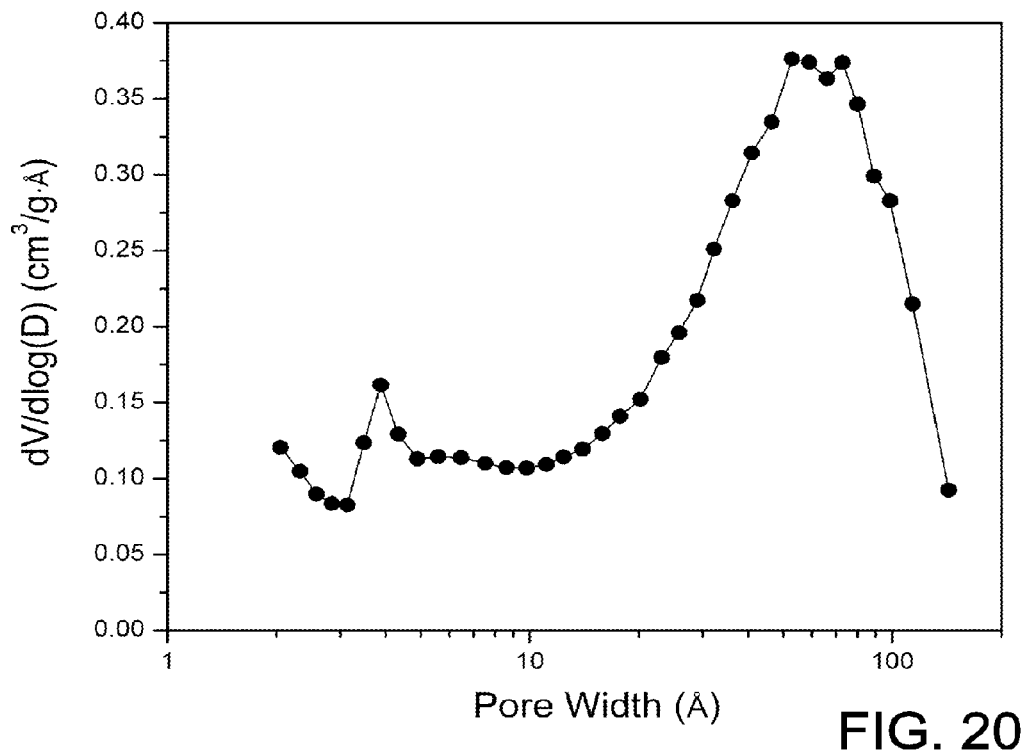
FIG. 20 is the Barret-Joyner-Halenda (BJH) desorption pore size distribution of the second sample in Example 25.
Figure 21:
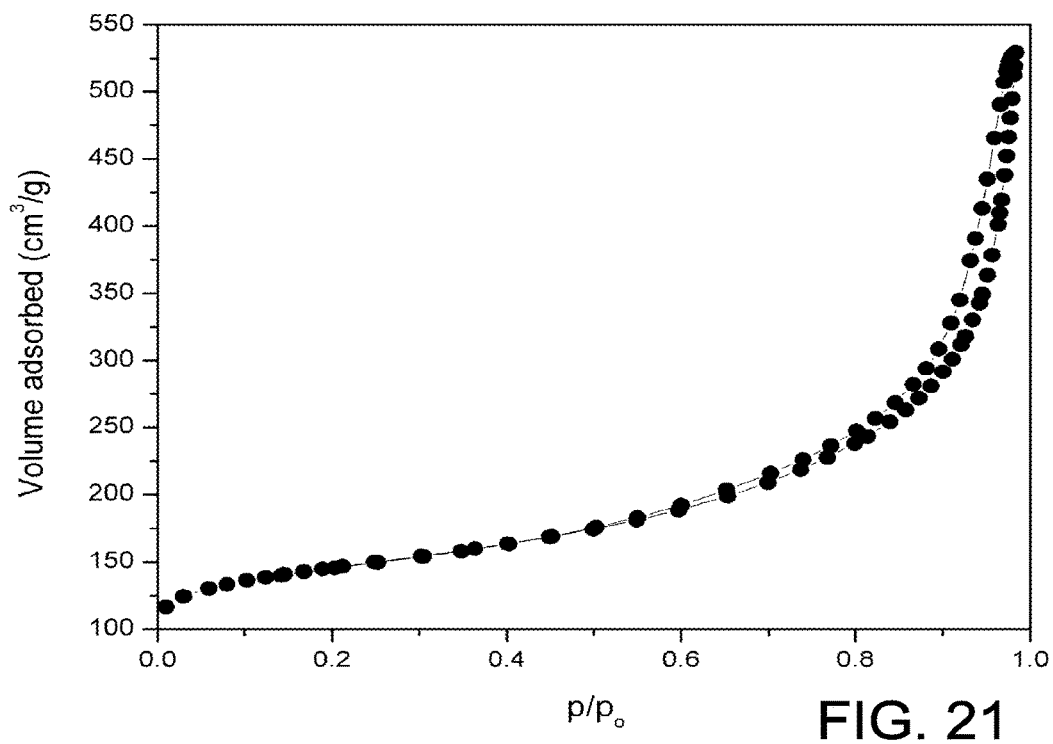
FIG. 21 is the nitrogen sorption isotherm of the second sample in Example 25.
Figure 22:
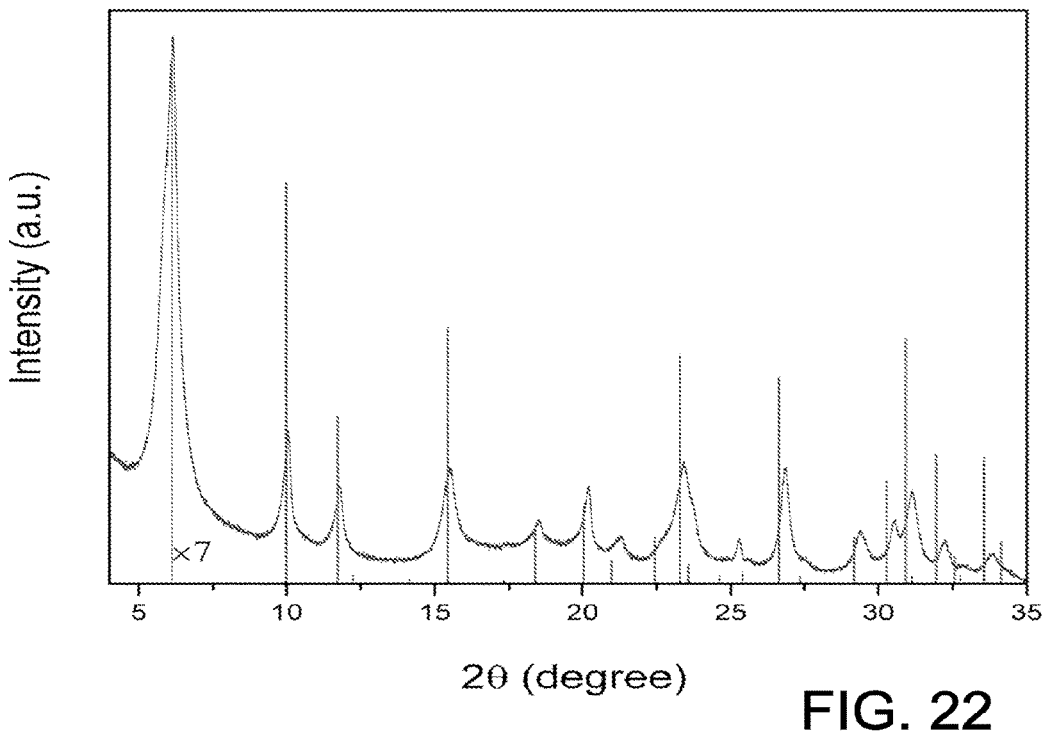
FIG. 22 is a powder X-ray diffraction pattern of the sample in Example 25 along with a simulated diffraction pattern of a NaX zeolite (FAU).

6.85 g of NaOH was dissolved in 12.32 ml of water in a sealed polypropylene tube kept underwater in a water bath. 17.61 g of sodium silicate (~10.6% Na$_2$O, ~26.5% SiO$_2$) was added subsequently into the above solution and was stirred underwater in the water bath with a laboratory mixer at 800 rpm, until the solution was homogeneous by visual inspection. Into the solution, 8.62 g of metakaolin (MetaMax®) was added and stirring was continued at 800 rpm for 40 min, which yielded a visually homogeneous geopolymer resin having approximate nominal Na:Al:Si atomic ratios of 3:1:2. Into the mixture ~23 ml of canola oil was added having approximate oil:water volume ratio of 1:1 and stirring was continued at 800 rpm for 10 min, which yielded a viscous, homogeneous geopolymer resin material. This resin material was poured into a 250 ml polypropylene open mouth beaker. The polypropylene beaker was then heated at 60° C. for 5 days in a lab oven to give a homogeneous and hard geopolymer resin material. The solid resin material was then broken into about 2 cm by 2 cm by 2 cm pieces and placed in 500 ml of deionized water and heated at 90° C. for 24 h. Disintegration of the solid pieces into a fine powder was observed during the heating in water. The water was then decanted from the particles and the particles were washed with deionized water for 2 min. The particles were dried in a lab oven at 110° C. overnight. A scanning electron micrograph (SEM) of the product is shown in FIG. 19. The final product exhibited mesopores with a Barret-Joyner-Halenda (BJH) cumulative volume (pore sizes from 2 to 300 nm) of 0.29 cm$^3$/g along with micropores with a t-plot micropore volume of 0.18 cm$^3$/g. BJH desorption average pore width was 16 nm and the BJH desorption pore size distribution is shown in FIG. 20. The nitrogen Brunauer-Emmett-Teller (BET) surface area was 511 m$^2$/g and the nitrogen sorption isotherm is shown in FIG. 21. FIG. 22 shows a powder X-ray diffraction pattern of the sample with a simulated diffraction pattern of the zeolite NaX (FAU) shown by the stick spectrum.

Example 26

248.87 g of NaOH was dissolved in 258.89 ml of water into which 1172.75 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 586.16 g of metakaolin (MetaMax®) was added and stirring was continued at 800 rpm for 35 min, which yielded a geopolymer resin having approximate nominal Na:Al:Si atomic ratios of 2:1:2. Into the mixture 950 ml of canola oil was added having approximate oil:water volume ratio of 1:1 and stirring was continued at 800 rpm for 10 min, which yielded a geopolymer resin material. This resin material was poured into a sheet molds about 10 in by 14 in by 0.5 cm in dimension. The sheet molds were transferred into a tightly-closed polypropylene container and were heated at 60° C. for 2 days in a lab oven. After 2 days, the resin material had formed into a geopolymer material which was broken into about 2.5 cm by 2.5 cm by 0.5 cm pieces and split into three batches. Each batch was placed in about 3 L of deionized water and heated at 90° C. for 24 h. Partial disintegration of the geopolymer material into about 1 cm by 1 cm by 0.5 cm particulates was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.28 cm$^3$/g and an average pore size of 24 nm. The nitrogen Brunauer-Emmett-Teller (BET) surface area was 160 m$^2$/g.

Example 27

Figure 23:
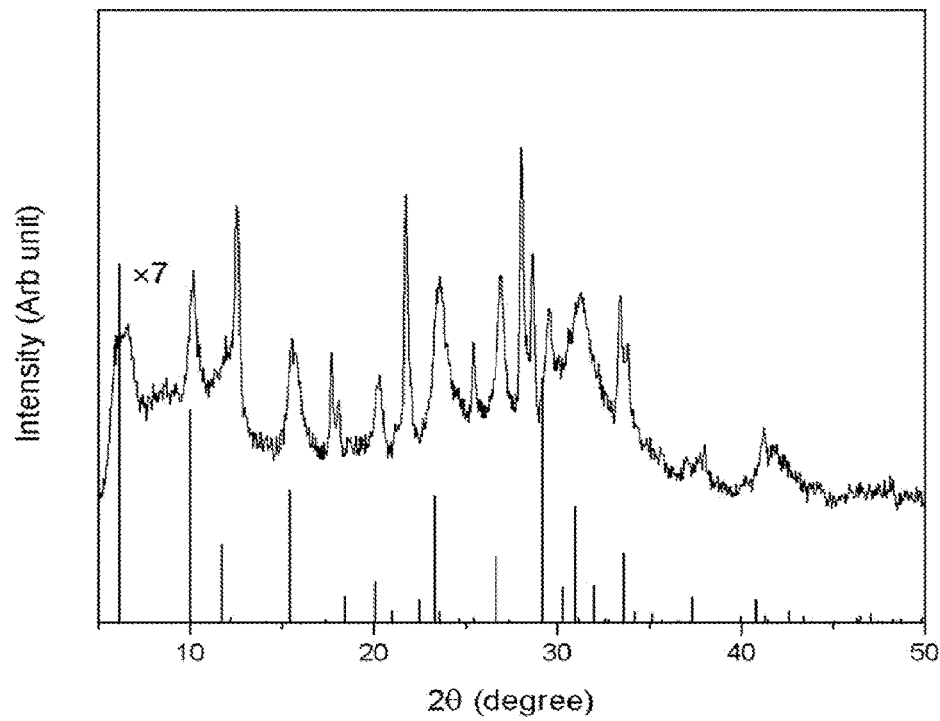
FIG. 23 is a powder X-ray diffraction pattern of the sample in Example 27 along with a simulated diffraction pattern of a NaX zeolite (FAU).

289.03 g of NaOH was dissolved in 317.78 ml of water into which 736.60 g of sodium silicate (~40.6% Na$_2$O, ~26.5% SiO$_2$) was added subsequently. The solution was stirred at 400 rpm with a laboratory mixer, until it became homogeneous by visual inspection. Into the solution, 360.81 g of metakaolin (MetaMax®) was added and stirring was continued at 800 rpm for 40 min, which yielded a geopolymer resin having approximate nominal Na:Al:Si atomic ratios of 3:1:2. Into the mixture 760.0 ml of canola oil was added having approximate oil:water volume ratio of 1:1 and stirring was continued at 800 rpm for 10 min, which yielded a geopolymer resin material. This resin material was poured into a sheet molds about 10 in by 14 in cm by 0.5 cm in dimension. The sheet molds were transferred into a tightly-closed polypropylene container and was heated at 60° C. for 4 days in a lab oven to give a homogeneous and semi-hard monolithic solid. The solid was then aged in open air for 3 days to result in a geopolymer material. The geopolymer material was then broken into about 2.5 cm by 2.5 cm by 0.5 cm pieces, and split into three separate batches. Each batch was placed in about 3 L of deionized water and heated at 90° C. for 24 h. Partial disintegration of the geopolymer material into smaller particulates ranging in size from about 2 cm by 2 cm by 0.25 cm to about 0.3 cm by 0.3 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.54 cm$^3$/g and an average pore size of 11 nm. The micropore volume was 0.13 cm$^3$/g. The nitrogen Brunauer-Emmett-Teller (BET) surface area was 467 m$^2$/g of which 289 m$^2$/g was from micropores. FIG. 23 shows a powder X-ray diffraction pattern of the sample with a simulated diffraction pattern of the zeolite NaX (FAU) shown by the stick spectrum.

Example 28

2.62 g of NaOH was dissolved in 6.15 ml of water into which 12.34 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 6.17 g of metakaolinite (Alfa Aesar) was added and stirring was continued at 800 rpm for 40 min, which yielded a geopolymer resin having approximate nominal Na:Al:Si atomic ratios of 2:1:2. Into the mixture 13.4 ml of canola oil was added having approximate oil:water volume ratio of 1:1 and stirring was continued at 800 rpm for 10 min, which yielded a geopolymer resin material. This resin material was poured into a round mold. The mold was transferred into a tightly-closed polypropylene container and was heated at 60° C. for 2 days in a lab oven to give a monolithic geopolymer material in the shape of a disk with a diameter around 7.6 cm and a thickness of around 1 cm. The geopolymer material was then broken into about 1 cm by 1 cm by 1 cm pieces and placed in 100 ml of deionized water and heated at 90° C. for 24 h. Partial disintegration of the geopolymer material into smaller particulates about 1 cm by 1 cm by 0.25 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight.

Example 29

2.62 g of NaOH was dissolved in 6.15 ml of water into which 12.34 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 6.17 g of metakaolin (PowerPozz®) was added and stirring was continued at 800 rpm for 40 min, which yielded a geopolymer resin having approximate nominal Na:Al:Si atomic ratios of 2:1:2. Into the mixture 13.4 ml of canola oil was added having approximate oil:water volume ratio of 1:1 and stirring was continued at 800 rpm for 10 min, which yielded a geopolymer resin material. This resin material was poured into a round mold. The mold was transferred into a tightly-closed polypropylene container and was heated at 60° C. for 2 days in a lab oven to give a monolithic geopolymer material in the shape of a disk with a diameter around 7.6 cm and a thickness of around 1 cm. The geopolymer material was then broken into about 1 cm by 1 cm by 1 cm pieces and placed in 100 ml of deionized water and heated at 90° C. for 24 h. Partial disintegration of the geopolymer material into smaller particulates ranging in size from about 1 cm by 1 cm by 0.2 cm to 0.5 cm by 0.5 cm by 0.05 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight.

Example 30

3.04 g of NaOH was dissolved in 4.44 ml of water into which 7.75 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 3.80 g of metakaolin (MetaMax®) was added and stirring was continued at 800 rpm for 30 min, which yielded a geopolymer resin having approximate nominal Na:Al:Si atomic ratios of 3:1:2. Into the mixture 10.0 ml of canola oil was added having an approximate oil:water volume ratio of 1:1 and stirring was continued at 800 rpm for 10 min, which yielded a geopolymer resin material. This resin material was poured into a round mold. The mold was transferred into a tightly-closed polypropylene container and was heated at 60° C. for 2 days in a lab oven to give a monolithic geopolymer material in the shape of a disk with a diameter around 7.6 cm and a thickness of around 0.5 cm. The geopolymer material was then broken into about 2 cm by 2 cm by 0.5 cm pieces and placed in 100 ml of deionized water and heated at 90° C. for 24 h. Partial disintegration of the geopolymer material into smaller particulates ranging in size from about 0.2 cm by 0.2 cm by 0.05 cm to 1 cm by 1 cm by 0.2 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.19 cm$^3$/g and an average pore size of 18 nm. The micropore volume was 0.05 cm$^3$/g. The nitrogen Brunauer-Emmett-Teller (BET) surface area was 159 m$^2$/g of which 104.2 m$^2$/g was from micropores.

Example 31

4.1 g of NaOH was dissolved in 6.55 ml of water. The solution was stirred at 400 rpm with a laboratory mixer, until it became homogeneous by visual inspection. Into the solution, 3.80 g of metakaolin (MetaMax®) was added and stirring was continued at 800 rpm for 40 min, which yielded a geopolymer resin having approximate nominal Na:Al:Si atomic ratios of 3:1:1. Into the mixture 6.6 ml of canola oil was added having approximate oil:water volume ratio of 1:1 and stirring was continued at 800 rpm for 10 min, which yielded a geopolymer resin material. This resin material was poured into a round mold. The mold was transferred into a tightly-closed polypropylene container and was heated at 60° C. for 2 days in a lab oven to give a monolithic geopolymer material in the shape of a disk with a diameter around 7.6 cm and a thickness of around 0.5 cm. The geopolymer material was then aged in open air for 1 day. The solid was then broken into about 1 cm by 1 cm by 1 cm pieces and placed in 100 ml of deionized water and heated at 90° C. for 24 h. Partial disintegration of the geopolymer material into smaller particulates, with the majority becoming a fine powder but some large sheet particulates about 1 cm by 0.5 cm by 0.05 cm, was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.06 cm$^3$/g and an average pore size of 11 nm. The nitrogen Brunauer-Emmett-Teller (BET) surface area was 16 m$^2$/g.

Example 32

3.95 g of NaOH was dissolved in 8.12 ml of water into which 3.09 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 6.17 g of metakaolin (MetaMax®) was added and stirring was continued at 800 rpm for 40 min, which yielded a geopolymer resin having approximate nominal Na:Al:Si atomic ratios of 2:1:1.25. Into the mixture 9.9 ml of canola oil was added having approximate oil:water volume ratio of 1:1 and stirring was continued at 800 rpm for 10 min, which yielded a geopolymer resin material. This resin material was poured into a cube mold. The mold was transferred into a tightly-closed polypropylene container and was heated at 60° C. for 2 days in a lab oven to give monolithic geopolymer materials in the shape of 3 cm by 3 cm by 3 cm cubes. The solid cubes were then broken into about 1 cm by 1 cm by 1 cm pieces and cured in open air at 60° C. for 2 days. The geopolymer material pieces were then placed in 100 ml of deionized water and heated at 90° C. for 24 h. Partial disintegration of the geopolymer material into smaller particulates ranging in size from about 0.25 by 0.25 by 0.05 cm to 1 cm by 1 cm by 0.25 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.17 cm$^3$/g and an average pore size of 7 nm. The nitrogen Brunauer-Emmett-Teller (BET) surface area was 254 m$^2$/g.

Example 33

3.60 g of NaOH was dissolved in 6.88 ml of water into which 6.17 g of sodium silicate (~10.6% Na$_2$O, ~26.5% SiO$_2$) was added subsequently. The solution was stirred at 400 rpm with a laboratory mixer, until it became homogeneous by visual inspection. Into the solution, 6.17 g of metakaolin (MetaMax®) was added and stirring was continued at 800 rpm for 40 min, which yielded a geopolymer resin having approximate nominal Na:Al:Si atomic ratios of 2:1:1.5. Into the mixture 10.5 ml of canola oil was added having approximate oil:water volume ratio of 1:1 and stirring was continued at 800 rpm for 10 min, which yielded a geopolymer resin material. This resin material was poured into a cube mold. The mold was transferred into a tightly-closed polypropylene container and was heated at 60° C. for 2 days in a lab oven to give a monolithic geopolymer material in the shape of a 3 cm by 3 cm by 3 cm cube. The solid cubes were then broken into about 1 cm by 1 cm by 1 cm pieces and cured in open air at 60° C. for 2 days. The geopolymer material pieces were then placed in 100 ml of deionized water and heated at 90° C. for 24 h. Partial disintegration of the geopolymer material into smaller particulates ranging in size from about 0.2 by 0.2 by 0.1 cm to 1 cm by 0.5 cm by 0.2 cm was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.1 cm$^3$/g and an average pore size of 17 nm. The nitrogen Brunauer-Emmett-Teller (BET) surface area was 18 m$^2$/g.

Example 34

4.19 g of NaOH was dissolved in 8.64 ml of water into which 1.85 g of sodium silicate (~10.6% $Na_2O$, ~26.5% $SiO_2$) was added subsequently. The solution was stirred at 400 rpm with a laboratory mixer, until it became homogeneous by visual inspection. Into the solution, 6.17 g of metakaolin (MetaMax®) was added and stirring was continued at 800 rpm for 40 min, which yielded a geopolymer resin having approximate nominal Na:Al:Si atomic ratios of 2:1:1.25. Into the mixture 9.7 ml of canola oil was added having approximate oil:water volume ratio of 1:1 and stirring was continued at 800 rpm for 10 min, which yielded a geopolymer resin material. This resin material was poured into a round mold. The mold was transferred into a tightly-closed polypropylene container and was heated at 60° C. for 2 days in a lab oven to give a monolithic geopolymer material in the shape of a disk with a diameter around 7.6 cm and a thickness of around 0.5 cm. The geopolymer material was then broken into about quarters and the pieces placed in 100 ml of deionized water and heated at 90° C. for 24 h. Partial disintegration of the geopolymer material into smaller particulates ranging in size from about 0.1 by 0.1 by 0.05 cm to 1.5 cm by 1.5 cm by 0.25 cm, was observed during the heating in water. The water was removed from the particles by decantation and then replaced with fresh deionized water and heated at 90° C. for 24 h. The water was decanted and replaced a third time with fresh deionized water and heated for an additional 24 h. The water was then decanted from the particles and the particles were washed with deionized water for 2 min. The particles were dried in a lab oven at 110° C. overnight. The final product exhibited pores with a Barret-Joyner-Halenda (BJH) cumulative volume (pore sizes from 2 to 300 nm) of 0.15 cm$^3$/g and an average pore size of 8 nm. The nitrogen Brunauer-Emmett-Teller (BET) surface area was 283 m$^2$/g.

Example 35

17.3 g of KOH was dissolved in 30 ml of water into which 6.2 g of fumed silica was added subsequently. The solution was then stirred until it became homogeneous by visual observation. In the solution, 11.4 g of metakaolinite was added and stirred at 800 rpm for 40 min using a laboratory mixer to get a visually homogeneous geopolymer resin. The resin had a viscosity similar to honey. 30 ml of canola oil was then added into the geopolymer resin and stirred at 800 rpm for further 10 min to obtain a visually homogeneous geopolymer resin material. The resin material was poured into silicone rubber molds having 1 inch cube wells and was heated in a lab oven at 60° C. for 72 h, which resulted in monolithic geopolymer materials in a cube shape. The geopolymer material was soaked in hot water (90° C.) for 24 h during which the original cubes disintegrated. The particles in the liquid were then dried in a lab oven at 120° C. These particles exhibited nitrogen Brunauer-Emmett-Teller (BET) surface area of about 133 m$^2$/g, Barret-Joyner-Halenda (BJH) desorption cumulative pore volume of about 0.62 cm$^3$/g and a BJH desorption pore width of 18 nm.

Example 36

15.7 g of KOH was dissolved in 30 ml of water into which 6.7 g of fumed silica was added subsequently. The solution was then stirred until it became homogeneous by visual observation. In the solution, 12.4 g of metakaolinite was added and stirred at 800 rpm for 40 min using a laboratory mixer to get a visually homogeneous geopolymer resin. The resin had a viscosity similar to honey. 30 ml of canola oil was then added into the geopolymer resin and stirred at 800 rpm for further 10 min to obtain a geopolymer resin material. The resin material was poured into silicone rubber molds having 1 inch cube wells and was heated in a lab oven at 60° C. for 72 h, which resulted in geopolymer materials in a cube shape. The geopolymer material was soaked in hot water (90° C.) for 24 h during which the original cubes disintegrated. The particles in the liquid were then dried in a lab oven at 120° C. These particles exhibited nitrogen Brunauer-Emmett-Teller (BET) surface area of about 130 m$^2$/g, Barret-Joyner-Halenda (BJH) desorption cumulative pore volume of about 0.83 cm$^3$/g and a BJH desorption pore width of 25 nm.

Example 37

17.3 g of KOH was dissolved in 30 ml of water into which 6.2 g of fumed silica was added subsequently. The solution was then stirred until it became homogeneous by visual observation. In the solution, 11.4 g of metakaolin (MetaMax®) was added and stirred at 800 rpm for 40 min using a laboratory mixer to get a visually homogeneous geopolymer resin. The resin had a viscosity similar to honey. 30 ml of canola oil was then added into the geopolymer resin and stirred at 800 rpm for further 10 min to obtain a geopolymer resin material. The resin material was poured into silicone rubber molds having 1 inch cube wells and was heated in a lab oven at 60° C. for 72 h, which resulted in geopolymer materials in a cube shape. The geopolymer material was soaked in hot water (90° C.) for 24 h during which the original cubes disintegrated. The particles in the liquid were then dried in a lab oven at 120° C. These particles exhibited nitrogen Brunauer-Emmett-Teller (BET) surface area of about 130 m$^2$/g, Barret-Joyner-Halenda (BJH) desorption cumulative pore volume of about 0.72 cm$^3$/g and a BJH desorption pore width of 22 nm.

Example 38

15.7 g of KOH was dissolved in 30 ml of water into which 6.7 g of fumed silica was added subsequently. The solution was then stirred until it became homogeneous by visual observation. In the solution, 12.4 g of metakaolin (MetaMax®) was added and stirred at 800 rpm for 40 min using a laboratory mixer to get a visually homogeneous geopolymer resin. The resin had a viscosity similar to honey. 30 ml of canola oil was then added into the geopolymer resin and stirred at 800 rpm for further 10 min to obtain a geopolymer resin material. The resin material was poured into silicone rubber molds having 1 inch cube wells and was heated in a lab oven at 60° C. for 72 h, which resulted in geopolymer materials in a cube shape. The geopolymer material was soaked in hot water (90° C.) for 24 h during which the original cubes disintegrated. The particles in the liquid were then dried in a lab oven at 120° C. These particles exhibited nitrogen Brunauer-Emmett-Teller (BET) surface area of about 124 m$^2$/g, Barret-Joyner-Halenda (BJH) desorption cumulative pore volume of about 0.76 cm$^3$/g and a BJH desorption pore width of 25 nm.

Example 39

Figure 24:
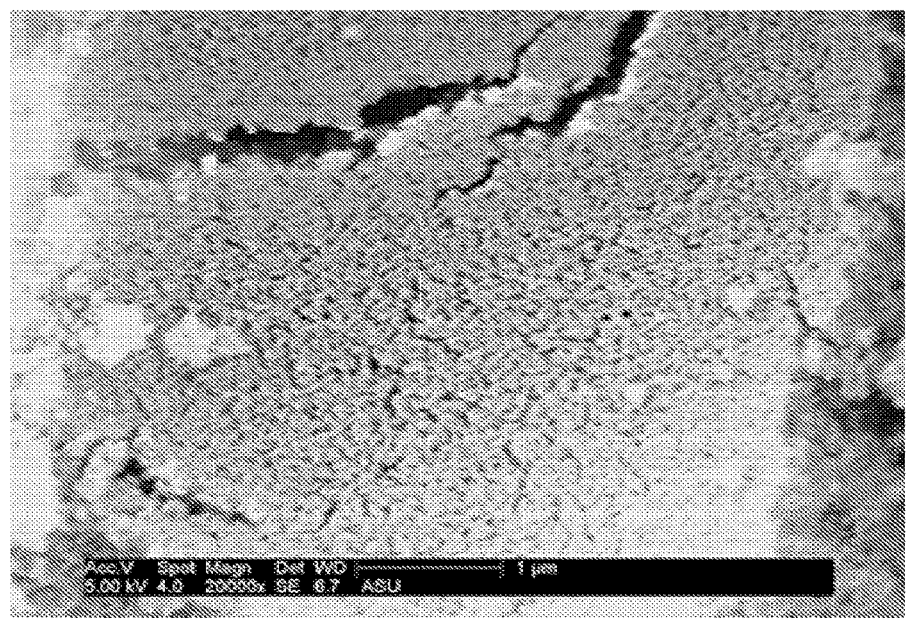
FIG. 24 is a scanning electron micrograph (SEM) of the sample in Example 39.
Figure 25:
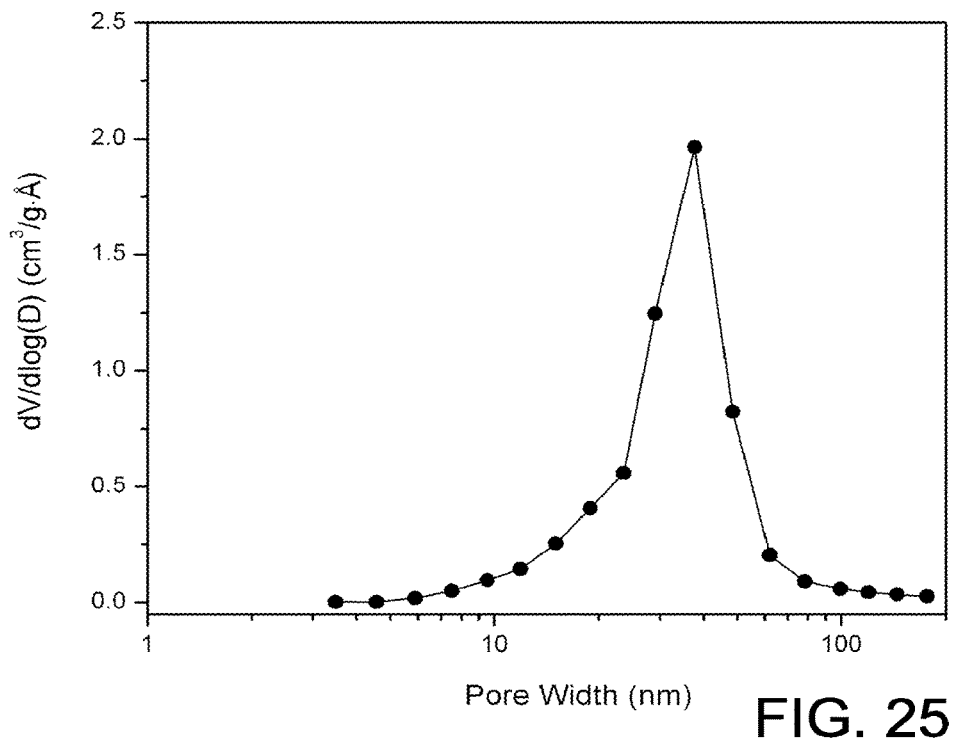
FIG. 25 is the Barret-Joyner-Halenda (BJH) desorption pore size distribution of the second sample in Example 39.
Figure 26:
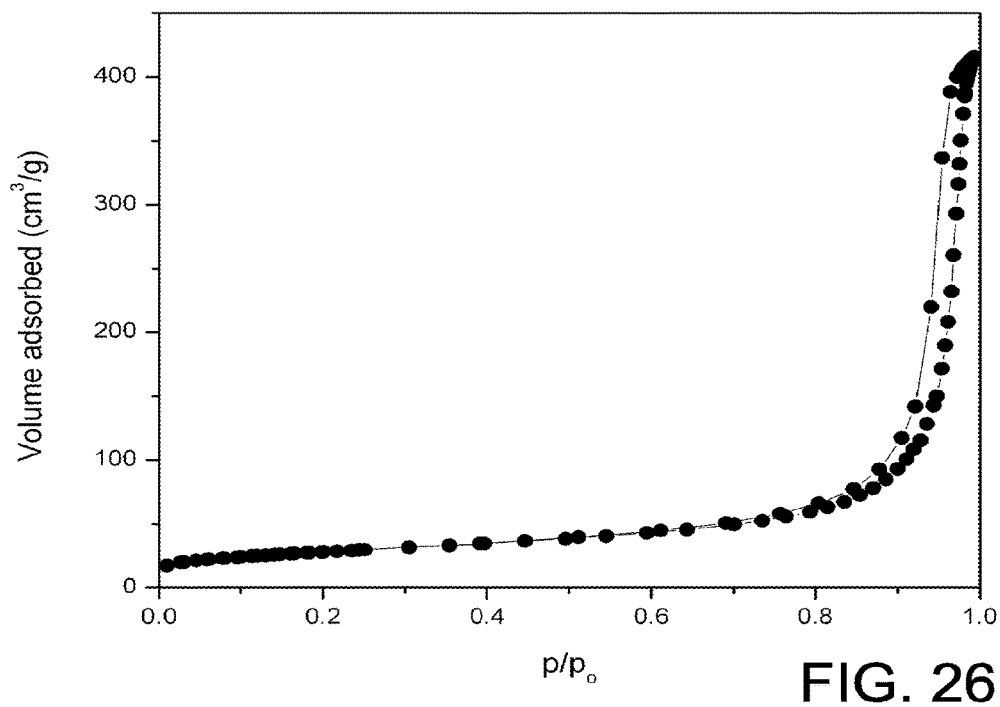
FIG. 26 is the nitrogen sorption isotherm of the second sample in Example 39.

11.5 g of KOH was dissolved in a mixture of 13.7 ml of water and 19.3 g of KASIL-6 from PQ Corporation (12.58% K$_2$O; 26.62% SiO$_2$; 60.80% water). The solution was then stirred until it became homogeneous by visual observation. In the solution, 10.0 g of metakaolin (MetaMax®) was added and stirred at 800 rpm for 40 min using a laboratory mixer to get a visually homogeneous geopolymer resin. The resin had a viscosity similar to honey. 25 ml of canola oil was added into the geopolymer resin and stirred at 800 rpm for an additional 10 min to obtain a geopolymer resin material. The resin material was poured into silicone molds having 1 inch cube wells and was heated in a lab oven at 60° C. for 72 h, which yielded geopolymer materials in a cube shape. The geopolymer material was soaked in hot water (90° C.) for 24 h during which the original cubes disintegrated into small particles. The resulting particles were then dried in a lab oven at 120° C. A scanning electron micrograph (SEM) of the product is shown in FIG. 24. These particles exhibited nitrogen Brunauer-Emmett-Teller (BET) surface area of about 99 m$^2$/g, Barret-Joyner-Halenda (BJH) desorption cumulative pore volume of about 0.63 cm$^3$/g and a BJH desorption pore width of 26 nm. FIG. 25 and FIG. 26 show the BJH pore distribution and the nitrogen sorption isotherm of the product, respectively.

Example 40

Figure 27:
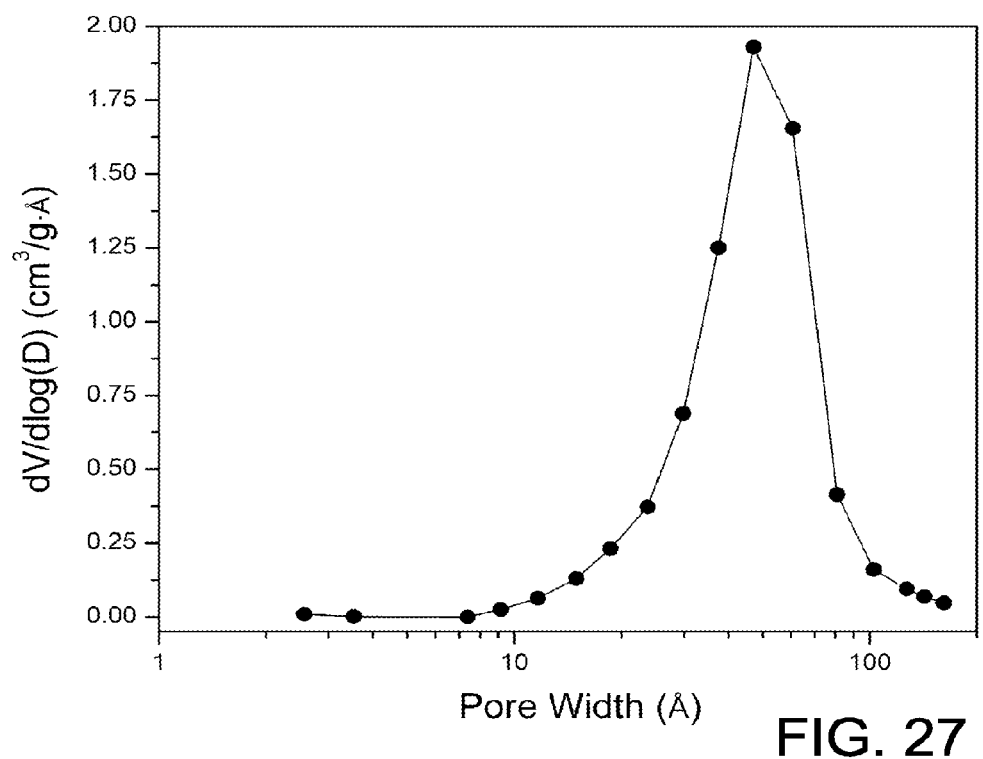
FIG. 27 is the Barret-Joyner-Halenda (BJH) desorption pore size distribution of the second sample in Example 40.
Figure 28:
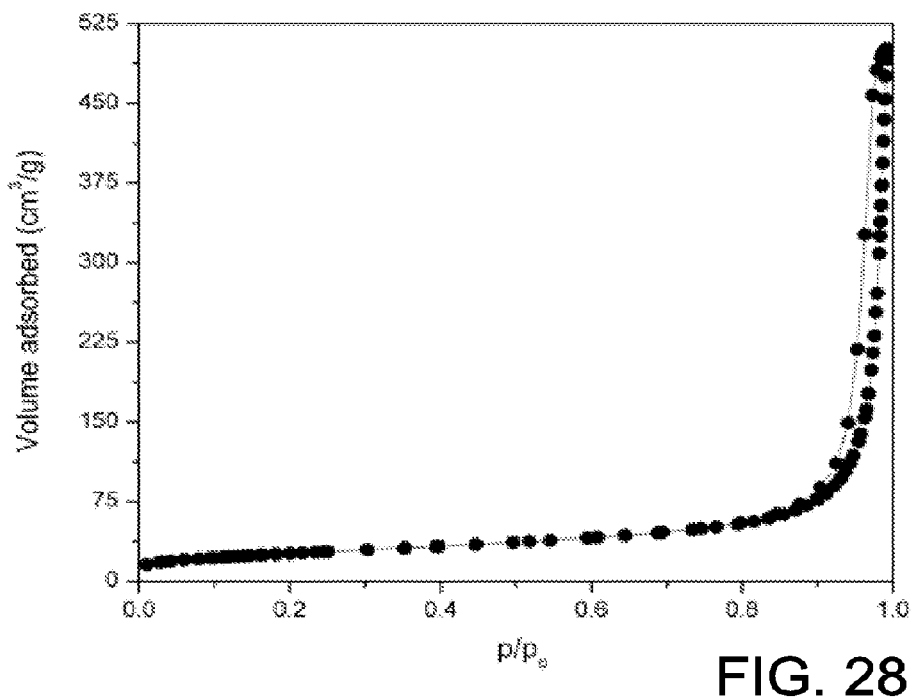
FIG. 28 is the nitrogen sorption isotherm of the second sample in Example 40.

12.0 g of KOH was dissolved in a mixture of 15.3 ml of water and 25.2 g of KASIL-6 from PQ Corporation (12.58% K$_2$O; 26.62% SiO$_2$; 60.80% water). The solution was then stirred until it became homogeneous by visual observation. In the solution, 12.3 g of metakaolin (MetaMax®) was added and stirred at 800 rpm for 40 min using a laboratory mixer to get a visually homogeneous geopolymer resin. The resin had a viscosity similar to honey. 30 ml of canola oil was added into the geopolymer resin and stirred at 800 rpm for further 10 min to obtain a geopolymer resin material. The resin material was poured into silicone molds having 1 inch cube wells and was heated in a lab oven at 60° C. for 72 h, which yielded geopolymer materials in a cube shape. The geopolymer material was soaked in water (23° C.) for 24 h during which the original cubes disintegrated into fine sheet like particles. The water was then decanted from the particles and the particles were washed with deionized water for 2 min. The resulting particles were then dried in a lab oven at 120° C. These particles exhibited nitrogen Brunauer-Emmett-Teller (BET) surface area of about 93 m$^2$/g, Barret-Joyner-Halenda (BJH) desorption cumulative pore volume of about 0.76 cm$^3$/g and a BJH desorption average pore width (pore sizes from 2 to 300 nm) of 40 nm. FIG. 27 and FIG. 28 show the BJH pore distribution and the nitrogen sorption isotherm of the product, respectively.

Example 41

Figure 29:
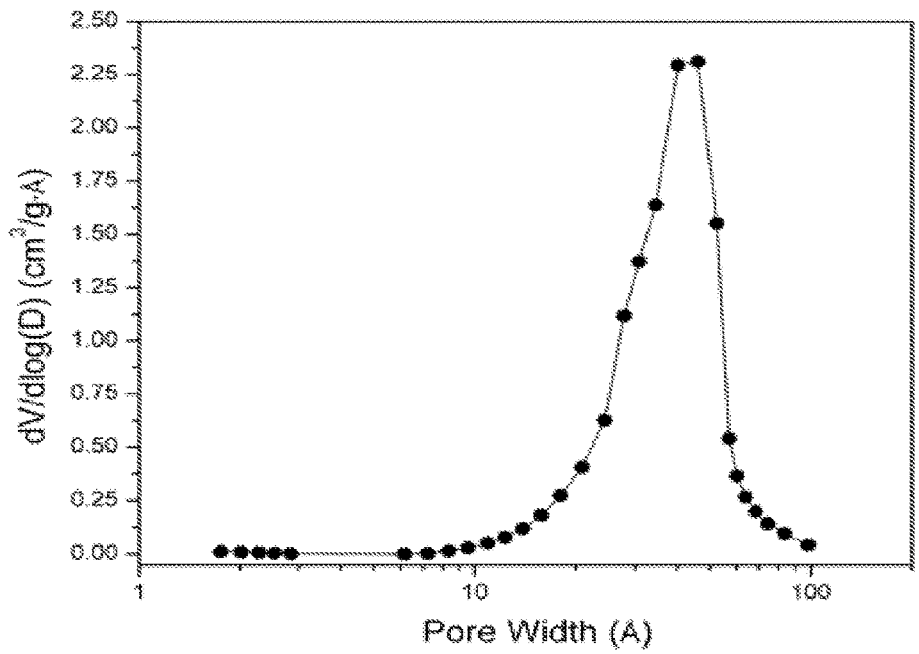
FIG. 29 is the Barret-Joyner-Halenda (BJH) desorption pore size distribution of the second sample in Example 41.
Figure 30:
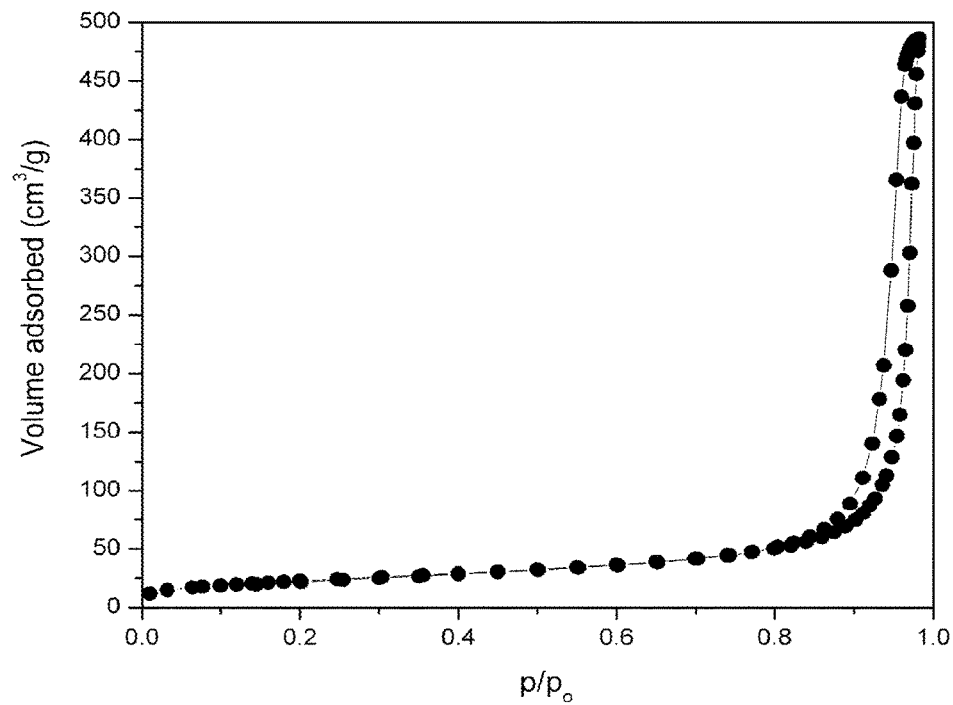
FIG. 30 is the nitrogen sorption isotherm of the second sample in Example 41.

12.0 g of KOH was dissolved in a mixture of 15.3 ml of water and 25.2 g of KASIL-6 from PQ Corporation (12.58% K$_2$O; 26.62% SiO$_2$; 60.80% water). The solution was then stirred until it became homogeneous by visual observation. In the solution, 12.3 g of metakaolin (MetaMax®) was added and stirred at 800 rpm for 40 min using a laboratory mixer to get a visually homogeneous geopolymer resin. The resin had a viscosity similar to honey. 30 ml of canola oil was added into the geopolymer resin and stirred at 800 rpm for further 10 min to obtain a geopolymer resin material. The resin material was poured into silicone molds having 1 inch cube wells and was heated in a lab oven at 60° C. for 72 h, which yielded geopolymer materials in a cube shape. The geopolymer material was soaked in hot water (90° C.) for 24 h during which the original cubes disintegrated into particulates with irregular shape. The resulting particles were then dried in a lab oven at 120° C. These particles exhibited nitrogen Brunauer-Emmett-Teller (BET) surface area of about 84 m$^2$/g, Barret-Joyner-Halenda (BJH) desorption cumulative pore volume of about 0.75 cm$^3$/g and a BJH desorption average pore width (pore sizes from 2 to 300 nm) of 31 nm. FIG. 29 and FIG. 30 show the BJH pore distribution and the nitrogen sorption isotherm of the product, respectively.

Example 42

11.26 g of NaOH was dissolved in 28.25 ml of water in a sealed polypropylene tube kept underwater in a water bath. Into the solution, 20.0 g of Cholla fly ash (Salt River Materials Group) was added and the mixture was stirred at 800 rpm for 40 min, which yielded a geopolymer resin having approximate nominal Na:Al:Si atomic ratios of 3:1:2.18. The geopolymer resin was poured into a 50 ml polypropylene tube and was sealed air tight before placing it in an oven in order to heat the sample at 60° C. for 72 h. The resulting geopolymer resin material was rinsed with copious amount of 0.1 M HCl in water, was subjected to centrifugation at 5000 rpm for 10 min and the resulting clear supernatant solution (pH=13) was decanted to obtain a fine powdery solid. The fine powdery solid was rinsed with more 0.1 M HCl in water and was subjected to centrifugation at 5000 rpm for 10 min and the resulting clear supernatant solution was decanted to obtain a fine powdery solid. The rinsing, centrifugation and decanting of supernatant liquid steps were repeated until the supernatant liquid attained neutral pH. The neutralized fine powdery solid was dried in a lab oven at 110° C. overnight.

Example 43

11.26 g of NaOH was dissolved in 28.25 ml of water in a sealed polypropylene tube kept under water bath. Into the solution, 20.0 g of Cholla fly ash (Salt River Materials Group) was added and the mixture was stirred at 800 rpm for 40 min, which yielded a geopolymer resin having approximate nominal Na:Al:Si atomic ratios of 3:1:2.18. Into the mixture ~23 ml of canola oil was added having approximate oil:water volume ratio of 1:1 and stirring was continued at 800 rpm for 10 min, which yielded a geopolymer resin material. The resin material was poured into a 50 ml polypropylene tube and was sealed air tight before placing it in an oven in order to heat the sample at 60° C. for 72 h. The resulting resin material was placed in 500 ml of hot water (90° C.) and heated at 90° C. for 24 h. The water was then decanted from the particles and the particles were washed with fresh hot water for 2 min. The particles were dried in a lab oven at 110° C. overnight.

Although the above description and the attached claims disclose a number of embodiments, other alternative aspects of the invention are disclosed in the following further embodiments.

Embodiment 1

A method comprising:
contacting a first geopolymer resin material with a liquid; and
removing at least some of the liquid to yield a material.

Embodiment 2

The method of embodiment 1, wherein the first geopolymer resin material comprises silicates, aluminates, aluminosilicates, organo silicates, organo aluminosilicates, phosphates, silico phosphates, silico aluminophosphates, or a combination thereof.

Embodiment 3

The method of embodiment 1 or 2, further comprising forming the first geopolymer resin material by combining one or more inorganic materials selected from the group consisting of fumed silica, rice husk ash, silica fume, silicates, aluminates, aluminosilicates, organosilanes, clays, minerals, metakaolin, calcined clays, activated clays, fly ash, slag, pozzolan, incinerated utility waste, glass powder, and red mud with an alkaline or basic solution.

Embodiment 4

The method of any one of embodiments 1-3, wherein the first geopolymer resin material is an acidic or basic solution comprising dissolved or partially dissolved clay material, activated clay material, or calcined clay material.

Embodiment 5

The method of any one of embodiments 1-4, wherein the first geopolymer resin material comprises an alkali- or base-activated metakaolin or metakaolinite.

Embodiment 6

The method of any one of embodiments 1-5, wherein the first geopolymer resin material comprises an alkali solution of aluminosilicates having a water content no larger than 60 wt % or 70 wt %.

Embodiment 7

The method of any one of embodiments 1-6, wherein the first geopolymer resin material comprises an alkali solution of aluminosilicates with the atomic ratio A:Al higher than 1 where A is an alkali metal or any combination of alkali metals, having a water content no larger than 60 wt % or 70 wt %.

Embodiment 8

The method of any one of embodiments 1-7, wherein the first geopolymer resin material comprises one or more oxides or hydroxides of phosphorous, silicon, alkali metals, alkaline-earth metals, or hydrates thereof.

Embodiment 9

The method of any one of embodiments 1-8, wherein the first geopolymer resin material comprises an organosilane, phosphoric acid, a phosphate, a hydrophosphate, an organophosphine oxide, phosphates, silico phosphates, silico aluminophosphates or a combination thereof.

Embodiment 10

The method of any one of embodiments 1-9, wherein the first geopolymer resin material comprises one or more additional components independently selected from the group consisting of molecules, monomers, oligomers, polymers, ions, salts, biomaterials, structure-directing agents, pore-templating agents, surfactants, clusters, nanoparticles, particles, fibers, fillers, or a combination of thereof.

Embodiment 11

The method of any one of claims 1-9, wherein the first geopolymer resin material comprises one or more additional components independently selected from the group consisting of vegetable oil, plant oil, animal oil, waste vegetable oil, waste animal oil, fat, biodiesel, fatty acid, lipid, ester, carboxylic acid, petroleum-based oil, or a combination of thereof.

Embodiment 12

The method of any one of embodiments 1-11, wherein the first geopolymer resin material is incompletely cured or partially cured and/or aged.

Embodiment 13

The method of any one of embodiments 1-12, wherein the first geopolymer resin material is in a liquid or semi-liquid state and is more viscous than water.

Embodiment 14

The method of any one of embodiments 1-13, wherein the first geopolymer resin material is soft or semi-rigid.

Embodiment 15

The method of any one of embodiments 1-14, wherein the first geopolymer resin material is a solid.

Embodiment 16

The method of any one of embodiments 1-15, wherein the liquid and the first geopolymer resin material are immiscible.

Embodiment 17

The method of any one of embodiments 1-16, wherein the liquid comprises water.

Embodiment 18

The method of any one of embodiments 1-17, wherein the liquid comprises an organic solvent, or a mixture of an organic solvent with water.

Embodiment 19

The method of any one of embodiments 1-18, wherein the liquid is an acidic solution, a basic solution or a pH buffer.

Embodiment 20

The method of any one of embodiments 1-19, wherein the liquid is a pH buffer comprising biological materials.

Embodiment 21

The method of any one of embodiments 1-20, wherein the liquid comprises a solvent and dissolved, dispersed, coagulated, flocculated or suspended species selected from the group consisting of molecules, metal precursors, monomers, oligomers, polymers, ions, salts, biomaterials, structure-directing agents, pore-templating agents, surfactants, clusters, nanoparticles, particles, fibers, fillers or a combination of thereof.

Embodiment 22

The method of embodiment 13, wherein the organic solvent is more viscous than water.

Embodiment 23

The method of embodiment 13, wherein the organic solvent is volatile.

Embodiment 24

The method of any one of embodiments 1-23, wherein contacting the first geopolymer resin material with the liquid yields a particle dispersion or suspension.

Embodiment 25

The method of any one of embodiments 1-24, wherein contacting the first geopolymer resin material with the liquid yields a homogeneous or heterogeneous mixture.

Embodiment 26

The method of any one of embodiments 1-25, wherein contacting the first geopolymer resin material with the liquid alters the composition and/or pH of the first geopolymer resin material.

Embodiment 27

The method of any one of embodiments 1-26, wherein contacting the first geopolymer resin material with the liquid is carried out under a controlled temperature, atmosphere, pressure, moisture level, or a combination thereof.

Embodiment 28

The method of any one of embodiments 1-27, wherein contacting the first geopolymer resin material with the liquid is carried out at an elevated temperature or a low temperature.

Embodiment 29

The method of any one of embodiments 1-28, wherein contacting the first geopolymer resin material with the liquid is carried out by condensation of the liquid onto and/or into the first geopolymer resin material.

Embodiment 30

The method of any one of embodiments 1-29, wherein contacting the first geopolymer resin material with the liquid comprises mixing, blending, shaking, shearing, homogenizing, agitating, stirring, sonicating, or vibrating the first geopolymer resin material with the liquid.

Embodiment 31

The method of any one of embodiments 1-30, wherein contacting the first geopolymer resin material with the liquid comprises crushing, pounding, grinding, pulverizing, milling, crumbling, smashing, mashing, pressing, or triturating the first geopolymer resin material in the liquid.

Embodiment 32

The method of any one of embodiments 1-31, wherein contacting the first geopolymer resin material with the liquid comprises soaking the first geopolymer resin material in the liquid or rinsing the first geopolymer resin material with the liquid.

Embodiment 33

The method of any one of embodiments 1-32, wherein contacting the first geopolymer resin material with the liquid causes the first geopolymer resin material to disintegrate to form particles in the liquid.

Embodiment 34

The method of any one of embodiments 1-33, wherein contacting the first geopolymer resin material with the liquid changes a composition of the liquid.

Embodiment 35

The method of any one of embodiments 1-34, wherein contacting the first geopolymer resin material with the liquid transfers one or more components in the liquid to the first geopolymer resin material.

Embodiment 36

The method of any one of embodiments 1-35, wherein contacting the first geopolymer resin material with the liquid transfers one or more components of the first geopolymer resin material to the liquid.

Embodiment 37

The method of any one of embodiments 1-36, wherein the first geopolymer resin material comprises water, and contacting the first geopolymer resin material with the liquid transfers at least some of the water in the first geopolymer resin material to the liquid.

Embodiment 38

The method of any one of embodiments 1-37, wherein contacting the first geopolymer resin material with the liquid causes one or more components of the liquid to react with one or more components of the first geopolymer resin material.

Embodiment 39

The method of any one of embodiments 1-38, wherein contacting the first geopolymer resin material with the liquid alters a viscosity of the first geopolymer resin material.

Embodiment 40

The method of any one of embodiments 1-39, wherein contacting the first geopolymer resin material with the liquid alters the ionic strength of the liquid and/or the first geopolymer resin material.

Embodiment 41

The method of any one of embodiments 1-40, further comprising curing or partially curing the first geopolymer resin material, wherein contacting the first geopolymer resin material with the liquid accelerates or decelerates curing of the first geopolymer resin material.

Embodiment 42

The method of any one of embodiments 1-41, wherein the material comprises a multiplicity of particles.

Embodiment 43

The method of any one of embodiments 1-42, wherein the material is a powder.

Embodiment 44

The method of any one of embodiments 1-43, wherein the material is a dispersion or suspension comprising a multiplicity of particles.

Embodiment 45

The method of any one of embodiments 42-44, wherein a majority of the particles have a dimension less than 1 μm or less than 1000 μm.

Embodiment 46

The method of any one of embodiments 42-45, wherein the composition of the particles differs from the composition of the geopolymer resin material.

Embodiment 47

The method of any one of embodiments 42-46, wherein liquid comprises a surfactant, and the surfactant is coupled to the surface of the particles.

Embodiment 48

The method of any one of embodiments 1-41, wherein the material is a monolithic material.

Embodiment 49

The method of embodiment 48, wherein the monolithic material is in the form of blocks, plates, films, thin films, coatings, wires, spheres, beads, pellets, rods, or a combination thereof.

Embodiment 50

The method of embodiment 48 or 49, wherein the monolithic material comprises biological material.

Embodiment 51

The method of any one of embodiments 1-41, wherein the material is a second geopolymer resin material.

Embodiment 52

The method of embodiment 51, wherein the composition and/or pH of the second geopolymer resin material differs from that of the first geopolymer resin material.

Embodiment 53

The method of embodiment 51 or 52, further comprising solidifying the second geopolymer resin material to form a solid.

Embodiment 54

The method of embodiment 53, wherein solidifying comprises curing or partially curing at ambient temperature or heating.

Embodiment 55

The method of embodiment 53 or 54, wherein solidifying comprises heating under a controlled humidity.

Embodiment 56

The method of any one of embodiments 53-55, wherein solidifying comprises stirring, shaking, shearing, agitating, sonicating, or vibrating.

Embodiment 57

The method of any one of embodiments 53-56, wherein solidifying comprises spinning, spreading, screeding, spraying, dispensing, injecting, foaming, shaping, molding, ribboning, extruding, or pultruding.

Embodiment 58

The method of any one of embodiments 53-57, wherein the solid is in a form of monoliths, plates, films, thin films, coatings, wires, spheres, beads, pellets, rods, or a combination thereof.

Embodiment 59

The method of any one of embodiments 53-58, wherein the solid is a composite comprising organic material, polymer material, inorganic material, biological material, or a combination thereof.

Embodiment 60

The method of any one of embodiments 1-59, wherein removing at least some of the liquid comprises removing a majority of the liquid.

Embodiment 61

The method of any one of embodiments 1-60, wherein removing at least some of the liquid comprises precipitation, decantation, filtration, or centrifugation.

Embodiment 62

The method of any one of embodiments 1-61, wherein removing at least some of the liquid comprises flocculation, agglomeration, aggregation, coagulation or coalescence of the particles by adding a clarifying agent, flocculant, or coagulant.

Embodiment 63

The method of any one of embodiments 1-62, wherein removing at least some of the liquid comprises drying, spray-drying, freeze-drying, evaporation, or dehydrating.

Embodiment 64

The method of any one of embodiments 1-63, wherein removing at least some of the liquid comprises heating, pyrolyzing, or calcining.

Embodiment 65

The method of any one of embodiments 1-64, wherein removing at least some of the liquid comprises exchange of the liquid with another liquid.

Embodiment 66

The method of any one of embodiments 1-65, wherein removing at least some of the liquid comprises extraction of the liquid.

Embodiment 67

The method of any one of embodiments 1-66, further comprising treating the material to form a second material.

Embodiment 68

The method of embodiment 67, wherein treating the material changes the hydrophobicity or hydrophilicity of the material.

Embodiment 69

The method of embodiment 67 or 68, wherein treating the material causes coating or deposition of an organic or inorganic substance on the surface of the material or inside the material.

Embodiment 70

The method of any one of embodiments 67-69, wherein treating the material changes the composition of at least one component of the material.

Embodiment 71

The method of any one of embodiments 67-70, wherein treating the material causes chemical reduction or oxidation of at least one component of the material.

Embodiment 72

The method of any one of embodiments 67-71, wherein treating the material causes ion exchange of at least one component of the material.

Embodiment 73

The method of any one of embodiments 67-72, wherein treating the material changes the chemical structure of at least one component of the material.

Embodiment 74

The method of any one of embodiments 67-73, wherein treating the material changes the surface area of the material.

Embodiment 75

The method of any one of embodiments 67-74, wherein treating the material comprises heating, evaporation, dehydration, hydrothermal treatment, solvothermal treatment, ionothermal treatment, crystallization, pyrolysis, carbothermal reaction, calcination, or a combination of thereof.

Embodiment 76

The method of any one of embodiments 1-75, wherein the material is responsive to a chemical, a biological material, an electric field, a magnetic field, temperature, pressure, an electromagnetic wave, a mechanical force, or a combination of thereof.

Embodiment 77

The method of any one of embodiments 1-76, wherein the material is porous.

Embodiment 78

The method of any one of embodiments 1-77, wherein the material comprises a zeolite.

Embodiment 79

The method of any one of embodiments 1-78, wherein the material has micropores, mesopores, macropores, or a combination thereof.

Embodiment 80

A material formed by the method of any one of embodiments 1-79.

Embodiment 81

A second material comprising the material of embodiment 80.

Embodiment 82

A method comprising:
heating and/or aging a geopolymer resin material to yield a first material;
contacting the first material with a fluid; and
removing at least some of the fluid to yield a second material.

Embodiment 83

The method of embodiment 82, wherein contacting the first material with the fluid breaks up or disintegrates the first material.

Embodiment 84

The method of embodiments 82 or 83, wherein heating and/or aging a geopolymer resin material comprises heating and/or aging the geopolymer resin material at a temperature below 100° C.

Embodiment 85

The method of any one of embodiments 82-84, wherein heating and/or aging a geopolymer resin material comprises heating and/or aging the geopolymer resin material while varying the heating and/or aging temperature.

Embodiment 86

The method of any one of embodiments 82-85, wherein heating and/or aging a geopolymer resin material comprises heating and/or aging the geopolymer resin material under a controlled humidity.

Embodiment 87

The method of any one of embodiments 82-86, wherein heating and/or aging a geopolymer resin material comprises heating and/or aging the geopolymer resin material under an ambient pressure.

Embodiment 88

The method of any one of embodiments 82-87, wherein heating and/or aging a geopolymer resin material comprises heating and/or aging the geopolymer resin material in a closed container under a pressure not greater than 2 atm.

Embodiment 89

The method of any one of embodiments 82-88, wherein heating and/or aging a geopolymer resin material comprises heating and/or aging the geopolymer resin material without stirring the resin.

Embodiment 90

The method of any one of embodiments 82-89, wherein the first material is brittle.

Embodiment 91

The method of any one of embodiments 82-90, wherein the first material is a monolith.

Embodiment 92

The method of any one of embodiments 82-91, wherein the first material comprises particulates.

Embodiment 93

The method of any one of embodiments 82-92, wherein the first material is a paste or sludge.

Embodiment 94

The method of any one of embodiments 82-93, wherein the first material is a liquid more viscous than water.

Embodiment 95

The method of any one of embodiments 82-94, wherein the first material is a geopolymer material.

Embodiment 96

The method of any one of embodiments 82-95, wherein the first material has a significant degree of crystallinity.

Embodiment 97

The method of any one of embodiments 82-96, wherein heating and/or aging the geopolymer resin material provides a significant degree of crystallinity in the first material.

Embodiment 98

The method of any one of embodiments 82-97, wherein the first material comprises a zeolite or zeolite composite.

Embodiment 99

The method of any one of embodiments 82-98, wherein the first material comprises a zeolite, and water-soluble organics with a molecular weight no greater than about 1000 g/mol.

Embodiment 100

The method of any one of embodiments 82-99, wherein the second material comprises particulates.

Embodiment 101

The method of any one of embodiments 82-100, wherein the second material comprises a dispersion, suspension, sludge or paste containing particulates.

Embodiment 102

The method of embodiment 100 or 101, wherein a majority or a significant majority of the particulates consist essentially of or include a material that consists of particulates, agglomerates of particles, and/or aggregates of particles for which the particles have one or more external dimensions in the size range 1-100 nm for more than about 50% of their number; and/or has internal or surface structures in one or more dimensions in the size range 1-100 nm; and/or has an external specific surface area by volume greater than 60 $m^2/cm^3$.

Embodiment 103

The method of any one of embodiments 100-102, wherein a majority or a significant majority of the particulates exhibit micropores with a pore diameter not larger than 2 nm.

Embodiment 104

The method of any one of embodiments 100-103, wherein a majority or a significant majority of the particulates have one or more external dimensions in the size range from about 0.1 µm to about 100 µm.

Embodiment 105

The method of any one of embodiments 100-104, wherein a majority or a significant majority of the particulates have one or more external dimensions in the size range from about 100 µm to about 5000 µm.

Embodiment 106

The method of any one of embodiments 100-105, wherein a majority or a significant majority of the particulates have one or more external dimensions in the size range from about 5 mm to about 2 cm.

Embodiment 107

The method of any one of embodiments 82-106, wherein the geopolymer resin material comprises silicates, aluminates, aluminosilicates, organo silicates, organo aluminosilicates, phosphates, silico phosphates, silico aluminophosphates, or a combination thereof.

Embodiment 108

The method of any one of embodiments 82-107, wherein the geopolymer resin material is formed by dissolving an acidic or basic solution comprising dissolved or partially dissolved clay material, activated clay material, or calcined clay material, and hardening the solution.

Embodiment 109

The method of any one of embodiments 82-108, wherein the geopolymer resin material is an alkali solution of one or more inorganic materials selected from the group consisting of fumed silica, rice husk ash, silica fume, silicates, aluminates, aluminosilicates, organosilanes, clays, minerals, metakaolinite, metakaolin, activated clays, calcined clays, fly ash, slag, pozzolan, incinerated utility waste, glass powder, and red mud.

Embodiment 110

The method of any one of embodiments 82-109, wherein the geopolymer resin material comprises an alkali- or base-activated metakaolin or metakaolinite.

Embodiment 111

The method of any one of embodiments 82-110, wherein the geopolymer material comprises an alkali- or base-activated fly ash.

Embodiment 112

The method of any one of embodiments 82-111, wherein the geopolymer resin material has the atomic ratio of A to aluminum no smaller than 1, where A is an alkali metal or any combination of alkali metals, and the total amount of alkali metal ions no lower than 5 moles per 1 kg of water in the solution.

Embodiment 113

The method of any one of embodiments 82-112, wherein the geopolymer resin material comprises one or more oxides or hydroxides of phosphorous, silicon, alkali metals, alkaline-earth metals, or hydrates thereof.

Embodiment 114

The method of any one of embodiments 82-113, wherein the geopolymer resin material comprises an organosilane, phosphoric acid, a phosphate, a hydrophosphate, an organophosphine oxide, phosphates, silico phosphates, silico aluminophosphates, or a combination thereof.

Embodiment 115

The method of any one of embodiments 82-114, wherein the geopolymer resin material is aged.

Embodiment 116

The method of any one of embodiments 82-115, wherein the geopolymer resin material comprises one or more additional components independently selected from the group consisting molecules, monomers, oligomers, polymers, ions, salts, biomaterials, structure-directing agents, pore-templating agents, surfactants, clusters, nanoparticles, particles, fibers, fillers, or a combination of thereof.

Embodiment 117

The method of embodiment 116, wherein the one or more additional components of the geopolymer resin material comprise an organic compound that is immiscible with water.

Embodiment 118

The method of embodiments 116 or 117, wherein the one or more additional components of the geopolymer resin material comprise an organic compound that reacts with an alkali solution to produce one or more carboxylate ions that have a molecular weight no larger than about 400 g/mol.

Embodiment 119

The method of any one of embodiments 116-118, wherein the one or more additional components of the geopolymer resin material comprise carboxylate ions that have a molecular weight no larger than about 400 g/mol.

Embodiment 120

The method of any one of embodiments 116-119, wherein the one or more additional components of the geopolymer resin material are independently selected from the group consisting vegetable oil, plant oil, animal oil, waste vegetable oil, waste animal oil, fat, biodiesel, fatty acid, lipid, ester, carboxylic acid, or a combination thereof.

Embodiment 121

The method of any one of embodiments 116-120, wherein the one or more additional components of the geopolymer resin material are carboxylate ions that have a molecular weight no larger than about 400 g/mol.

Embodiment 122

The method of any one of embodiments 82-121, wherein the geopolymer resin material has a water content no greater than 60 wt %.

Embodiment 123

The method of any one of embodiments 82-122, wherein the geopolymer resin material has a water content no greater than 50 wt %.

Embodiment 124

The method of any one of embodiments 82-123, wherein the geopolymer resin material has a water content no greater than 40 wt %.

Embodiment 125

The method of any one of embodiments 82-124, wherein contacting the first material with the fluid comprises contacting the first material with the fluid at a controlled temperature.

Embodiment 126

The method of any one of embodiments 82-125, wherein contacting the first material with the fluid comprises washing the first material with the fluid at a controlled temperature.

Embodiment 127

The method of any one of embodiments 82-126, wherein contacting the first material with the fluid comprises heating the first material in the fluid at a temperature below 100° C.

Embodiment 128

The method of any one of embodiments 82-127, wherein contacting the first material with the fluid comprises heating the first material in the fluid under a controlled humidity and/or atmosphere.

Embodiment 129

The method of any one of embodiments 82-128, wherein contacting the first material with the fluid causes the first material to break up into smaller pieces.

Embodiment 130

The method of any one of embodiments 82-129, wherein contacting the first material with the fluid causes the first material to disintegrate into particulates.

Embodiment 131

The method of any one of embodiments 82-130, wherein contacting the first material with the fluid comprises breaking, fracturing, cracking, crushing, pounding, grinding, pulverizing, milling, granulating, crumbling, smashing, mashing, pressing, or triturating the first material in the fluid.

Embodiment 132

The method of any one of embodiments 82-131, wherein contacting the first material with the fluid comprises stirring, shaking, shearing, agitating, sonicating, or vibrating the first material in the fluid.

Embodiment 133

The method of any one of embodiments 82-132, wherein contacting the first material with the fluid changes the composition of the fluid and/or the composition of the first material.

Embodiment 134

The method of any one of embodiments 82-133, wherein contacting the first material with the fluid removes one or more components of the first material.

Embodiment 135

The method of any one of embodiments 82-134, wherein contacting the first material with the fluid dissolves one or more components of the first material into the fluid.

Embodiment 136

The method of any one of embodiments 82-135, wherein the first material comprises carboxylate ions, and contacting the first material with the fluid dissolves carboxylate ions in the first material into the fluid.

Embodiment 137

The method of any one of embodiments 82-136, wherein the fluid is heated or cooled.

Embodiment 138

The method of any one of embodiments 82-137, wherein the fluid flows continuously.

Embodiment 139

The method of any one of embodiments 82-138, wherein the fluid is circulated and/or pressurized.

Embodiment 140

The method of any one of embodiments 82-139, wherein the fluid comprises water.

Embodiment 141

The method of any one of embodiments 82-140, wherein the fluid comprises a steam.

Embodiment 142

The method of any one of embodiments 82-141, wherein removing at least some of the fluid comprises removing a majority of the fluid.

Embodiment 143

The method of any one of embodiments 82-142, wherein removing at least some of the fluid comprises precipitation, decantation, filtration, centrifugation or a combination thereof.

Embodiment 144

The method of any one of embodiments 82-143, wherein removing at least some of the fluid comprises drying, spray-drying, freeze-drying, evaporation, dehydrating, or a combination thereof.

Embodiment 145

The method of any one of embodiments 82-144, wherein removing at least some of the fluid comprises heating, pyrolyzing, calcining, or a combination thereof.

Embodiment 146

The method of any one of embodiments 82-145, wherein removing at least some of the fluid comprises exchange of the fluid with another fluid.

Embodiment 147

The method of any one of embodiments 82-146, wherein removing at least some of the fluid comprises extraction of the fluid.

Embodiment 148

The method of any one of embodiments 82-147, wherein the second material is a powder or a powder cake.

Embodiment 149

The method of any one of embodiments 82-148, wherein the second material is a suspension, slurry, a sludge, or a paste.

Embodiment 150

The method of any one of embodiments 82-149, wherein the second material comprises dried particulates.

Embodiment 151

The method of any one of embodiments 82-150, further comprising treating the second material to produce a third material.

Embodiment 152

The method of embodiments 151, wherein treating the second material changes the chemical composition of at least one component of the second material.

Embodiment 153

The method of embodiments 151 or 152, wherein treating the second material changes the chemical structure of at least one component of the second material.

Embodiment 154

The method of any one of embodiments 151-153, wherein treating the second material changes the morphology of the second material.

Embodiment 155

The method of any one of embodiments 151-154, wherein treating the second material comprises adding an additive to the second material to form a mixture, followed by spinning, spreading, screeding, spraying, dispensing, injecting, foaming, shaping, molding, granulating, ribboning, extruding, or pultruding the mixture.

Embodiment 156

The method of any one of embodiments 151-155, wherein treating the second material comprises adding an additive to the second material, followed by spinning, spreading, screeding, spraying, dispensing, injecting, foaming, shaping, molding, ribboning, extruding, or pultruding the mixture and heating the mixture during at least part of the time during spinning, spreading, screeding, spraying, dispensing, injecting, foaming, shaping, molding, granulating, ribboning, extruding, or pultruding.

Embodiment 157

The method of any one of embodiments 151-156, wherein the third material is in a form of monoliths, plates, films, thin films, coatings, wires, spheres, beads, pellets, rods, or a combination thereof.

Embodiment 158

The method of any one of embodiments 151-157, wherein the third material is a composite comprising organic material, polymer material, inorganic material, biological material or a combination thereof.

Embodiment 159

The method of any one of embodiments 151-158, wherein the third material is a composite comprising the second material for which at least some portion of its pores are impregnated with organic material, polymer material, inorganic material, biological material or a combination thereof.

Embodiment 160

The method of any one of embodiments 151-159, wherein the third material is a composite comprising the second material for which at least some portion of its internal and/or external surface is covered with organic material, polymer material, inorganic material, biological material or a combination thereof.

Embodiment 161

The method of any one of embodiments 82-160, wherein the first material, the second material, the third material, or a combination thereof comprises a zeolite.

Embodiment 162

The method of any one of embodiments 82-161, wherein the first material, the second material, the third material, or any combination thereof has micropores, mesopores, macropores, or a combination thereof.

Embodiment 163

A material formed by the method of any one of embodiments 82-162.

Embodiment 164

A material comprising the first material, the second material, or the third material of any one of embodiments 82-163.

Embodiment 165

The method of any one of embodiments 1-79 and 82-162, wherein the material, the first material, the second material, or the third material consists essentially of or include a material that consists of particulates, agglomerates of particles, and/or aggregates of particles for which the particles have one or more external dimensions in the size range 1-100 nm for more than about 50% of their number; and/or has internal or surface structures in one or more dimensions in the size range 1-100 nm; and/or has an external specific surface area by volume greater than 60 $m^2/cm^3$.

Embodiment 166

The material of any one of embodiments 80, 81, 163, and 164, wherein the material, the first material, the second material, or the third material consists essentially of or include a material that consists of particulates, agglomerates of particles, and/or aggregates of particles for which the particles have one or more external dimensions in the size range 1-100 nm for more than about 50% of their number; and/or has internal or surface structures in one or more dimensions in the size range 1-100 nm; and/or has an external specific surface area by volume greater than 60 $m^2/cm^3$.

A number of embodiments of the invention have been described. Nevertheless, it will be understood that various modifications may be made without departing from the spirit and scope of the invention. Accordingly, other embodiments are within the scope of the following claims.

The invention claimed is:

1. A method comprising:
   heating, aging, or heating and aging a geopolymer resin material to yield a first material;
   contacting the first material with a fluid; and
   removing at least some of the fluid to yield a second material.

2. The method of claim 1, wherein the second material comprises particulates.

3. The method of claim 2, wherein the second material comprises a dispersion, suspension, sludge or paste containing the particulates.

4. The method of claim 2, wherein a majority or a significant majority of the particulates exhibit micropores with a pore diameter not larger than 2 nm.

5. The method of claim 2, wherein a majority or a significant majority of the particulates have one or more external dimensions in the size range from about 0.1 μm to about 100 μm.

6. The method of claim 1, wherein the second material is a powder, a powder cake, a suspension, a slurry, a sludge, a paste, or dried particulates.

7. The method of claim 1, further comprising treating the second material to produce a third material.

8. The method of claim 7, wherein treating the second material changes the chemical composition, the chemical structure, or the morphology of at least one component of the second material.

9. The method of claim 7, wherein treating the second material comprises:
   adding an additive to the second material to form a mixture, followed by spinning, spreading, screeding, spraying, dispensing, injecting, foaming, shaping, molding, granulating, ribboning, extruding, or pultruding the mixture, or
   adding an additive to the second material, followed by spinning, spreading, screeding, spraying, dispensing, injecting, foaming, shaping, molding, ribboning, extruding, or pultruding the mixture and heating the mixture during at least part of the time during spinning, spreading, screeding, spraying, dispensing, injecting, foaming, shaping, molding, granulating, ribboning, extruding, or pultruding.

10. The method of claim 7, wherein the third material is in a form of monoliths, plates, films, thin films, coatings, wires, spheres, beads, pellets, rods, or a combination thereof.

11. The method of claim 7, wherein the third material is a composite comprising organic material, polymer material, inorganic material, biological material, or a combination thereof.

12. The method of claim 7, wherein the third material is a composite comprising the second material for which:
   at least some portion of its pores are impregnated with organic material, polymer material, inorganic material, biological material, or a combination thereof, or
   at least some portion of its internal surface, external surface, or both is covered with organic material, polymer material, inorganic material, biological material, or a combination thereof.

13. The method of claim 1, wherein at least one of the first material and the second material comprises a zeolite.

14. The method of claim 7, wherein the third material has micropores, mesopores, macropores, or a combination thereof.

15. The first material or the second material formed by the method of claim 1.

16. The first material or the second material of claim 15, wherein at least one of the first material and the second material consists essentially of or includes a material that consists essentially of particulates, agglomerates of particles, aggregates of particles, or a combination thereof, wherein the particulates or the particles have at least one of:
   one or more external dimensions in the size range 1-100 nm for more than about 50% of their number,
   internal or surface structures in one or more dimensions in the size range 1-100 nm, and
   an external specific surface area by volume greater than 60 $m^2/cm^3$.

17. A composite material comprising the first material of claim 16, the second material of claim 16, or the first material and the second material of claim 16.

18. The third material formed by the method of claim 7.

19. The third material of claim 18, wherein the third material consists essentially of or includes a material that consists essentially of particulates, agglomerates of particles, aggregates of particles, or a combination thereof, wherein the particulates or the particles have at least one of:
   one or more external dimensions in the size range 1-100 nm for more than about 50% of their number, internal or surface structures in one or more dimensions in the size range 1-100 nm, and an external specific surface area by volume greater than 60 $m^2/cm^3$.

20. A composite material comprising the third material of claim 18.

21. A composite material comprising a second material, wherein the second material is formed by a method comprising:

contacting a first material with a fluid, wherein the first material comprises a geopolymer resin material, a geopolymer material, or a combination thereof, and wherein contacting the first material with the fluid breaks up or disintegrates the first material, thereby forming particles; and removing at least some of the fluid to yield the second material.

* * * * *